(12) United States Patent  (10) Patent No.: US 9,128,621 B2
Shinozaki et al.  (45) Date of Patent: Sep. 8, 2015

(54) STORAGE SYSTEM CONTROL METHOD

(71) Applicant: FUJITSU LIMITED, Kawasaki, Kanagawa (JP)

(72) Inventors: Yoshinari Shinozaki, Kawasaki (JP); Shinichi Nishizono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/681,139

(22) Filed: Apr. 8, 2015

(65) Prior Publication Data

US 2015/0212743 A1  Jul. 30, 2015

Related U.S. Application Data

(63) Continuation of application No. 12/510,480, filed on Jul. 28, 2009, now Pat. No. 9,032,161.

(30) Foreign Application Priority Data

Jul. 31, 2008 (JP) .................. 2008-198852

(51) Int. Cl.
 *G06F 12/00* (2006.01)
 *G06F 3/06* (2006.01)
(52) U.S. Cl.
 CPC ............ *G06F 3/0614* (2013.01); *G06F 3/0647* (2013.01); *G06F 3/0656* (2013.01); *G06F 3/0689* (2013.01); *G06F 2003/0691* (2013.01); *G06F 2003/0692* (2013.01)
(58) Field of Classification Search
 CPC ....... G06F 3/065; G06F 3/0613; G06F 3/067; G06F 12/0804; G06F 12/0866
 See application file for complete search history.

(56) References Cited

U.S. PATENT DOCUMENTS

| 5,892,979 | A  | 4/1999 | Shiraki et al. |
| 6,898,685 | B2 | 5/2005 | Meiri et al.   |
| 7,051,176 | B2 | 5/2006 | Meiri et al.   |
| 7,234,033 | B2 | 6/2007 | Watanabe       |

(Continued)

FOREIGN PATENT DOCUMENTS

| JP | 8-36877    | 2/1996 |
| JP | 2003-167684 | 6/2003 |

(Continued)

OTHER PUBLICATIONS

Japanese Patent Office Action mailed Jun. 1, 2010 in corresponding JP Patent Application No. 366499, with partial English-language translation.

(Continued)

*Primary Examiner* — Gurtej Bansal
(74) *Attorney, Agent, or Firm* — Fujitsu Patent Center

(57) ABSTRACT

An apparatus for copying data to another apparatus including a receiving buffer, includes: a transmitting buffer including a plurality of areas for temporary storing data of the copying; and a processor for executing a process, including: receiving information indicative of an instantaneous vacant area of the receiving buffer of the another apparatus, the vacant area being capable of temporarily storing data that could be transmitted from the transmitting buffer, determining an area of the transmitting buffer that stores data to be transmitted subsequently in reference to the information of the vacant area, and transmitting data stored in the determined area of the transmitting buffer to the receiving buffer of the another apparatus.

6 Claims, 37 Drawing Sheets

(56) References Cited

U.S. PATENT DOCUMENTS

| | | |
|---|---|---|
| 7,380,082 B2 | 5/2008 | Meiri et al. |
| 2003/0220949 A1 | 11/2003 | Witt et al. |
| 2004/0215907 A1 | 10/2004 | Pizel et al. |
| 2005/0066081 A1 | 3/2005 | Chandra et al. |
| 2005/0080874 A1 | 4/2005 | Fujiwara et al. |
| 2006/0195666 A1 | 8/2006 | Maruyama et al. |
| 2006/0212667 A1 | 9/2006 | Mikami |
| 2006/0212668 A1 | 9/2006 | Furukawa et al. |
| 2007/0274215 A1 | 11/2007 | Gusat et al. |

FOREIGN PATENT DOCUMENTS

| | | |
|---|---|---|
| JP | 2005-122235 | 5/2005 |
| JP | 2006-236019 | 9/2006 |
| JP | 2006-260292 | 9/2006 |
| JP | 2006-260355 | 9/2006 |
| JP | 2006-268420 | 10/2006 |
| JP | 2006-523890 | 10/2006 |
| WO | 2004-095289 | 11/2004 |

OTHER PUBLICATIONS

USPTO, Notice of Allowance and Notice of Allowability, Jan. 14, 2015, in parent U.S. Appl. No. 12/510,480 [now allowed].

USPTO, Final Office Action, Aug. 19, 2014, in parent U.S. Appl. No. 12/510,480 [now allowed].

USPTO, Non-Final Office Action, May 12, 2014, in parent U.S. Appl. No. 12/510,480 [now allowed].

USPTO, Final Office Action, Jan. 16, 2014, in parent U.S. Appl. No. 12/510,480 [now allowed].

USPTO, Non-Final Office Action, Aug. 14, 2013, in parent U.S. Appl. No. 12/510,480 [now allowed].

USPTO, Final Office Action, May 3, 2012, in parent U.S. Appl. No. 12/510,480 [now allowed].

USPTO, Non-Final Office Action, Jan. 13, 2012, in parent U.S. Appl. No. 12/510,480 [now allowed].

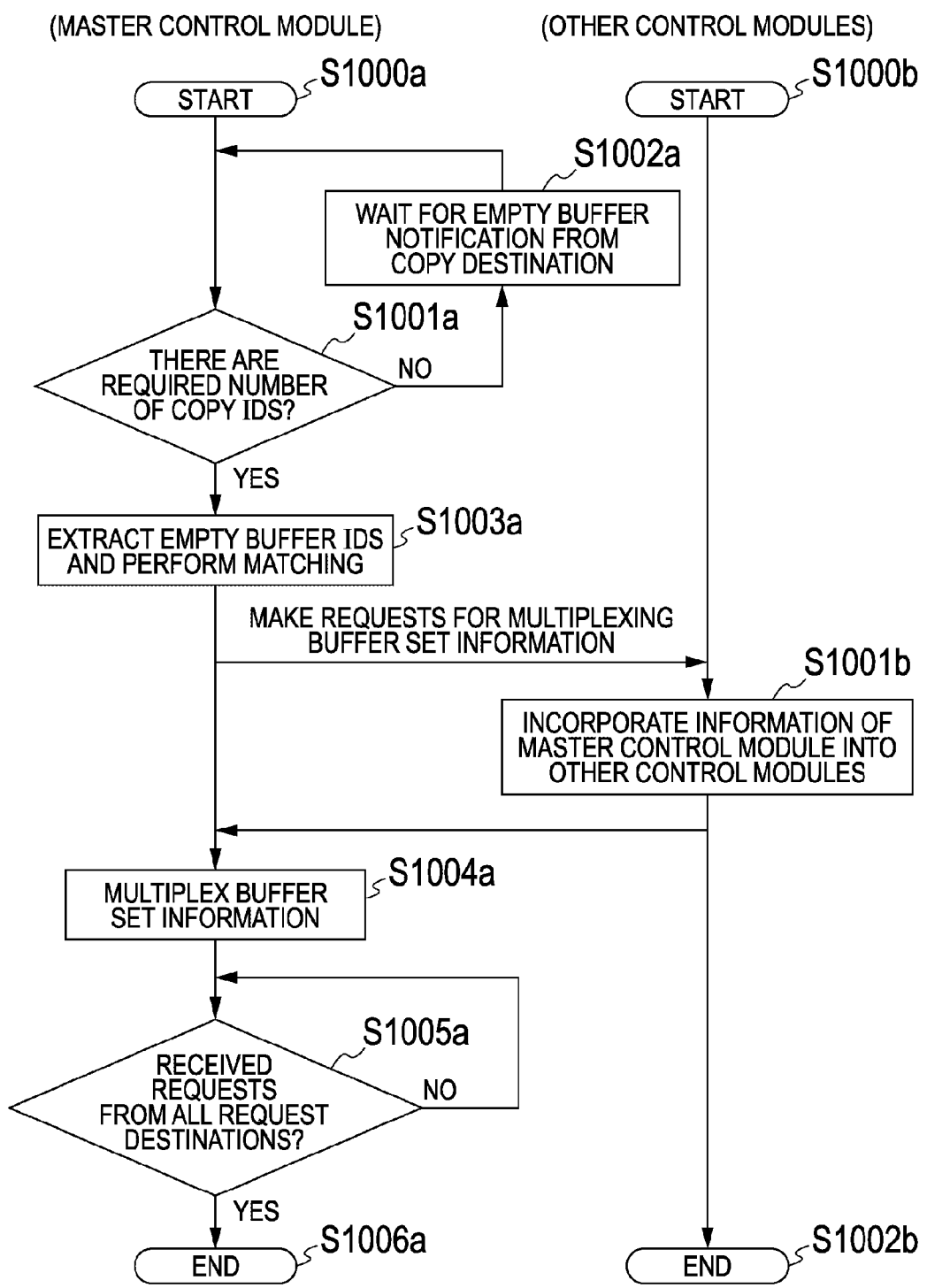

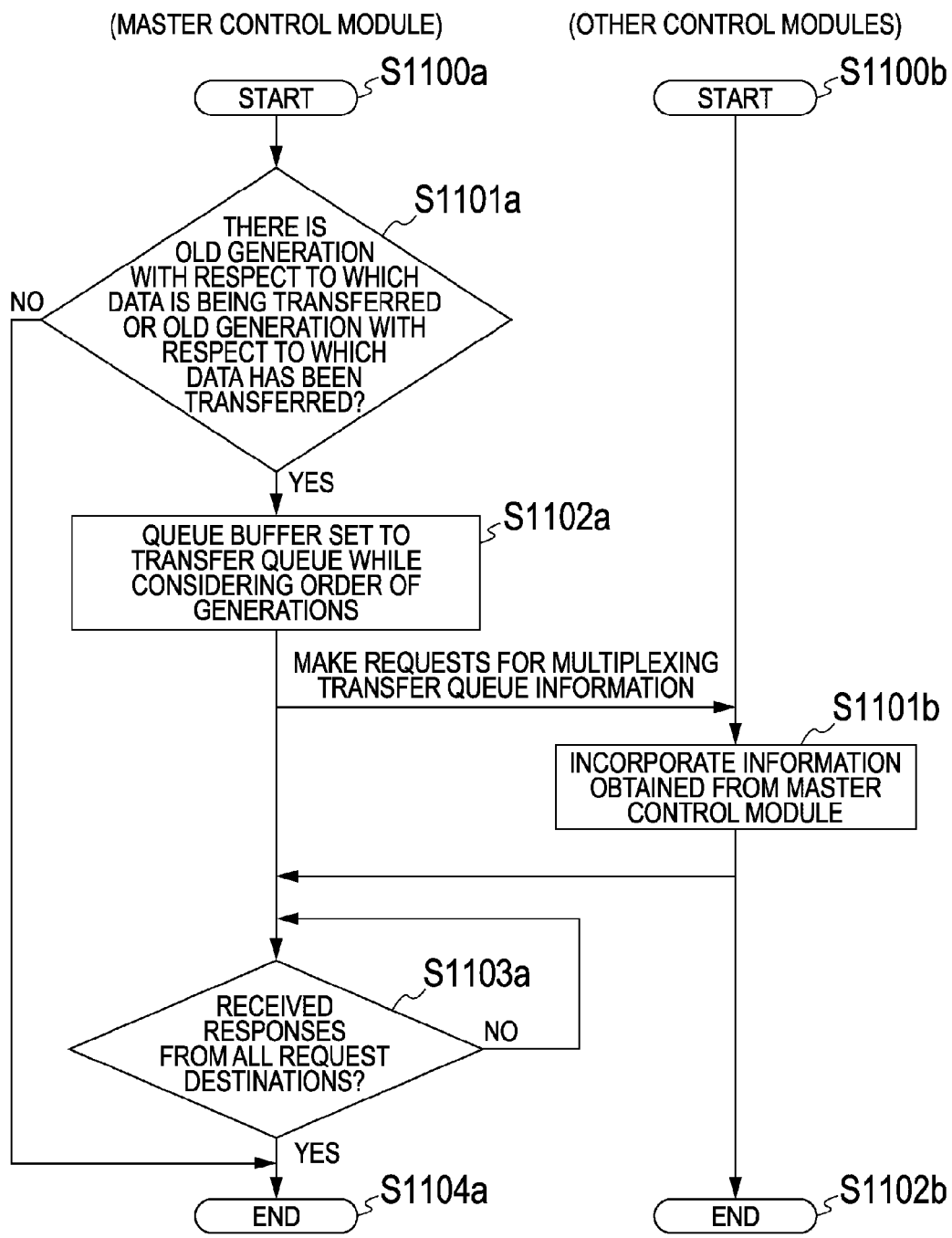

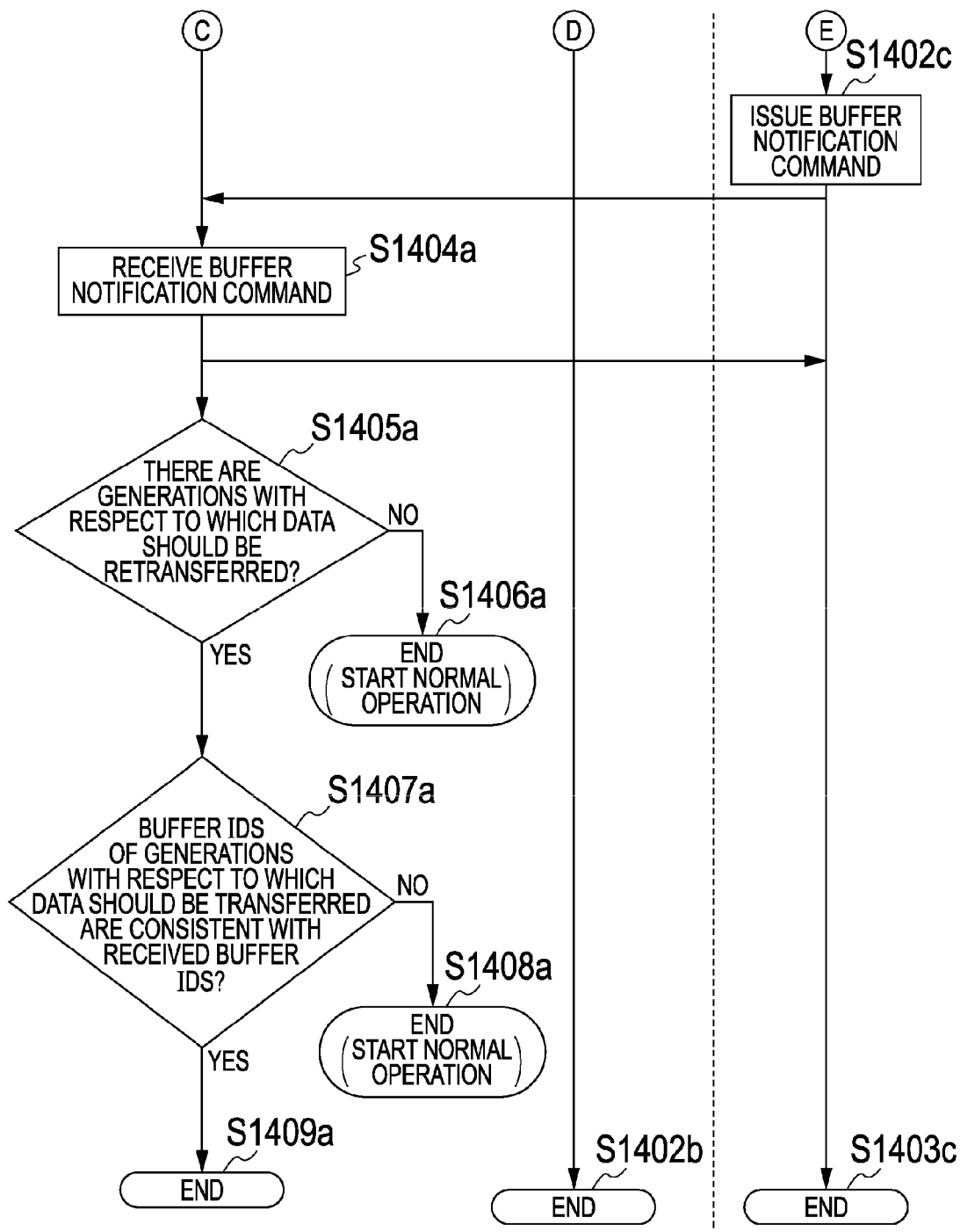

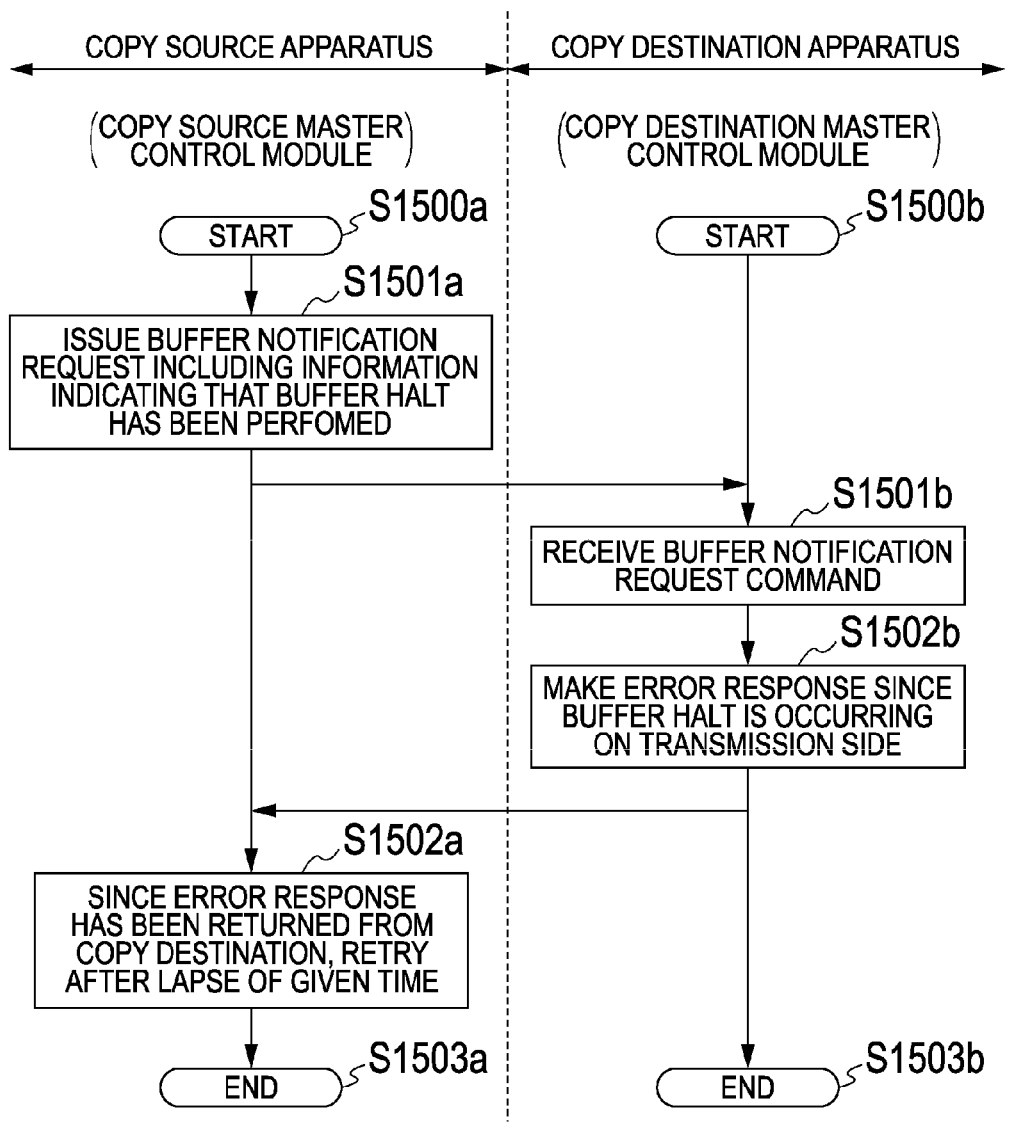

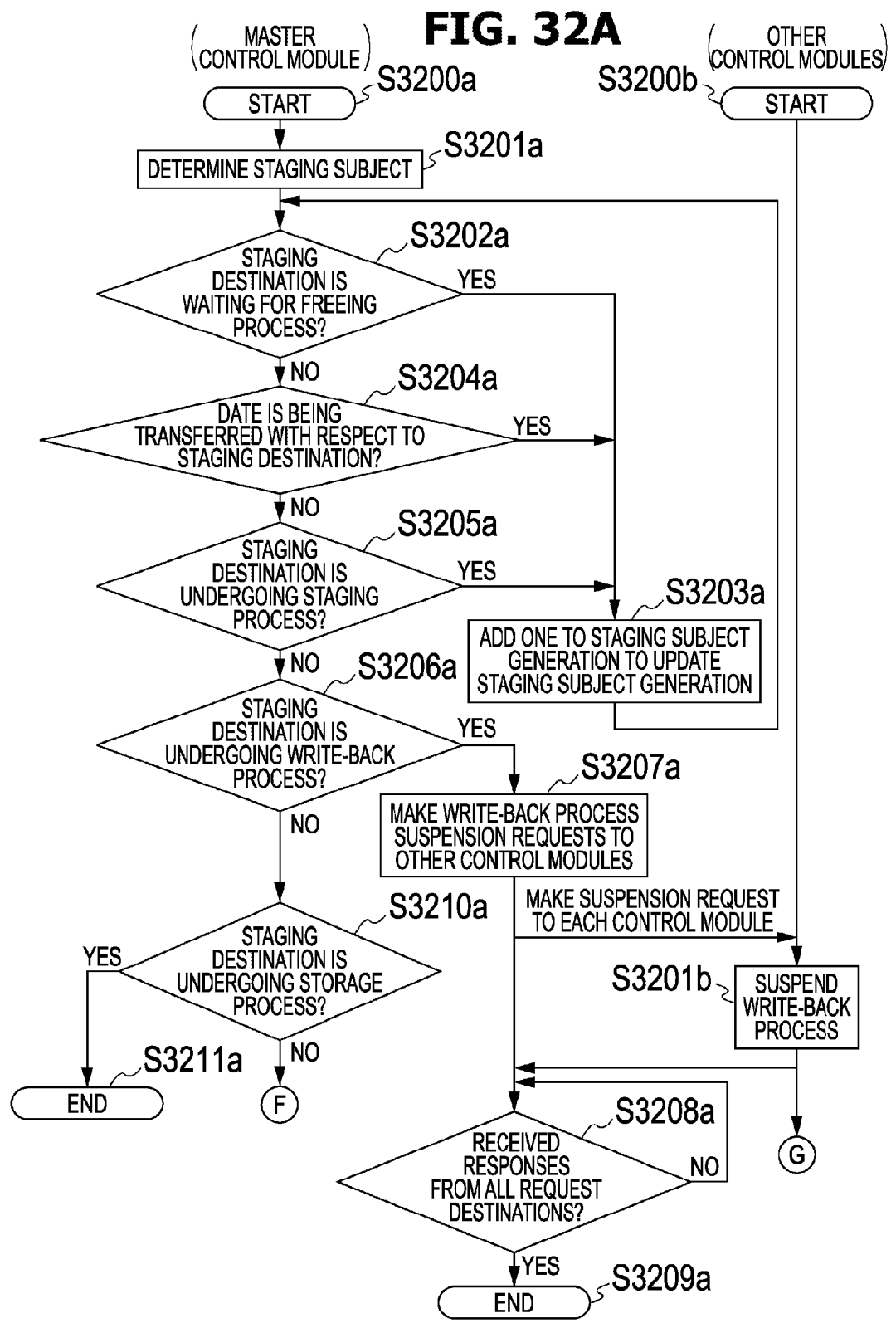

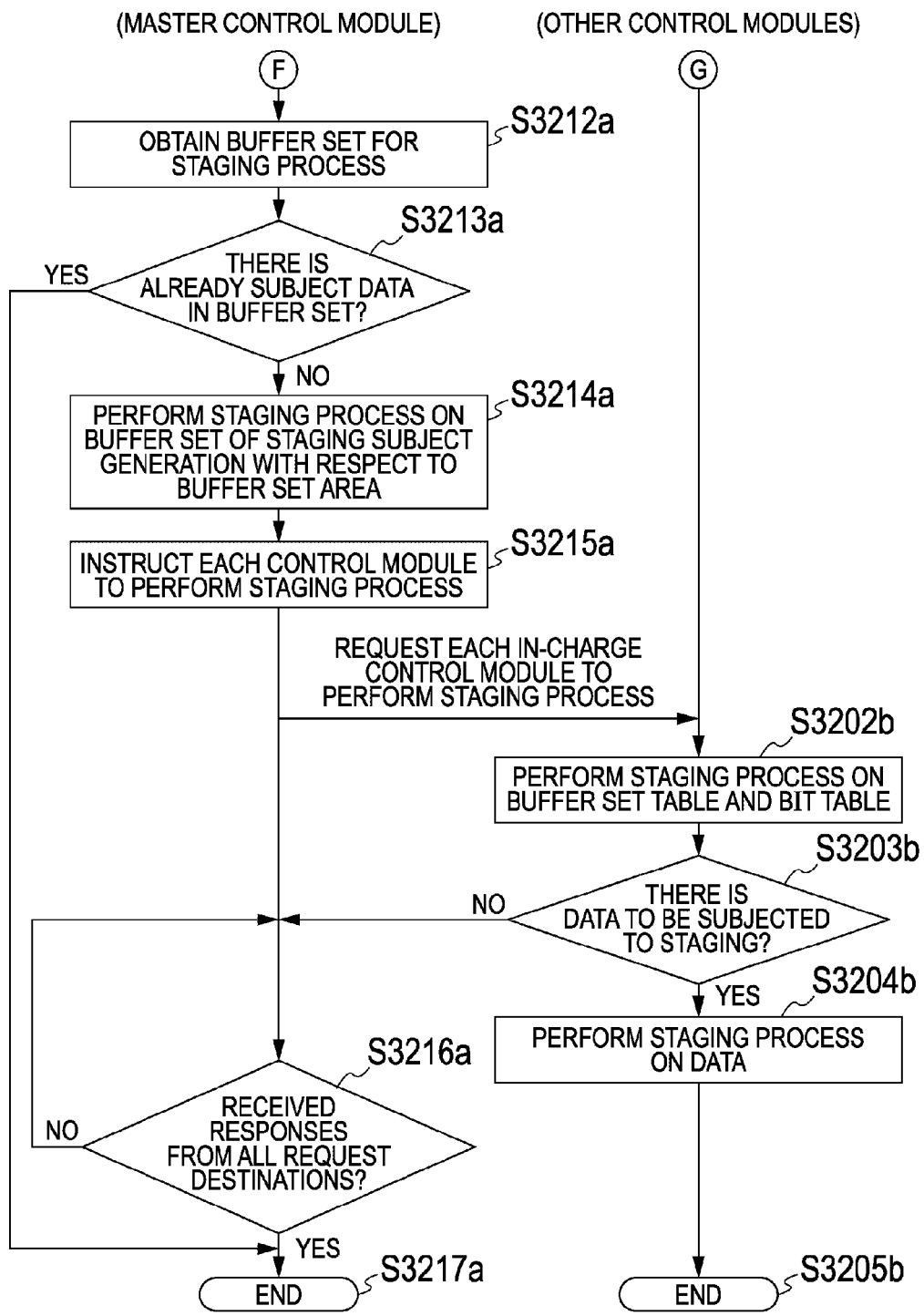

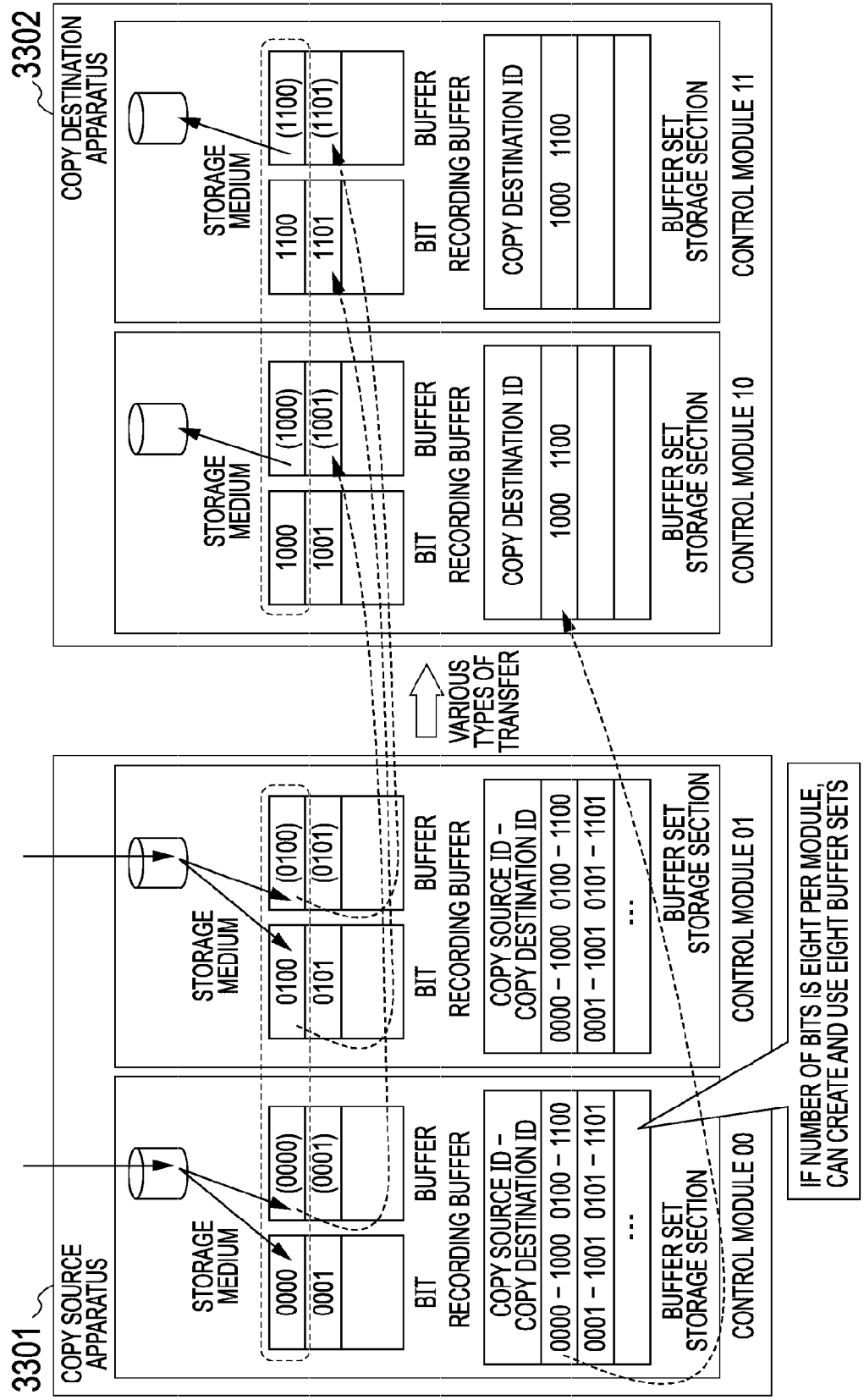

STORAGE SYSTEM CONTROL METHOD

CROSS-REFERENCE TO RELATED APPLICATION

This application is a continuation of application Ser. No. 12/510,480 filed Jul. 28, 2009 and is based upon and claims the benefit of priority of the prior Japanese Patent Application No. 2008-198852, filed on Jul. 31, 2008 the entire contents of which are incorporated herein by reference.

FIELD

The embodiment discussed herein is related to a storage system.

BACKGROUND

RAID (redundant arrays of inexpensive disks) apparatuses adopting a distributed cache memory-type storage system have conventionally adopted a redundant configuration including multiple control modules for controlling input of data to a storage and output of data therefrom, in order to improve performance and reliability. A process of reading data from a logical volume or a process of writing data thereinto is performed with respect to each control module.

Also, in order to improve reliability and the like, such a RAID apparatus has a remote copy function, called as "advanced copy", that ensures the order. FIG. 33 is a drawing showing a related-art example of a RAID apparatus having a remote copy function that ensures the order. FIG. 33 shows a storage system that includes a RAID apparatus 3301 including control modules 00 and 01 and a RAID apparatus 3302 including control modules 10 and 11.

Each RAID apparatus includes: a recording buffer including a buffer for temporarily storing data stored in a storage medium or to be stored therein in areas obtained by dividing the buffer into multiple parts and a BIT (buffer index table) for storing indexes assigned to data stored in the buffer for each area; a buffer set storage section for storing buffer sets formed by combinations of one or two or more buffers included in a copy source apparatus where data to be copied is stored and one or two or more buffers included in a copy destination apparatus where data transmitted from the copy source apparatus is stored; and a storage medium for storing data.

When performing a remote copy that ensures the order, the copy source apparatus reads data to be copied from the storage medium and stores the read data in the recording buffer sequentially. When all areas of the recording buffer is exhausted or when a given time has elapsed, the copy source apparatus collectively transmits (hereafter, this transmission method will be referred to as "collective transmission method") the data of the recording buffer to the copy destination apparatus 3302 connected to the copy source apparatus via a network on the basis of the buffer sets. At this time, the copy source apparatus also transmits the buffer sets.

On the other hand, when the copy destination apparatus 3302 receives the data from the copy source apparatus 3301, it temporarily stores the data in the recording buffer. Also, the copy destination apparatus 3302 stores the received buffer sets in its own buffer set storage section. When receiving all data, the copy destination apparatus 3302 loads the data of the recording buffer into a predetermined recording medium.

As seen above, the copy source apparatus 3301 transmits data by means of collective transmission method using the recording buffer so as to control the buffer sets collectively, while the copy destination apparatus 3302 loads the data on a buffer set-by-buffer set basis. Thus, the order is ensured.

FIG. 33 shows an example of a case where the number of control modules in the copy source apparatus 3301 is equal to that in the copy destination apparatus 3302 and the number of recording buffers included in the control modules in the copy source apparatus 3301 is equal to that in the copy destination apparatus 3302.

Similarly, if the number of control modules in the copy destination apparatus 3302 is larger than that in the copy source apparatus 3301 and the number of recording buffers included in the control modules in the copy destination apparatus 3302 is larger than that in the copy source apparatus 3301, it is possible to effectively use all the buffer sets of the copy source apparatus 3301.

However, there has been a problem that if the number of control modules in the copy source apparatus 3301 is larger than that in the copy destination apparatus 3302 and the number of recording buffers included in the control modules in the copy source apparatus 3301 is larger than that in the copy destination apparatus 3302, it is not possible to effectively use all the buffer sets of the copy source apparatus 3301.

FIG. 34 is a drawing showing an example of a case where the number of control modules in a copy source apparatus is larger than that in a copy destination apparatus. FIG. 34 shows a storage system including a RAID apparatus 3301 including control modules 00, 01, 02, and 03 and a RAID apparatus 3302 including control modules 10, and 11.

As in FIG. 33, each RAID apparatus includes: a recording buffer including a buffer for temporarily storing data stored in a storage medium or to be stored therein in areas obtained by dividing the buffer into multiple parts and a BIT for storing indexes assigned to data stored in the buffer for each area; a buffer set storage section for storing buffer sets formed by IDs of buffers of the copy source apparatus and IDs of buffers of the copy destination apparatus; and a storage medium for storing data.

For example, assume that the number of areas of a buffer of a control module is eight. The copy source apparatus 3301 includes four control modules, while the copy destination apparatus 3302 includes only two control modules. Therefore, if data is transmitted using the above-mentioned collective transmission method, the number of areas that can be used effectively among the areas of a buffer of a control module of the copy source apparatus 3301 is four, which is half, so the remaining buffer is not available.

In relation to the above-mentioned technology, there is known a back-up apparatus that is included in a disk array system and that monitors the use situation of a write buffer for temporarily storing write data, writes information stored in the buffer into a separately prepared, high-speed disk system when free space of the buffer is reduced, and writes back the sheltered data into the buffer when the use situation is improved. The related art is disclosed in Japanese Laid-open Patent Publication No. 2006-268420.

Also, there is known a virtually-ordered write method of, by achieving a low wait time with respect to a write performed by each host regardless of the distance between a primary apparatus and a secondary apparatus, providing consistency (recoverability) of the secondary apparatus at the time of a failure. The related art is disclosed in Japanese Laid-open Patent Publication No. 2006-523890.

Also, there is known a data copy method change method of, in a system including a control calculator, a host calculator, and first and second storage apparatuses, monitoring such as a variation in amount of access to the first storage apparatus by the host calculator when maintaining replica data of the first storage apparatus in the second storage apparatus by performing a remote data copy, and instructing the storage apparatuses to change the remote data copy method in accordance with the variation by using the control calculator. The related art is disclosed in Japanese Laid-open Patent Publication No. 2006-236019.

Also, there is known a storage system having a remote copy function that ensures the order assurance while maintaining superiority of scalability of a distributed cache memory-type storage system. The related art is disclosed in Japanese Laid-open Patent Publication No. 2006-260292.

Also, there is known a storage apparatus that prevents interruption of an application process by securing a reserved buffer for remote copy in advance and avoiding a buffer shortage in a communication performed using the buffer reservation subject. The related art is disclosed in Japanese Laid-open Patent Publication No. 2005-122235.

Also, there is known an inter-disk array apparatus remote data copy method of reducing overhead of the transmission protocol of update data and realizing a data update order ensuring function and a copy stop function. The related art is disclosed in Japanese Laid-open Patent Publication No. 2003-167684.

SUMMARY

According to an aspect of the invention, an apparatus for copying data to another apparatus including a receiving buffer, includes: a transmitting buffer including a plurality of areas for temporary storing data of the copying; and a processor for executing a process, including: receiving information indicative of an instantaneous vacant area of the receiving buffer of the another apparatus, the vacant area being capable of temporarily storing data that could be transmitted from the transmitting buffer, determining an area of the transmitting buffer that stores data to be transmitted subsequently in reference to the information of the vacant area, and transmitting data stored in the determined area of the transmitting buffer to the receiving buffer of the another apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 is a flowchart showing specific processes of a copy destination buffer assignment process according to this embodiment.

FIG. 11 is a flowchart showing a process of determining a buffer set transfer process in a copy source apparatus after a path closed state is eliminated according to this embodiment.

FIG. 14B is a flowchart showing the empty buffer ID acquisition process and the buffer set transfer restart process performed after a path closed state is eliminated according to this embodiment.

FIG. 15 is a flowchart showing the empty buffer ID acquisition process and the buffer set transfer restart process performed after a path closed state is eliminated according to this embodiment.

FIG. 32A is a flowchart showing a staging process according to this embodiment.

FIG. 32B is a flowchart showing the staging process according to this embodiment.

FIG. 33 is a drawing showing a related-art example of a RAID apparatus having a remote copy function that ensures the order.

DESCRIPTION OF EMBODIMENT

Figure 1:
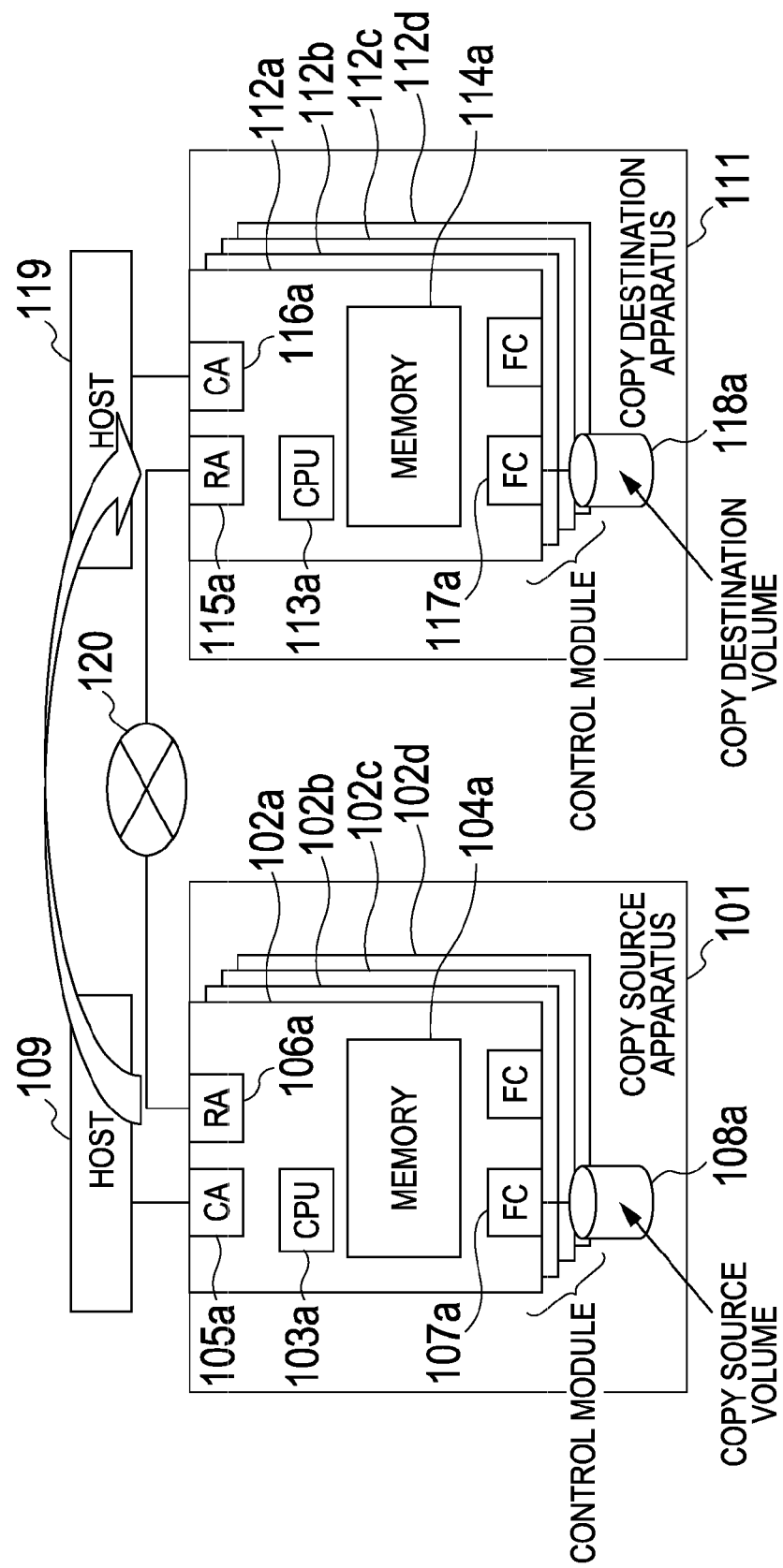
FIG. 1 is a drawing showing an outline of a configuration of a storage system according to this embodiment.

Hereafter, one example of an embodiment will be described on the basis of FIGS. 1 to 33. FIG. 1 is a drawing showing an outline of a configuration of a storage system 100 according to this embodiment. The storage system 100 shown in FIG. 1 is a distributed cache memory-type storage system that includes a RAID apparatus 101 including control modules 102a, 102b, 102c, and 102d, and a RAID apparatus 111 including control modules 112a, 112b, 112c, and 112d.

The control module 102a includes a CPU (central processing unit (processor)) 103a for operating the control module 102a by executing a predetermined program command, a memory 104a used as a BIT, a recording buffer, a buffer set storage unit, and the like to be described later, a CA (channel adapter) 105a serving as a unit for controlling the interface with a host computer (hereafter referred to as "host") 109, an RA (remote adapter) 106a serving as a unit for controlling the interface with other RAID apparatuses connected to the RAID apparatus 101 via a network or a dedicated line 120, an FC (fibre channel) 107a serving as a unit for controlling the interface with a disk drive 108a, and the disk drive 108a constituted by a storage unit such as a magnetic disk drive.

The control modules 102b, 102c, and 102d included in the RAID apparatus 101 and the control modules 112a, 112b, 112c, and 112d included in the RAID apparatus 111 also have a similar configuration.

In the above-mentioned configuration, for example, an "identification information acquisition section", a "data transfer control section", a "transfer processing section", an "evacuation control section", a "reconstruction control unit" and the like can be realized when the CPU 103a executes a program command loaded on a predetermined area on the memory 104a. For example, the CPU 103a executes a process including: receiving information indicative of an instantaneous vacant area of the receiving buffer of the another apparatus, the vacant area being capable of receiving and temporarily storing data that could be transmitted from the transmitting buffer; determining an area of the transmitting buffer that stores data to be transmitted subsequently in reference to the information of the vacant area; and transmitting data stored in the determined area of the transmitting buffer to the receiving buffer of the another apparatus.

A "transmission buffer", a "first pointer", a "second pointer", and the like can be realized by using a part of the memory 104a. An "evacuation volume" can be realized by using a part of the disk drive 108a constituted by one or two or more magnetic disk drives.

In the following embodiment, a case where a remote copy is performed from the RAID apparatus 101 to the RAID apparatus 111 will be described. In this case, the RAID apparatus 101 and RAID apparatus 111 will be referred to as a "copy source apparatus 101" and a "copy destination apparatus 111", respectively.

While a case where the RAID apparatuses 101 and 111 each include four control modules is shown in FIG. 1, the configurations of these RAID apparatuses are not limited thereto. As such, the number of CAs, that of RAs, and that of FCs are not limited the respective numbers shown FIG. 1.

Figure 2:
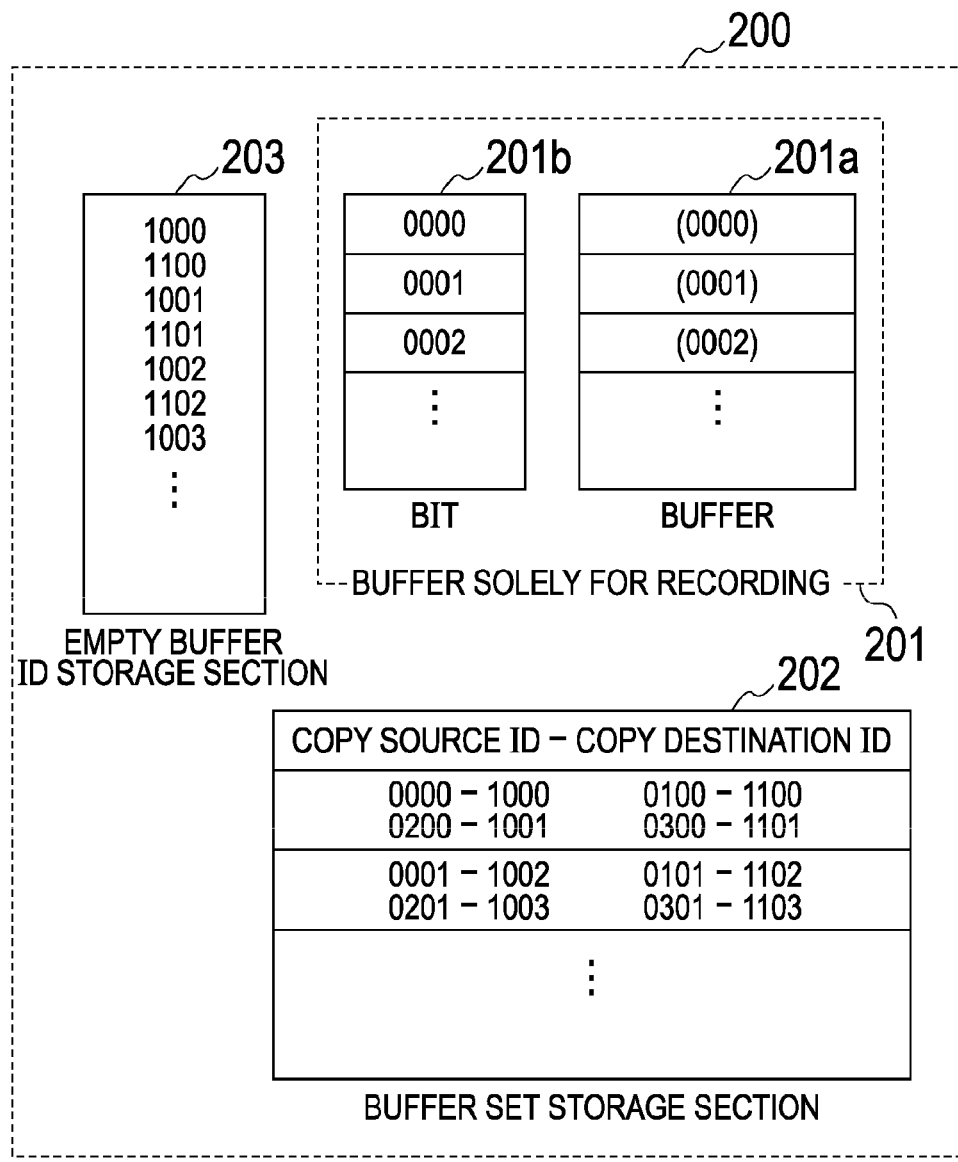
FIG. 2 is a drawing showing an example of a specific configuration of a memory included in a control module according to this embodiment.

FIG. 2 is a drawing showing an example of a specific configuration of a memory included in a control module according to this embodiment, for example, the memory 104a or memory 114a shown in FIG. 1.

As shown in FIG. 2, a memory 200 included in a control module of the RAID apparatus 101 or RAID apparatus 111 according to this embodiment includes a recording buffer 201 for temporarily storing and managing data that will be stored or has been stored in the disk drive, a buffer set storage section 202 for storing buffer sets, and an empty buffer ID storage section 203 for storing the buffer IDs of empty buffers included in the copy destination apparatus 111.

The buffer 201a is a storage section where data is managed with respect to each of multiple areas (hereafter referred to as "generations") formed by dividing the buffer into given sizes. Data (for example, write data (to be described later)) that is stored or will be stored in a disk drive such as the disk drive 108a is temporarily stored in each generation.

As for (0000), (0001), (0002), and the like described in the buffer 201a, the numbers 0000, 0001, 0002, and the like in the parentheses represent the buffer IDs assigned to the generations, and the parenthesized (0000), (0001), (0002), and the like each indicate that any data is stored in a buffer having an buffer ID represented by a parenthesized number.

A BIT 201b is a table where, for each generation of the buffer 201a, an LU (logical unit) or an LBA (logical block address) in which data stored in the generation is loaded, a data size, a copy session number, and the like are stored.

0000, 0001, 0002, and the like described in the BIT 201b represent the buffer IDs assigned to the generations of the buffer 201a. For example, 0000 in the BIT 201b indicates that an LU or an LBA where data stored in a buffer having the buffer ID 0000 is loaded, a data size, a copy session number, and the like are stored in 0000.

If a remote copy is performed between the RAID apparatuses, the buffer set storage section 202 stores combinations (hereafter referred to as "buffer sets") of the buffer IDs (hereafter referred to as "copy source IDs") of buffers included in the copy source apparatus 101 where data to be copied is stored and the buffer IDs (hereafter referred to as "copy destination IDs") of buffers included in the copy destination apparatus 111.

If the copy source apparatus 101 and copy destination apparatus 111 each include multiple control modules as in this embodiment, the buffer sets are combinations of the buffer IDs of buffers (transmitting buffer) where data to be copied is stored and which are included in the multiple control modules of the copy source apparatus 101 and the buffer IDs of buffers (receiving buffer) where data transmitted from the copy source apparatus 101 is to be stored and which are included in the multiple control modules of the copy destination apparatus 111.

Figure 3:
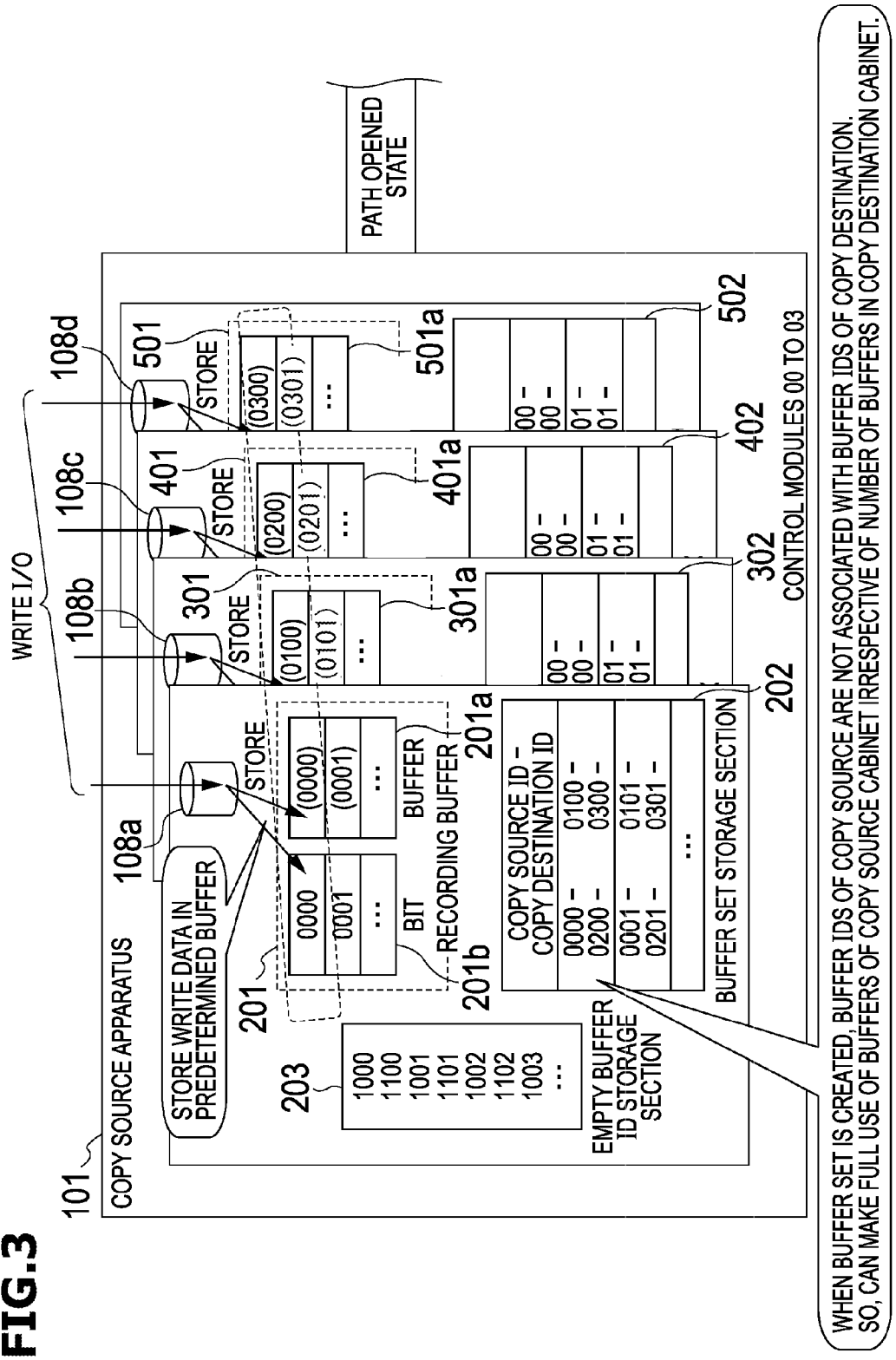
FIG. 3 is a drawing showing an outline of a remote copy process according to this embodiment.
Figure 6:
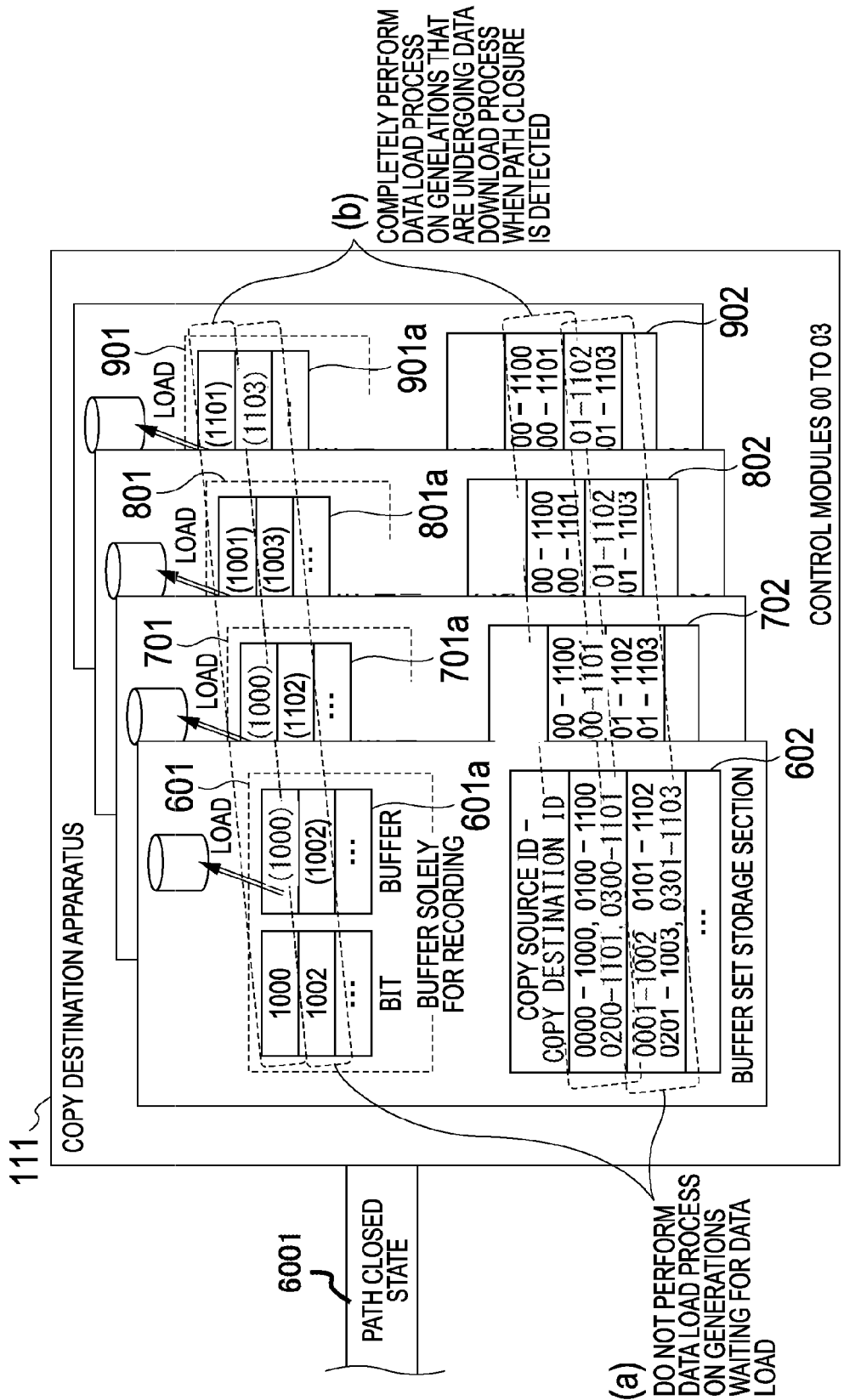
FIG. 6 is a drawing showing the outline of the remote copy process according to this embodiment.

For example, the buffer set storage section 202 described in FIG. 2 shows buffer sets in a case where control modules 00, 01, 02, and 03 included in the copy source apparatus 101 as shown in FIG. 3 each include buffers having buffer IDs 0000, 0100, 0200, and 0300 and control modules 00, 01, 02, and 03 included in the copy destination apparatus 111 as shown in FIG. 6 each include buffers having buffer IDs 1000, 1100, 1001, and 1101.

That is, there are defined a combination of the buffer ID "0000" of a buffer of the control module 00 included in the copy source apparatus 101 and the buffer ID "1000" of a buffer of the control module 00 included in the copy destination apparatus 111, a combination of the buffer ID "0100" of a buffer of the control module 01 included in the copy source apparatus 101 and the buffer ID "1100" of a buffer of the control module 01 included in the copy destination apparatus 111, a combination of the buffer ID "0200" of a buffer of the control module 02 included in the copy source apparatus 101 and the buffer ID "1001" of a buffer of the control module 02 included in the copy destination apparatus 111, a combination of the buffer ID "0300" of a buffer of the control module 03 included in the copy source apparatus 101 and the buffer ID "1101" of a buffer of the control module 03 included in the copy destination apparatus 111.

In the following description, the generation of a buffer of the recording buffer 201 in which data will be newly stored or the generation of a buffer set in relation to that buffer will be referred to as a "new generation" and the generation of a buffer of the recording buffer 201 in which data is already stored or the generation of a buffer set in relation to that buffer will be referred to as a "old generation".

The empty buffer ID storage section 203 stores the buffer IDs of empty buffers included in the copy destination apparatus 111. For example, when the copy source apparatus 101 receives notification about the buffer IDs of empty buffers from the copy destination apparatus 111 in response to a request for providing notification about empty buffer IDs made by the copy source apparatus 101, the copy source apparatus 101 stores the notified buffer IDs in the empty buffer ID storage section 203.

In the above-mentioned configuration, in the remote copy process according to this embodiment, processes such as storage of write data into the recording buffer 201 performed in the copy source apparatus 101, transfer of the data to the copy destination apparatus 111, and load of the transferred data into the disk drive 118*a* performed in the copy destination apparatus 111 are collectively performed on a buffer set-by-buffer set basis. Thus, the order of the whole storage system is ensured.

The copy source apparatus 101 according to this embodiment monitors the state of the network between the copy source apparatus 101 and copy destination apparatus 111 and controls a remote copy process performed between the copy source apparatus 101 and copy destination apparatus 111 in accordance with the state of the network. The remote copy process is shown, for example, in FIGS. 11, 12, 14A, 14B, and 15.

Also, the copy source apparatus 101 according to this embodiment determines buffer sets immediately before data is transferred from the copy source apparatus 101 to the copy destination apparatus 111. That is, immediately before transferring data, the copy source apparatus 101 associates buffers of the copy source apparatus 101 where the data to be transferred is stored with buffers of the copy destination apparatus 111 to which the data is to be transferred. This embodiment may determine buffer sets upon transferring data from the copy source apparatus 101 to the copy destination apparatus 111.

As a result, when the copy source apparatus 101 stores write data or the like in buffers thereof, it does not need to secure buffers of the copy destination apparatus 111 to which the data is to be transferred. Therefore, even if the copy destination apparatus, which is the transfer destination, does not have empty buffers, the copy source apparatus 101 can perform a process of storing the write data or the like in buffers thereof.

When empty buffers occur in the copy destination apparatus 111, the copy source apparatus 101 determines buffer sets in this stage and transfers the data to the copy destination apparatus 111. Thus, even if the number of buffers included in the copy destination apparatus 111 is smaller than that in the copy source apparatus 101, it is possible to perform a remote copy process while effectively using buffers of the copy source apparatus 101.

That is, even if the size of buffers included in the copy destination apparatus 111 is inconsistent with the size of buffers included in the copy source apparatus 101, it is possible to perform a remote copy process while effectively using the buffers.

(Outline of Remote Copy Process According to this Embodiment)

The outline of the remote copy process according to this embodiment will be described on the basis of FIGS. 3 to 8. FIGS. 3 to 6 and FIG. 8 are drawings of the states of the recording buffer 201, buffer set storage section 202, and empty buffer ID storage section 203 of the copy source apparatus 101 or copy destination apparatus 111 during a remote copy process.

When the copy source apparatus 101 receives, for example, a write I/O command from the host 109, the control module 00, 01, 02, or 03, which has received the write I/O command, stores the write data in the disk drive 108*a*, 108*b*, 108*c*, or 108*d* included in the control module in accordance with the write I/O command.

Simultaneously, as shown in FIG. 3, the control module 00, 01, 02, or 03 that has received the write I/O command stores the write data received along with the command in a predetermined generation of the buffer 201*a*, 301*a*, 401*a*, or 501*a* and stores, in the BIT 201*b*, 301*b*, 401*b*, or 501*b* an index assigned to the generation in which the write data is stored.

Also, the copy source apparatus 101 sets only a copy source ID at the buffer set storage section 202 and thus creates a buffer set where a copy destination ID has yet to be determined.

On the other hand, the copy source apparatus 101 makes a request for providing notification about an empty buffer, to the copy destination apparatus 111. When receiving, from the copy destination apparatus 111, notification about a buffer that has become empty, the copy source apparatus 101 stores an empty buffer ID corresponding to the empty buffer in the empty buffer ID storage section 203.

As seen above, in the remote copy process according to this embodiment, only the copy source ID is set in the buffer set storage section when a buffer set is created and therefore a copy destination ID is not set. That is, a process of matching a copy source buffer with a copy destination buffer is performed not when a buffer set is created but immediately before data in the buffer is transferred to the transfer destination, as described later.

Thus, the buffers included in the copy source apparatus 101 can be used effectively. As a result, even if the number of buffers included in the copy destination apparatus is smaller than that in the copy source apparatus, it is possible to effectively use the buffers of the copy source apparatus.

Figure 4:
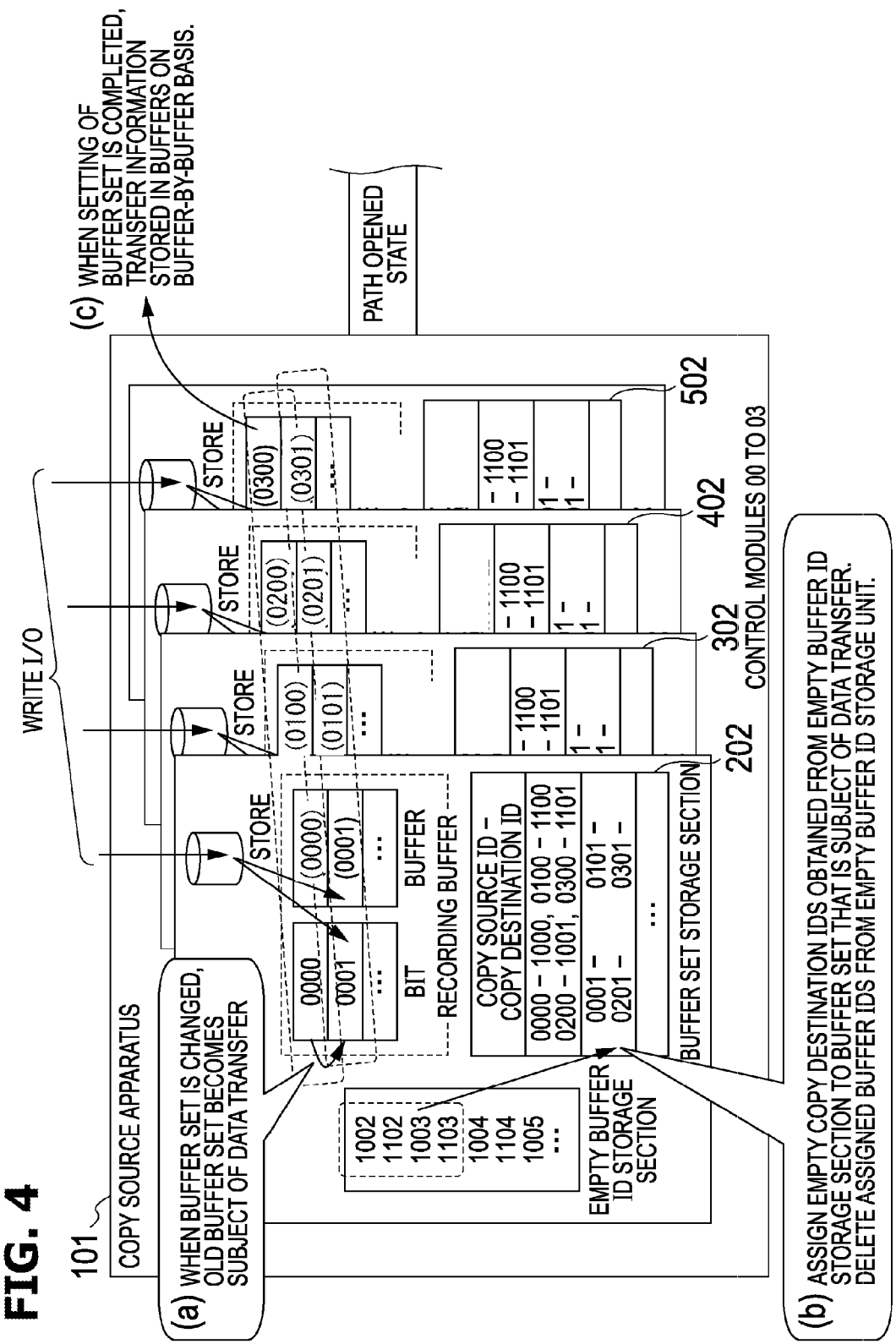
FIG. 4 is a drawing showing the outline of the remote copy process according to this embodiment.

As shown in FIG. 4, (a) when a given time has elapsed since a buffer set became the subject of data storage or when the buffer set no longer has areas where data should be stored, the copy source apparatus 101 performs a "buffer set change" where the next buffer set is changed to the subject of data storage. When the buffer set change is performed, the old buffer set becomes the subject of data transfer.

Also, (b) the copy source apparatus 101 assigns empty copy destination IDs obtained from the empty buffer ID storage section 203 to the buffer set that is the subject of data transfer. Then, the assigned buffer IDs are deleted from the empty buffer ID storage section 203.

Specifically, when performing a buffer set change, the copy source apparatus 101 refers to the empty buffer ID storage section 203 to obtain a number of empty buffer IDs according to the buffer set that is the subject of data transfer. Then, the copy source apparatus 101 sets the obtained empty buffer IDs at the copy destination IDs of the buffer set storage section 202 in a buffer set that has become the subject of data transfer due to the buffer set change.

(c) When the setting (the above-mentioned processes (a) and (b)) of the buffer set is completed, the copy source apparatus 101 transfers data stored in the buffers on a buffer-by-buffer basis.

The copy source apparatus 101 deletes, from the empty buffer ID storage section 203, the empty buffer IDs obtained therefrom. If the copy source apparatus 101 cannot obtain the number of empty buffer IDs according to the buffer set that is the subject of data transfer from the empty buffer ID storage section 203, it suspends the buffer transfer process until it can obtain the number of empty buffer IDs according to the buffer set that is the subject of data transfer.

In addition to the above-mentioned process, a process to be described below will be performed in the remote copy process according to this embodiment.

Figure 5:
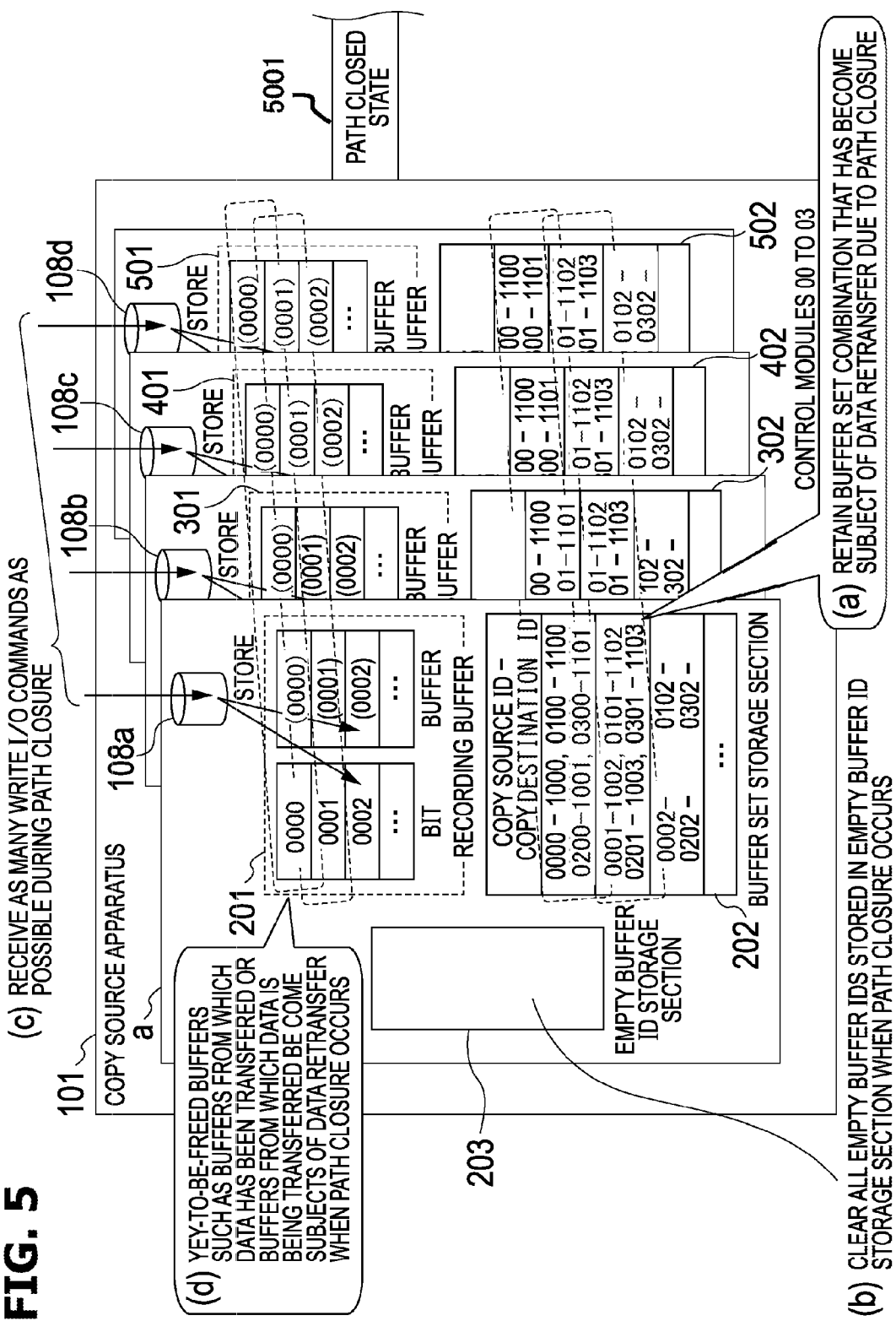
FIG. 5 is a drawing showing the outline of the remote copy process according to this embodiment.

The copy source apparatus 101 according to this embodiment monitors the state of the network 5001 between the copy source apparatus 101 and copy destination apparatus 111. As shown in FIG. 5, when the copy source apparatus 101 detects that the data transfer path between the apparatuses is placed in a closed state (hereafter referred to as a "path closed state"), it retains the combination of a buffer set that has become the subject of data retransfer due to the path closure. That is, the copy source apparatus 101 retains the state of the recording buffer 201 and that of the buffer set storage section 202. Also, the copy source apparatus 101 clears all empty buffer IDs stored in the empty buffer ID storage section 203.

Also, when the copy source apparatus 101 receives a write I/O command from the host 109 in the path closed state, (c) it receives as many write I/O commands as possible. Then, the copy source apparatus 101 stores write data in the recording buffer 201, 301, 401, or 501.

For example, when receiving a write I/O command from the host 109 in the path closed state, the copy source apparatus 101 sequentially stores data in buffers of the control modules. For example, in a control module a shown in FIG. 5, data is sequentially stored in a buffer 0002, a buffer 0003, ..., and a buffer 0007 of the recording buffer 201. If all the buffers of the recording buffer of any control module have been used to store data in the path closed state, the copy source apparatus 101 performs a buffer halt process where the data stored in the buffers is written back to a bitmap of each session in accordance with BIT information.

Therefore, if the path closed state is eliminated before the recording buffer 201 is exhausted, an influence on the host 109 is restrained.

As a result, even if path closure occurs temporarily, as many write I/O commands as possible can be accumulated in the copy source apparatus 101. Also, if the buffers are not exhausted before the path is reopened, transmission of data accumulated during the path closure can be restarted when transfer of a buffer is restarted. This makes it possible to ensure the order or to continue the remote copy.

Also, (d) the copy source apparatus 101 handles, as the subject of data retransfer, a buffer set that has been placed in a non-freed buffer state such as a state in which transfer of data from the buffer has been completed or a state in which data is being transferred when a path closed state is detected, and transfers data from the buffer set again after the path closed state is eliminated.

Like the copy source apparatus 101, the copy destination apparatus 111 monitors the state of a network 6001 between the copy source apparatus 101 and copy destination apparatus 111. As shown in FIG. 6, when detecting a path closed state, the copy destination apparatus 111 (*a*) does not perform a load process with respect to a generation waiting for load. For example, as for a buffer set with respect to which "data "is being transferred" or "data has been transferred and the buffer is waiting to be freed", the copy destination apparatus 111 does not load data stored in buffers of a recording buffer 601, 701, 801, or 901 into a disk drive, retains the contents of a buffer set storage section 602, 702, 802, or 902, and waits for the copy source apparatus 101 to perform retransfer while leaving the matching with the copy source IDs intact. Then, the copy destination apparatus 111 is placed on standby until the copy source apparatus 101 issues an "empty buffer notification request command" requesting notification about the IDs of buffers that have become empty.

(b) As for a generation that is undergoing a loading process when a path closed state is detected, the copy destination apparatus 111 performs the loading process until completion. That is, if a process of loading data stored in the recording buffer 601, 701, 801, or 901 into a disk drive is under way when a path closed state is detected, the copy destination apparatus 111 continuously performs the loading process until completion.

While the copy destination apparatus 111 shown in FIG. 6 may also include an empty buffer ID storage section 203, an illustration of the empty buffer ID storage section 203 is omitted to simplify the explanation. However, the omission of an illustration is not intended to limit the present invention to the configuration shown in FIG. 6.

Figure 7:
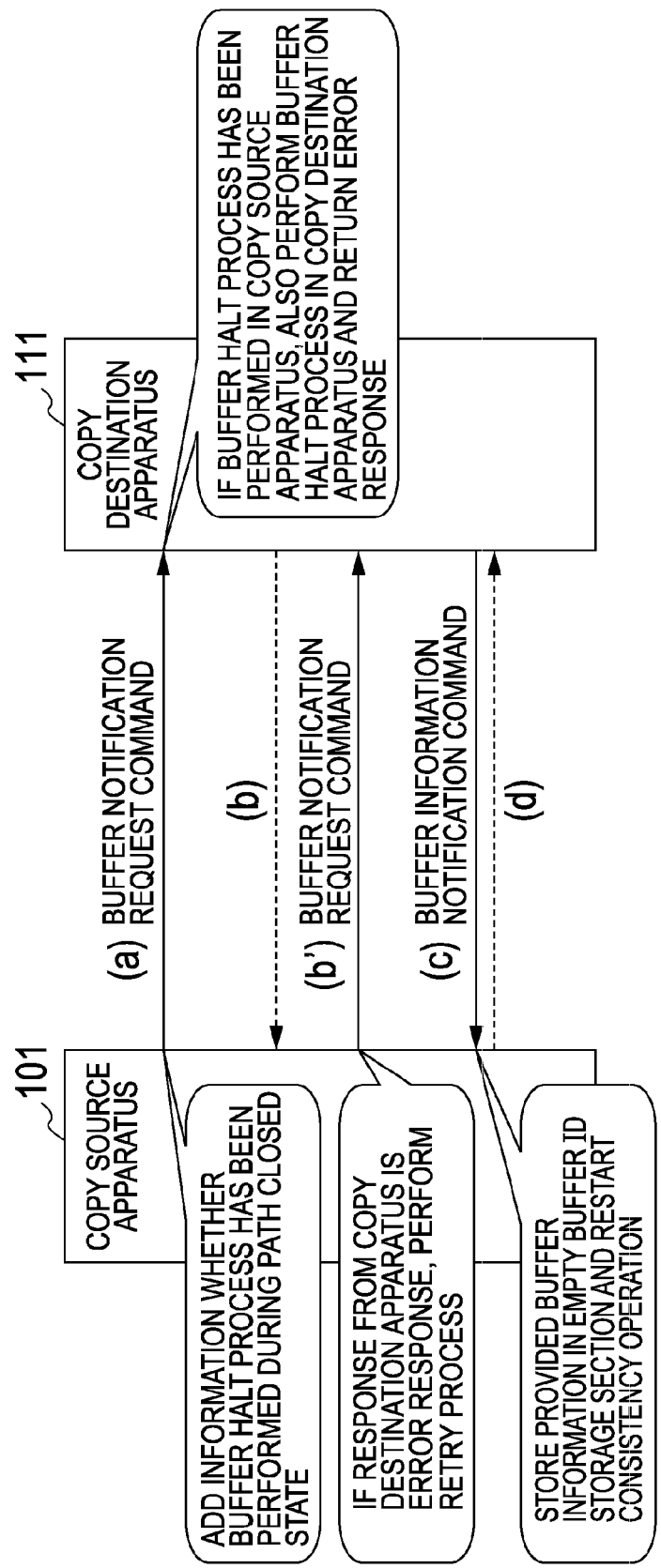
FIG. 7 is a drawing showing the outline of the remote copy process according to this embodiment.

FIG. 7 is a drawing showing a remote copy process performed between the copy source apparatus 101 and copy destination apparatus 111 when a path closed state is eliminated.

(a) When a path closed state is eliminated, the copy source apparatus 101 issues a buffer notification request command to the copy destination apparatus 111. At this time, the copy source apparatus 101 adds, to the buffer notification request command, information whether a buffer halt process has been performed during the path closed state.

(b) When receiving the buffer notification request command, the copy destination apparatus 111 refers to whether a buffer halt process has been performed during the path closed state, provided along with the command. If a buffer halt process has been performed in the copy source apparatus 101, the copy destination apparatus 111 also perform a buffer halt process and returns an error response to the copy source apparatus 101. When completing the buffer halt process, the copy destination apparatus 111 is again placed in a state where it is waiting to receive a buffer notification request command from the copy source apparatus 101.

On the other hand, if the response from the copy destination apparatus 111 is an error response, the copy source apparatus 101 performs a retry process. That is, the copy source apparatus 101 issues a buffer notification request command to the copy destination apparatus 111 again.

(c) If no buffer halt process has been performed in the copy source apparatus 101, the copy destination apparatus 111 issues a buffer information notification command to the copy source apparatus 101 to provide buffer information such as empty buffer IDs to the copy source apparatus 101 and restarts the remote copy process.

(d) The copy source apparatus 101 stores the provided buffer information in the empty buffer ID storage section and restarts a consistency operation. That is, the copy source apparatus 101 stores empty buffer IDs provided by the copy destination apparatus 111 in the empty buffer ID storage section 203. Then, the copy source apparatus 101 confirms that the provided empty buffer IDs are not inconsistent with copy destination IDs of a buffer set retained in the buffer set storage section 202 as the subject of data retransfer, and then restarts the remote copy process and returns a normal response to the copy destination apparatus 111.

Figure 8:
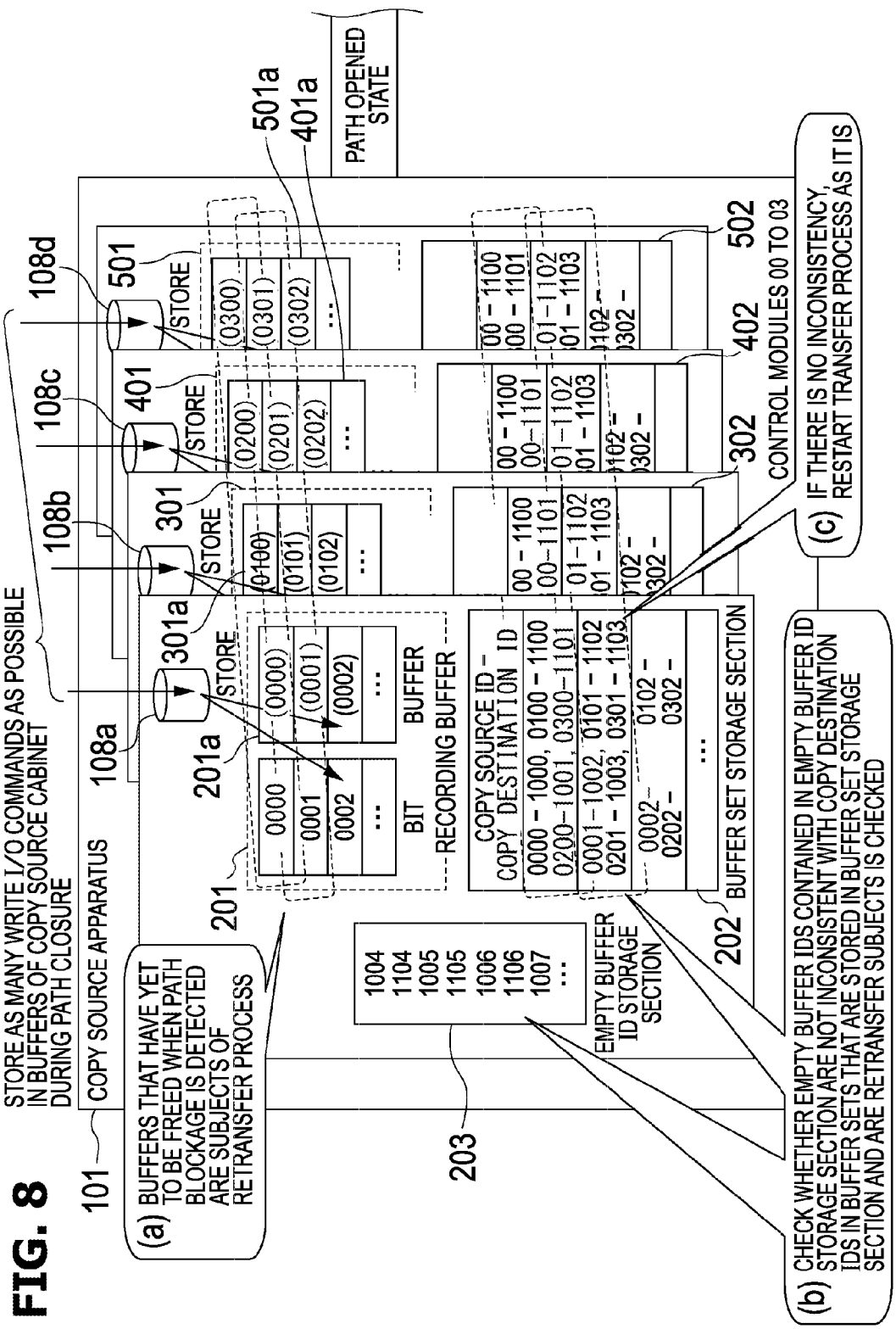
FIG. 8 is a drawing showing the outline of the remote copy process according to this embodiment.

The then states of the recording buffer 201, buffer set storage section 202, and empty buffer ID storage section 203 of the copy source apparatus 101 are shown in FIG. 8.

When the path closed state is eliminated and empty buffer IDs are provided by the copy destination apparatus 111, the copy source apparatus 101 stores the empty buffer IDs in the empty buffer ID storage section 203.

Here, (a) the copy source apparatus 101 handles, as the subject of a retransfer process, a buffer from which data has been transferred when a path closed state is detected and that has yet to be freed or a buffer that has yet to be freed due to such as ongoing data transfer therefrom when a path closed state is detected. Since such a buffer becomes the subject of a retransfer process, an area that becomes the subject of a retransfer process is not freed and the contents of the recording buffer 201 are retained.

For example, FIG. 8 shows a case where a buffer set formed by combining (0000-1000), (0100-1100), (0200-1001), and (0300-1101) as (copy source ID-copy destination ID) and a buffer set formed by combining (0001-1002), (0101-1102), (0201-1003), and (0301-1103) as (copy source ID-copy destination ID), which are buffer sets stored in each of the buffer set storage sections 202, 302, 402, and 502, are the subjects of retransfer.

Here, 0000 and 0001, 0100 and 0101, 0200 and 0201, and 0300 and 0301 are the buffer IDs of the buffers 201a, 301a, 401a, and 501a of the control modules 00, 01, 02, and 03, respectively, included in the copy source apparatus 101.

Also, 1000 and 1002, 1100 and 1102, 1001 and 1003, and 1101 and 1103 are the buffer IDs of the buffers 601a, 701a, 801a, and 901a of the control modules 00, 01, 02, and 03, respectively, included in the copy destination apparatus 111 shown in FIG. 6.

Note that the recording buffer 201, 301, 401, and 501 are shown in FIG. 8 in such a manner that a part of the buffer IDs thereof is omitted. Also, in the buffer set storage sections 202, 302, 402, and 502, copy source IDs (for example, 0002, 0102, 0202, 0302) are stored as a part of a buffer set.

(b) When detecting reopening of the path, the copy source apparatus 101 refers to the empty buffer ID storage section 203 to confirm that the empty buffer IDs included in the empty buffer ID storage section 203 do not overlap the copy destination IDs that is stored in the buffer set storage section 202 and is the subject of data retransfer.

If the copy source apparatus 101 determines that the empty buffers ID overlap the copy destination IDs and thus inconsistency has occurred, it obtains a new empty buffer IDs from the copy destination apparatus 111 so that no inconsistency occurs from the empty buffer ID storage section 203, and sets the obtained new empty buffer IDs at the copy destination IDs.

(c) If the copy destination IDs in the buffer set that is the subject of data retransfer and the empty buffer IDs provided by the copy destination apparatus 111 are identical to those before the path closure occurs, that is, if there is no inconsistency, such as overlap between the empty buffer IDs included in the empty buffer ID storage section 203 and the copy destination IDs in the buffer set that is stored in the buffer set storage section 202 and is the subject of data retransfer, the copy source apparatus 101 restarts the transfer process (remote copy process) as it is. Also, if inconsistency is eliminated, the copy source apparatus 101 restarts the transfer process.

Figure 9A:
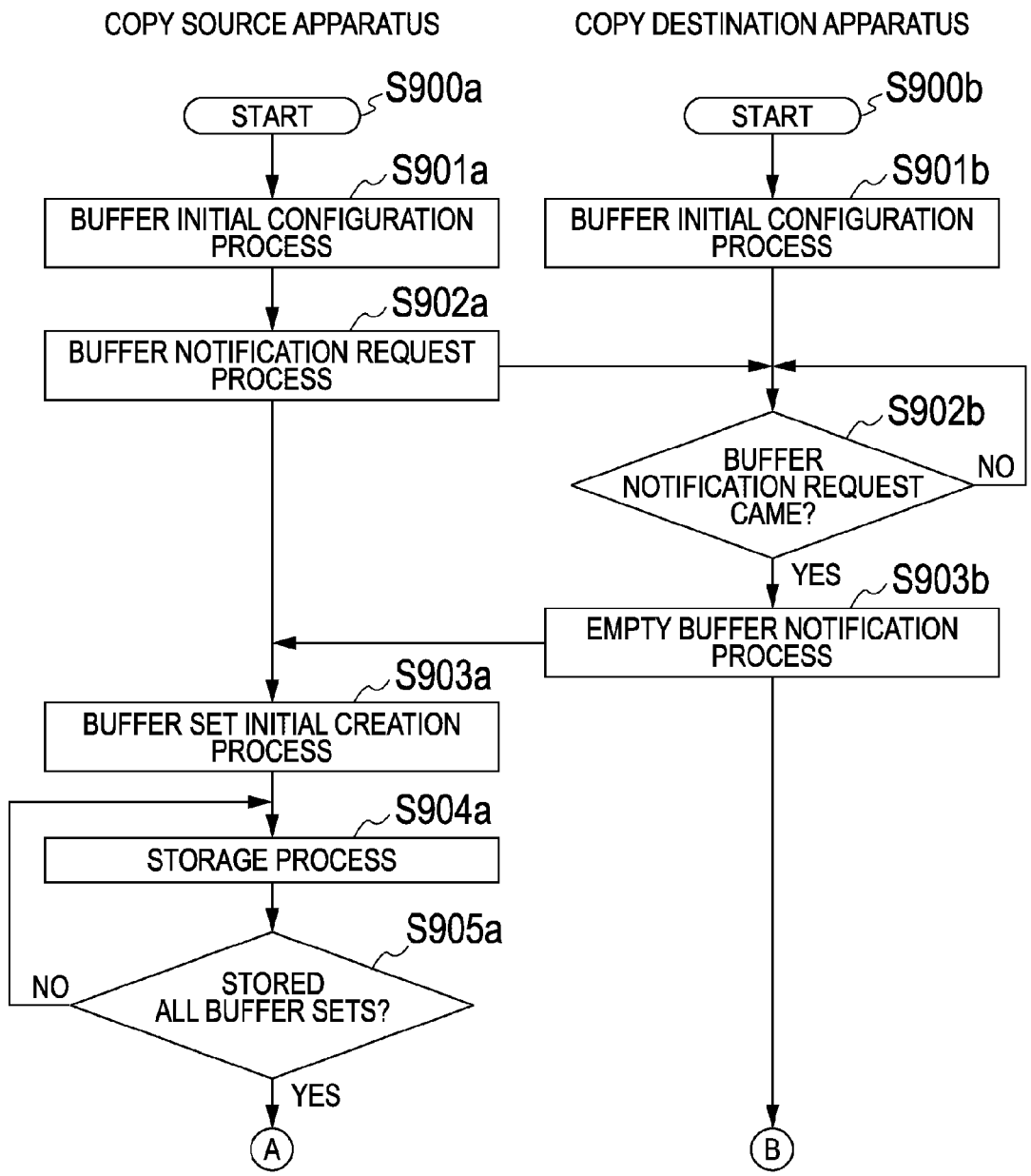
FIG. 9A is a flowchart showing the outline of the remote copy process according to this embodiment.
Figure 9B:
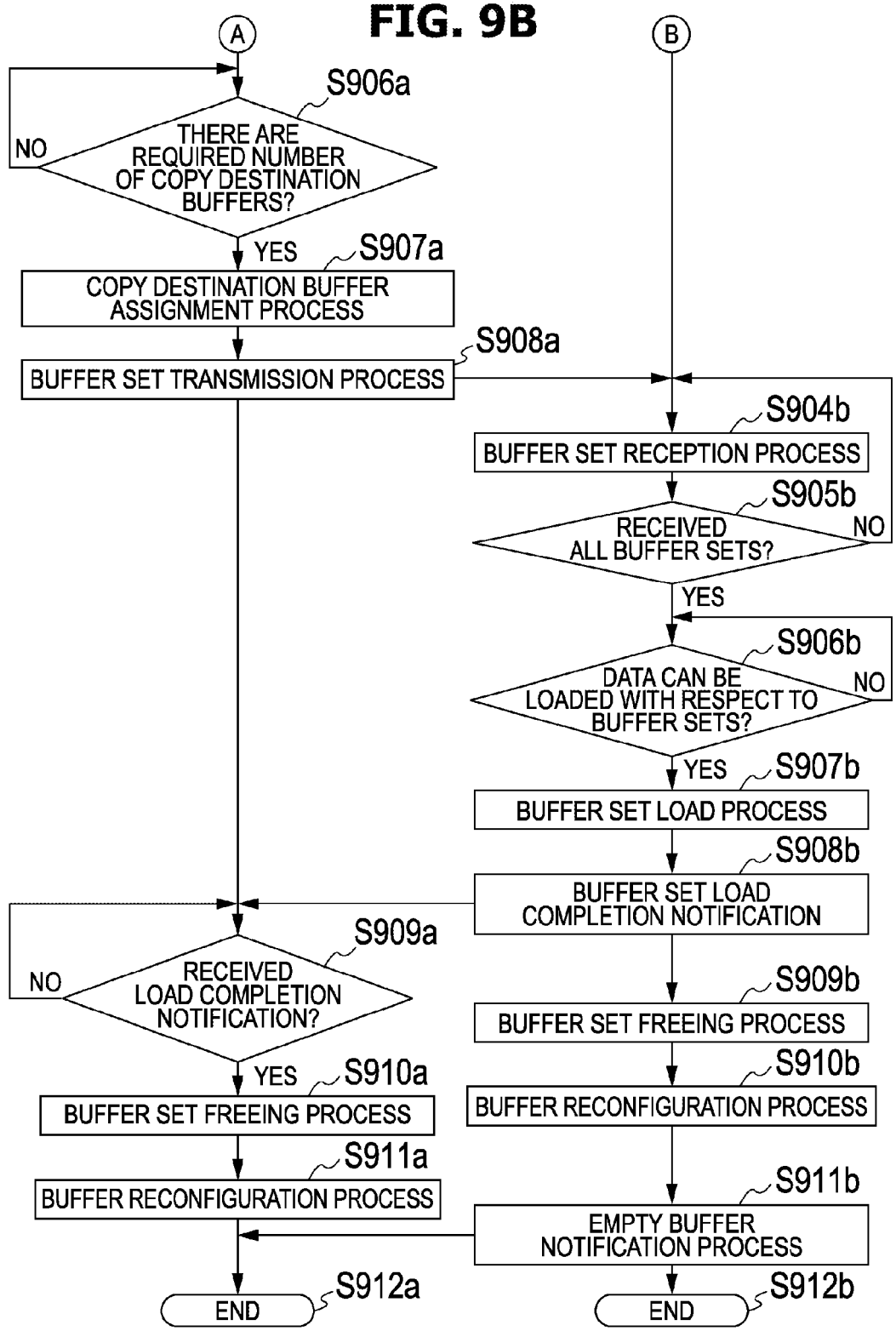
FIG. 9B is a flowchart showing the outline of the remote copy process according to this embodiment.

FIGS. 9A and 9B are flowcharts showing the outline of a remote copy process according to this embodiment. Hereafter, the outline of the remote copy process according to this embodiment will be described on the basis of FIGS. 9A and 9B.

In S900a, the copy source apparatus 101 starts a remote copy process and then moves the process to S901a.

In S901a, the copy source apparatus 101 performs a buffer initial configuration process. For example, on the basis of predetermined configuration information, the copy source apparatus 101 secures areas for the configuration shown in FIG. 2, in the memory 200 included in each control module, and initializes the areas.

In S902a, in order to make a request for providing empty buffers, the copy source apparatus 101 issues an empty buffer notification request command to the copy destination apparatus 111.

On the other hand, in S901b, the copy destination apparatus 111 performs a buffer initial configuration process as in S901a. Then, the copy destination apparatus 111 moves the process to S902b and monitors whether an empty buffer notification request command has come until it receives the command (NO in S902b).

When receiving the empty buffer notification request command from the copy source apparatus 101 in S902b (YES in S902b), the copy destination apparatus 111 moves the process to S903b. Then, the copy destination apparatus 111 searches the recording buffers 201 of control modules included in itself for empty buffers having a freed area. If the copy destination apparatus 111 detects empty buffers, it provides the buffer IDs of the buffers as empty buffer IDs to the copy source apparatus 101.

In S903a, the copy source apparatus 101 performs a buffer set initial creation process. For example, if the copy source apparatus 101 has already received a write I/O command from the host 109 and write data received along with the write I/O command is recorded in the buffer 201a of the recording buffer 201, the copy source apparatus 101 creates a buffer set where the buffer ID of the buffer recorded in the buffer 201a is used as a copy source ID and a copy destination ID is not determined, and stores the created buffer set in the buffer set storage section 202. In this as also shown in FIG. 3, the copy source apparatus 101 creates a buffer set including only the IDs of buffers of the copy source apparatus 101 and stores the buffer set in the buffer set storage section 202.

Also, when receiving notification about empty buffer IDs from the copy destination apparatus 111 in S903a, the copy source apparatus 101 stores the empty buffer IDs in the empty buffer ID storage section 203 and then moves the process to S904a.

For example, when the copy source apparatus 101 receives a write I/O command from the host 109 in S904a, it stores write data received along with the write I/O command in the buffer 201a of the recording buffer 201. Also, as in S903a, the copy source apparatus 101 creates a buffer set where the buffer ID of a stored buffer is used as a copy source ID and a copy destination ID is not determined and stores the created buffer set in the buffer set storage section 202.

In S905a, the copy source apparatus 101 determines whether storage of buffer sets in the 202 has been completed with respect to all the received write I/O commands. If the copy source apparatus 101 determines that storage of buffer sets in the buffer set storage section 202 has not been completed, it repeatedly performs the process of S905a (NO in S905a).

If the copy source apparatus 101 determines in S905a that storage of buffer sets in the buffer set storage section 202 has been completed (YES in S905a), it moves the process to S906a.

In S906a, the copy source apparatus 101 refers to the empty buffer ID storage section 203 to determine whether there are a number of empty buffer IDs according to the buffer set that is the subject of data transfer. For example, the copy source apparatus 101 determines whether there are a number of empty buffer IDs such that copy destination IDs can be set at all buffer sets stored in the buffer set storage section 202.

If there are not a number of empty buffer IDs according to the buffer set that is the subject of data transfer (NO in S906a), the copy source apparatus 101 repeatedly performs the process of S906a until the required number of empty buffer IDs are identified. If the copy source apparatus 101 determines that there are the number of empty buffer IDs according to the buffer set that is the subject of data transfer, it moves the process to S907a (YES in S906a).

In S907a, the copy source apparatus 101 obtains the number of empty buffer IDs according to the buffer set that is the subject of data transfer from the empty buffer ID storage section 203 and sets the obtained empty buffer IDs as the copy destination IDs of the buffer set stored in the buffer set storage section 202 (for example, see FIG. 4). This process will be referred to as a "matching process."

In S908a, on the basis of the buffer sets stored in the buffer set storage section 202, the copy source apparatus 101 transmits the buffer sets where copy source IDs and copy destination IDs are set, data stored in buffers having the copy source IDs set in the buffer sets, and the BITs of the buffers, to the copy destination apparatus 111.

On the other hand, the copy destination apparatus 111 receives the buffer sets and the like and then moves the process to S904b.

In S904b, the copy destination apparatus 111 performs a buffer set reception process. For example, the copy destination apparatus 111 stores the received buffer sets in the buffer set storage section 202 and stores data received along with the buffer sets in the recording buffer 201.

In S905b, the copy destination apparatus 111 determines whether it has received all the buffer sets. If the copy destination apparatus 111 determines that it has not received all the buffer sets (NO in S905b), it moves the process to S904b and repeatedly performs the processes in S904b to S905b.

If the copy destination apparatus 111 determines in S905b that it has received all the buffer sets (YES in S905b), it moves the process to S906b. In S906b, the copy destination apparatus 111 determines whether data can be loaded into a disk drive included in itself with respect to the buffer sets that have been obtained in S904b and that include the data stored in the buffer 201a of the recording buffer 201. If the copy destination apparatus 111 determines that the buffer sets can be loaded (YES in S906), it moves the process to S907b.

In S907b, the copy destination apparatus 111 loads the data obtained in S904b in the disk drive included in itself. When the load is completed, the copy destination apparatus 111 moves the process to S908b and provides notification indicating that the load of the data has been completed with respect to the buffer sets, to the copy source apparatus 101. Hereafter, this notification will be referred to as "buffer set load completion notification."

When the load of the data into the disk drive is completed with respect to the buffer sets, the copy destination apparatus 111 performs a buffer set freeing process in S909b. For example, the copy destination apparatus 111 frees the buffer set storage section 202 storing the buffer sets and areas of the recording buffer 201 storing the buffer IDs of the buffers.

In S910b, as in S901b, the copy destination apparatus 111 newly secures areas for the buffer set storage section 202 and recording buffer 201 in the freed areas and constructs, for example, the configuration shown in FIG. 2 in the secured areas.

When the above-mentioned process is completed, the copy destination apparatus 111 moves the process to S911b and notifies the copy source apparatus 101 of the empty buffer IDs of buffers that have newly become available due to the processes in S909b to 910b.

On the other hand, in S909a, the copy source apparatus 101 determines whether it has received the buffer set load completion notification from the copy destination apparatus 111. If the copy source apparatus 101 has not received the buffer set load completion notification (NO in S909a), it repeatedly performs the process of S909a. If the copy source apparatus 101 receives the buffer set load completion notification (YES in S909a), it moves the process to S910a.

In S910a, as in S909b, the copy source apparatus 101 performs a buffer set freeing process on the buffer sets that have undergone data transfer in S908a. Then, in S911a, as in S901a, the copy source apparatus 101 performs a buffer reconstruction process.

When the above-mentioned process is completed, the copy source apparatus 101 completes the remote copy process, or moves the process to S902a to continue the remote copy process. Or if the copy source apparatus 101 newly receives a write I/O command from the host 109, it moves to S904a or the like to continue the remote copy process. Also, when the above-mentioned process is completed, the copy destination apparatus 111 completes the remote copy process, or moves the process to S902b, S904b, or the like to continue the remote copy process.

(Specific Process of Remote Copy Function According to this Embodiment)

The following processes in the remote copy process according to this embodiment shown in FIGS. 9A and 9B will be described specifically.

(1) A process of matching a copy source buffer with a copy destination buffer when data is transferred with respect to a buffer set (S907a).

(2) A process of determining a transfer process started when a path closed state is eliminated.

(3) An I/O process in a path closed state.

(4) An empty buffer ID acquisition process and a buffer set transfer restart process after a path closed state is eliminated.

(5) A process performed by the copy destination apparatus when a path closed state is detected.

(1) A Process of Matching a Copy Source Buffer with a Copy Destination Buffer when Data is Transferred with Respect to a Buffer Set (S907a).

FIG. 10 is a flowchart showing specific processes in the copy destination buffer assignment process (S907a) shown in FIG. 9B. In FIG. 10, specific processes with respect to a control module (hereafter referred to as a "master control module") for controlling all the control modules included in the copy source apparatus 101 and the other control modules are shown.

In S1001, the master control module refers to the empty buffer ID storage section 203 to check whether the number of empty buffer IDs recorded in the empty buffer ID storage section 203 has reached the number of copy destination IDs required by a buffer set in the buffer set storage section 202.

If the required number of empty buffer IDs are identified in S1001a (NO in S1001a), the master control module moves the process to S1002a. In S1002a, the master control module waits for empty buffer notification from the copy destination apparatus 111. When the master control module receives empty buffer notification, it moves the process to S1001a.

If the master control module identifies the required number of empty buffer IDs in S1001a (YES in S1001a), it moves the process to S1003a.

In S1003a, the master control module acquires the required number of empty buffer IDs from the empty buffer ID storage section 203. Then, the master control module sets the acquired empty buffer IDs at the copy destination IDs of the buffer set already set in the buffer set storage section 202 in S904a. Thus, matching between the copy source buffers and copy destination buffers is performed.

When this matching process is completed, the master control module makes buffer set information multiplexing requests to the other control modules.

On the other hand, in S1001b, when receiving the buffer set information multiplexing request from the master control module, each control module performs a buffer set information multiplexing process. Here, the buffer set information multiplexing process refers to a process of causing all the control modules included in the copy source apparatus 101 or copy destination apparatus 111 to retain identical buffer set information.

For example, each control module acquires, from the master control module, the buffer set that has undergone the matching process in S1003a and then incorporates the acquired buffer set into the buffer set storage section 202 included in itself.

When the buffer set information multiplexing process is completed in S1001b, each control module provides notification about the completion of the buffer set information multiplexing process to the master control module.

In S1005a, the master control module checks whether it has received responses from all the control modules to which the master control module has made the buffer set information multiplexing requests. If the master control module determines that it has received responses from all the control modules (YES in S1005a), it completes the copy destination buffer assignment process (S1005a) and proceeds to the process of S908a shown in FIG. 9B.

In a remote copy process according to the related art, a process of matching a copy source ID with a copy destination ID is performed when a buffer set is created. On the other hand, as described above, in the remote copy process according to this embodiment, a matching process is performed not at the timing of S904a but immediately before (S907a) performing a transfer process after a process of storing data in a buffer is completed.

Therefore, it is possible to perform a data storage process on buffers other than those related to a transfer process while performing the transfer process. This makes it possible to use all buffers, including the recording buffer 201 and buffer set storage section 202, included in the copy source apparatus 101.

For example, it is possible to store data related to a write I/O command from the host 109 until the capacity of the buffers included in the copy source apparatus 101 is exhausted.

As a result, with regard to a buffer for used in remote copy that ensures the order, it is possible to effectively use the buffers of the copy source apparatus even if the number of buffers included in the copy destination apparatus 111 is smaller than the number of buffers included in the copy source apparatus 101.

(2) A Process of Determining a Transfer Process Started when a Path Closed State is Eliminated In the remote copy process according to this embodiment, if the copy source apparatus 101 detects a path closed state during performance of a buffer halt process, it suspends the buffer halt process and determines a buffer set that will become the subject of data retransfer when the path closure state is eliminated, on the basis of the transfer state of each buffer set. In this embodiment, a buffer set meeting the following conditions is handled as the subject of data retransfer.

1) An old-generation buffer set with respect to which data has been transferred.

2) An old-generation buffer set with respect to which data is being transferred.

3) An old-generation buffer set that is placed in a state where the buffer set is waiting for a transfer process to start.

Also, in the remote copy process according to this embodiment, if data is retransferred with respect to buffer sets when a path closed state is eliminated, data is transferred with respect to buffer sets sequentially from older generations.

FIG. 11 is a flowchart showing a process of determining a buffer set transfer process in the copy source apparatus 101 after a path closed state is eliminated.

In S1100a, when a path closed state is detected, the master control module of the copy source apparatus 101 moves the process to S1101a.

In S1101a, the master control module refers to the recording buffer 201 or buffer set storage section 202 to check whether there is 1) an old-generation buffer set with respect to which data has been transferred, 2) an old-generation buffer set with respect to which data is being transferred, or 3) an old-generation buffer set that is waiting for a transfer process to start.

If a buffer set meeting the condition 1), condition 2), or condition 3) is not detected in S1101a (NO in 1001a), the master control module moves the process to S1104a and completes the process of FIG. 11. If an applicable buffer set is detected (YES in S1101a), the master control module moves the process to S1102a.

In S1102a, the master control module adds the applicable buffer set detected in S1101a to a queue used to control the order of buffer transfer (hereafter referred to as a "transfer queue"). At this time, queuing is performed so that the priority of a transfer queue related to an old-generation buffer set is increased.

When the queuing process is completed, the master control module provides notification requesting multiplexing of the above-mentioned transfer queue information, to other control modules.

On the other hand, when receiving the notification requesting multiplexing of the transfer queue information from the master control module, each control module acquires the transfer queue information from the master control module and incorporates the acquired transfer queue information into transfer queue information included in itself (S1101b).

When completing the incorporation of the transfer queue information in the process of S1101b, each control module provides notification about the completion of multiplexing of the transfer queue information to the master control module.

In S1103a, the master control module identifies the notification about the completion of multiplexing of the transfer queue information provided by other control modules. When receiving the notification about the completion of multiplexing of the transfer queue information from all the control modules (YES in S1103*a*), the master control module moves the process to S1104*a* and completes the process of determining a buffer set transfer process performed when the path closed state is eliminated.

When detecting that the path closed state has been eliminated, the master control module performs, for example, a buffer set retransfer process on the basis of queue information after performing the process shown in FIG. 8.

The above-mentioned "buffer set with respect to which data has been transferred" refers to a buffer set with respect to which data has been transferred to the copy destination apparatus 111 but the copy source apparatus 101 has not been received buffer set load completion notification from the copy destination apparatus 111. In this case, the copy source apparatus 101 waits for buffer set load completion notification from the copy destination apparatus 111 without freeing the buffer.

(3) I/O Process in Path Closed State

In the remote copy process according to the related art, when the copy source apparatus 101 detects a path closed state, it writes data stored in a buffer back into a bitmap of each session on the basis of BIT information by performing a buffer halt process. Then, when the path closed state is eliminated after the buffer halt process is performed, a remote copy process where the order is not ensured is performed on the basis of the bitmap into which the data has been written back. As for processing of a write I/O command received from the host when this remote copy that does not ensure the order is operating, the remote copy that does not ensure the order is performed.

In the remote copy process according to this embodiment, when the copy source apparatus 101 detects a path closed state is detected, it performs no buffer halt process and brings the recording buffer 201 and buffer set storage section 202 in a state in which the recording buffer 201 and buffer set storage section 202 (hereafter collectively simply referred to as "buffers") can store data and stores as many write I/O commands from the host as possible in the buffers.

However, when the copy source apparatus 101 further receives a write I/O command or the like from the host in a state where the buffers no longer have areas for storing new data, it makes a buffer change request. If the copy source apparatus 101 cannot change the buffers, it performs a buffer halt process.

Figure 12:
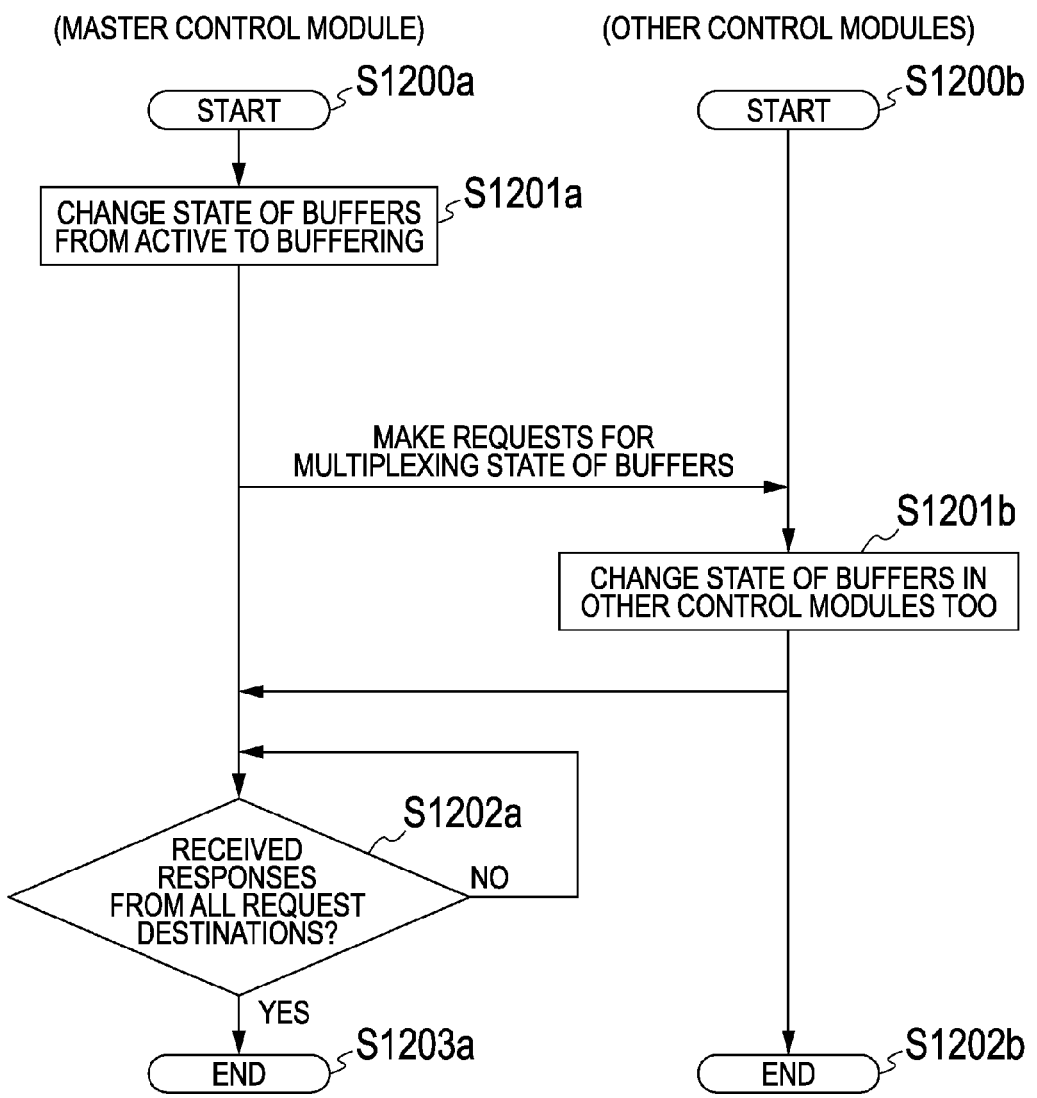
FIG. 12 is a flowchart showing a process of changing the buffer state in the copy source apparatus when a path closed state is detected according to this embodiment.

FIG. 12 is a flowchart showing a buffer state change process performed in the copy source apparatus 101 when a path closed state is detected.

In S1200, the copy source apparatus 101 detects a path closed state and then moves the process to S1201*a*.

Here, the state of the buffers according to this embodiment changes among at least three states (halt, active, and buffering). For example, when a path closed state is detected, the buffers are placed in the buffering state in conjunction with the detection. In the buffering state, data can be stored in the buffers, but data stored in the buffers cannot be transmitted. In halt, even if a write I/O command is received from the host 109, data cannot be stored in the buffers. In the active state, data can be stored in the buffers and data stored in the buffers can be transmitted.

In S1201*a*, the master control module changes the state of the buffers from the active state to the buffering state. Then, the master control module provides notification requesting multiplexing of the buffer state to each of the other control modules.

On the other hand, when receiving the notification requesting multiplexing of the buffer state from the master control module, each control module moves the process to S1201*b* and then changes the state of its buffers to the buffering state.

In S1201*b*, the control modules, which have changed the state of the buffers thereof to the buffering state, provide notification indicating that multiplexing of the buffer state has been completed, to the master control module.

In S1202*a*, the master control module identifies the notification about the completion of multiplexing of the buffer state from the control modules. When receiving the completion notification from all the control modules (YES in S1202), the master control module moves the process to S1203*a* and completes the buffer state change process.

Figure 13:
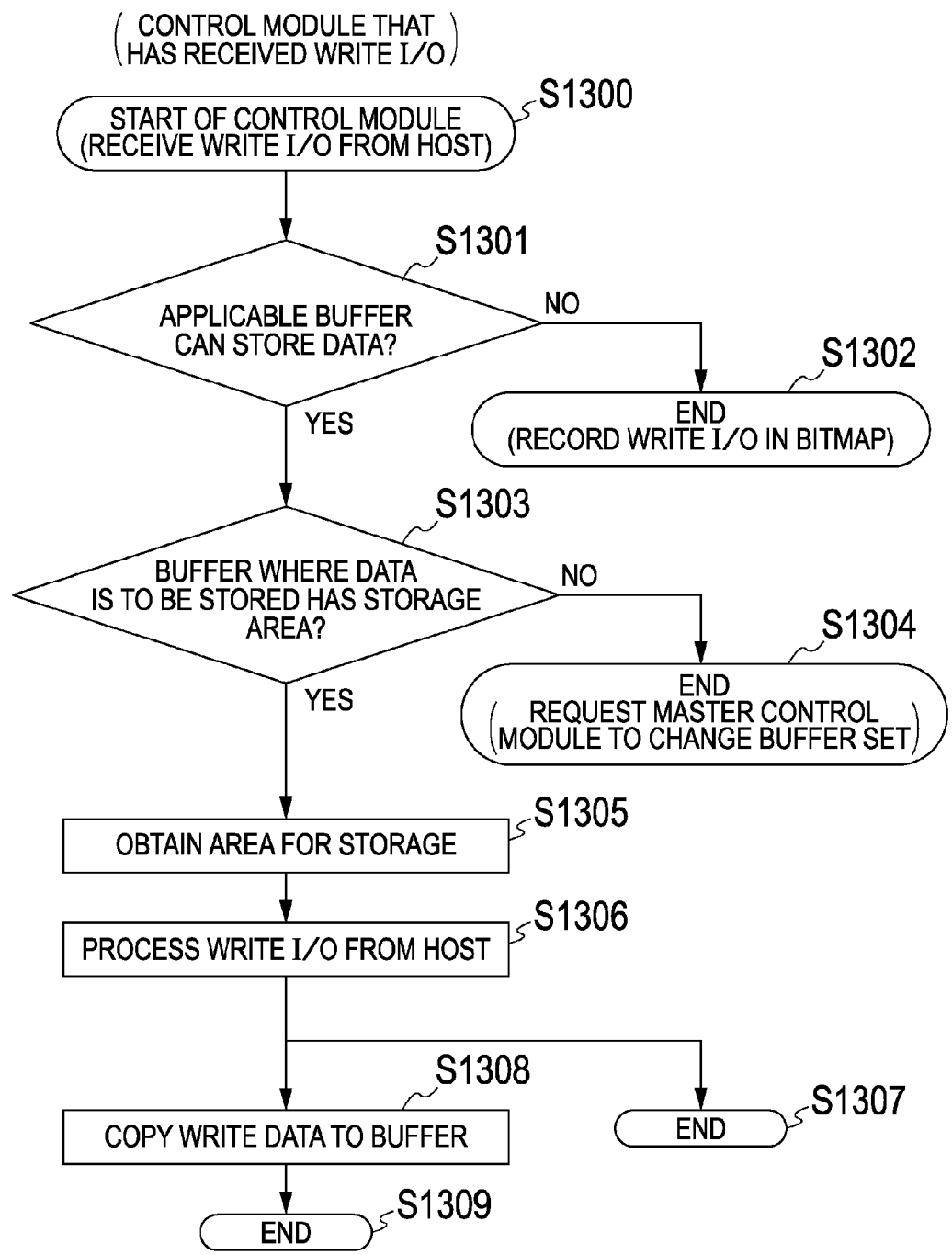
FIG. 13 is a flowchart showing an I/O process performed by the copy source apparatus in a path closed state according to this embodiment.

FIG. 13 is a flowchart showing an I/O process performed in the copy source apparatus 101 in a path closed state.

When the copy source apparatus 101 receives a write I/O command from the host 109 in S1300, a control module of the copy source apparatus 101, which has received the write I/O command, moves the process to S1301.

In S1301, the control module that has received the write I/O command refers to the state of the recording buffer 201 and buffer set storage section 202 (hereafter collectively simply referred to as "buffers") to check whether the buffers is placed in a state in which data can be stored in the buffers. If the buffers are placed in a state other than the active state or buffering state (NO in S1301), the control module determines that the buffers are not placed in a state in which data can be stored in the buffers and moves the process to S1302. In S1302, the control module records the write I/O command in a bitmap prepared in advance in a memory or the like included in itself.

On the other hand, in S1301, the state of the buffers is the active state or buffering state (YES in S1301), the control module determines that the buffers is placed in a state in which data can be stored in the buffers, and moves the process to S1303.

In S1303, the control module checks whether the buffers, where data is to be stored, have areas where data can be stored. If the control module determines that there are no areas where data can be stored (NO in S1303), it moves the process to S1304. In S1304, the control module requests the master control module to change the buffer set.

When receiving the buffer change request in S1304, the master control module changes its own buffers set and provides buffer change request notification to the other control modules. The control modules store a write I/O command in the changed buffers. If the buffers cannot be changed, a buffer halt process is performed.

When the control module determines in S1303 that there are areas where data can be stored (YES in S1303), it moves the process to S1305 and acquires the areas for storing data and then moves the process to S1306.

In S1306, the host 109 processes the write I/O command. At this time, in accordance with the write I/O command from the host 109, the control module, for example, writes data to a disk drive included in itself, and then moves the process to S1307 or S1308.

For example, if there is no write data to be stored in the buffers, the control module moves the process to S1307. Also, if there is write data to be stored in the buffers, the control module proceeds to S1308 and copies the write data to the buffers.

(4) Empty Buffer ID Acquisition Process and Buffer Set Transfer Restart Process Performed after Path Closed State is Eliminated If, in the copy source apparatus 101, a path closed state is detected and the process of (2) shown in FIG. 12 and the process of (3) shown in FIG. 13 are performed and then the path closed state is eliminated, the copy source apparatus 101 performs the following two patterns of buffer notification request processes on the copy destination apparatus 111 in accordance with the state in which the copy source apparatus 101 has been placed during the path closure.

1) A case where no buffer halt process has been performed during the path closed state.

2) A case where a buffer halt process has been performed during the path closed state.

In the above-mentioned pattern 2), a buffer halt process has been already performed in the copy source apparatus 101, so the buffers have been cleared. Therefore, a buffer halt process is performed and thus the buffers are cleared in the copy destination apparatus 111, too. As an opportunity for performing a buffer halt process in the copy destination apparatus, the copy source apparatus 101 issues a buffer notification request indicating that a buffer halt process has been performed in the copy source apparatus 101, to the copy destination apparatus. The copy destination apparatus 111, which has received the buffer notification request, performs a buffer halt process of the copy destination apparatus while returning an error meaning a retry, to the copy source apparatus.

The copy source apparatus 101, which has received the error from the copy destination apparatus, makes a buffer notification request to the copy destination apparatus after the lapse of a given time. At this time, the copy source apparatus 101 issues a buffer notification request that requests notification according to the above-mentioned pattern 1), that is, notification indicating that no buffer halt process has been performed during the path closure.

1) Case where No Buffer Halt Process has been Performed in Path Closed State

Figure 14A:
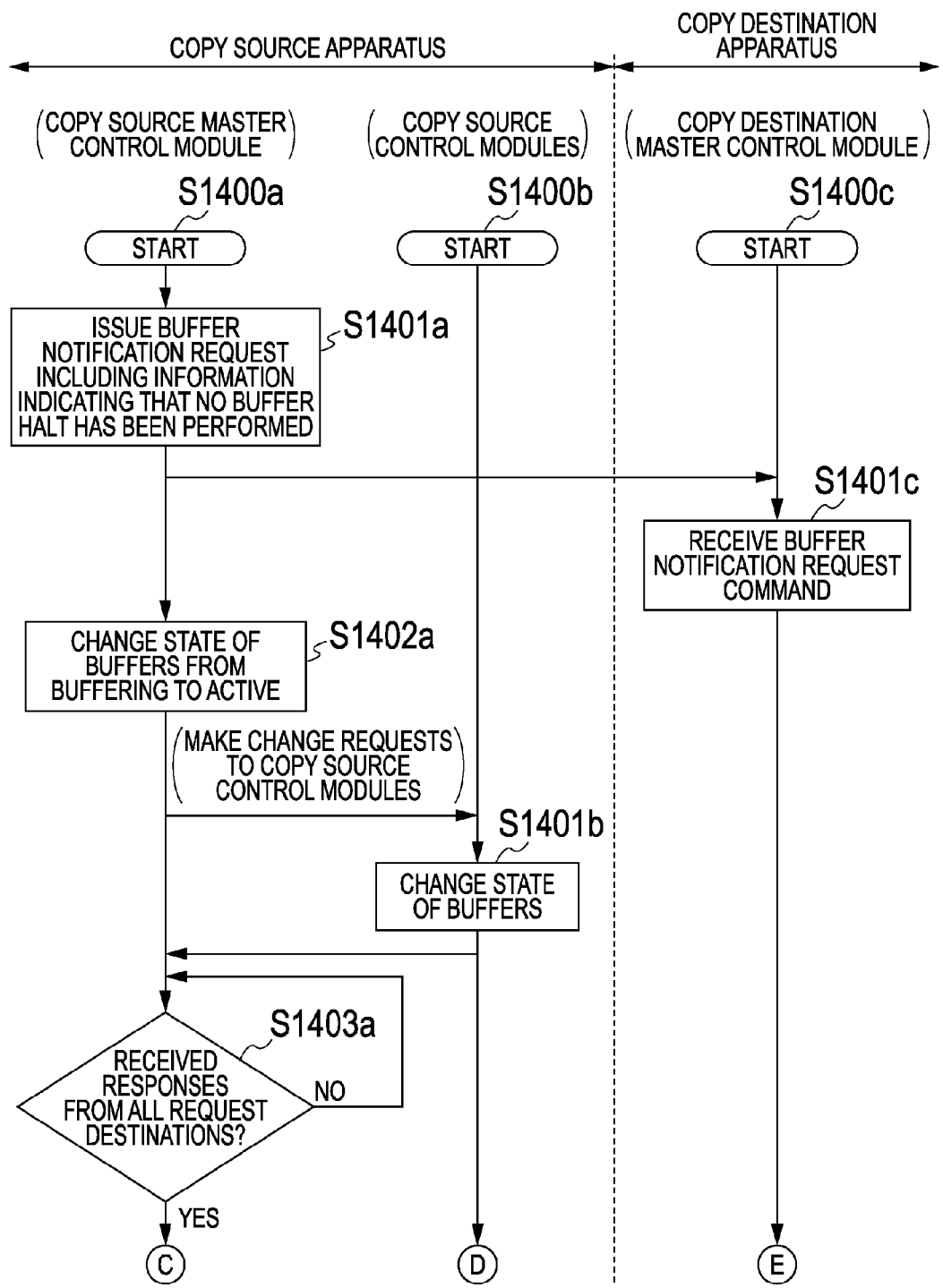
FIG. 14A is a flowchart showing an empty buffer ID acquisition process and a buffer set transfer restart process performed after a path closed state is eliminated according to this embodiment.

FIGS. 14A and 14B are flowcharts showing an empty buffer ID acquisition process and a buffer set transfer restart process performed after a path closed state is eliminated. Hereafter, the master control module of the copy source apparatus 101 will be referred to as a "copy source control module" and a control module of the copy source apparatus 101 will be referred to as a "copy source control module" as necessary. Further, the master control module of the copy destination apparatus 111 will be referred to a "copy destination control module."

In S1400*a*, the copy source master control module detects the reopening of the path and then moves the process to S1401*a*.

In S1401*a*, the copy source master control module issues a buffer notification request command to the copy destination apparatus 111. At this time, information indicating that no buffer halt process has been performed is added to the command.

In S1402*a*, copy source master control module changes the state of its buffers from the buffering state to the active state. Also, the copy source master control module makes requests for changing the state of the buffers from the buffering state to the active state, to the other copy source control modules included in the copy source apparatus 101.

On the other hand, in S1401*b*, each copy source control module receives the buffer state change request from the copy source master control module, then changes the state of its own buffers from the buffering state to the active state, and provides notification indicating that the change has been completed to the copy source master control module.

In S1403*a*, the copy source master control module checks whether it has received buffer state change completion notification from all the control modules to which the copy source master control module has made the requests. When receiving the notification from all the control modules (YES in S1403*a*), the copy source master control module moves the process to S1404*a*.

On the other hand, in S1401*c*, the copy destination master control module receives the buffer notification request from the copy source apparatus 101 and then moves the process to S1402*c*.

The copy destination master control module checks the use state of the buffers. Then, in S1402*c*, the copy destination master control module issues a buffer notification command to notify the copy source master control module of empty buffers, that is freed buffers.

In S1404*a*, the copy source master control module receives the buffer notification command from the copy destination apparatus 111 and then moves the process to S1405*a*.

In S1405*a*, the copy source master control module refers to its buffers to check whether there are generations with respect to which data is to be retransferred. If the copy source master control module determines that there are no generations with respect to which data is to be retransferred (NO in S1405*a*), it moves the process to S1406*a* and restarts a normal operation. If the copy source master control module determines that there are generations with respect to which data is to be retransferred (YES in S1405*a*), it moves the process to S1407*a*.

In S1407*a*, the copy source master control module checks whether buffer IDs set for buffer sets of the generations with respect to which data is to be retransferred are not inconsistent with the buffer IDs received in S1404*a*.

For example, the copy source master control module checks whether buffer IDs set for the copy destination IDs of buffer sets of the generations with respect to which data is to be retransferred overlap the buffer IDs received in S1404*a*. If there is an overlap, the copy source master control module determines that there is an inconsistency (NO in S1407) and moves the process to S1408*s* and performs a buffer halt process.

In S1407*a*, if buffer IDs set in buffer sets of the generations with respect to which data is to be retransferred do not overlap the buffer IDs received in S1404*a* (YES in S1407*a*), the copy source master control module moves the process to S1409*a* and starts a transfer process.

2) Case where a Buffer Halt Process has been Performed in a Path Closed State

FIG. 15 is a flowchart showing an empty buffer ID acquisition process and a buffer set transfer restart process performed after a path closed state is eliminated.

In S1500*a*, the copy source master control module detects the reopening of the path and then moves the process to S1501*a*.

In S1501*a*, the copy source master control module issues a buffer notification request command to the copy destination apparatus 111. At this time, information indicating that a buffer halt process has been performed is added to the command.

On the other hand, in S1501*b*, the copy destination master control module receives the buffer notification request command transmitted from the copy source apparatus 101 and then moves the process to S1502*b*.

In S1502*b*, the copy destination master control module detects that the buffer halt process has been performed in the copy source apparatus 101, from the information added to the buffer notification request command, and then returns an error response to the copy source apparatus 101. Then, the copy destination master control module proceeds to S1503*b* and completes the process.

In S1502a, the copy source master control module receives the error response from the copy destination apparatus 111. Then, the copy destination master control module waits until a given time elapses after the reception of the error response, and then performs the process of S1501a only once and moves the process to S1503.

Figure 16:
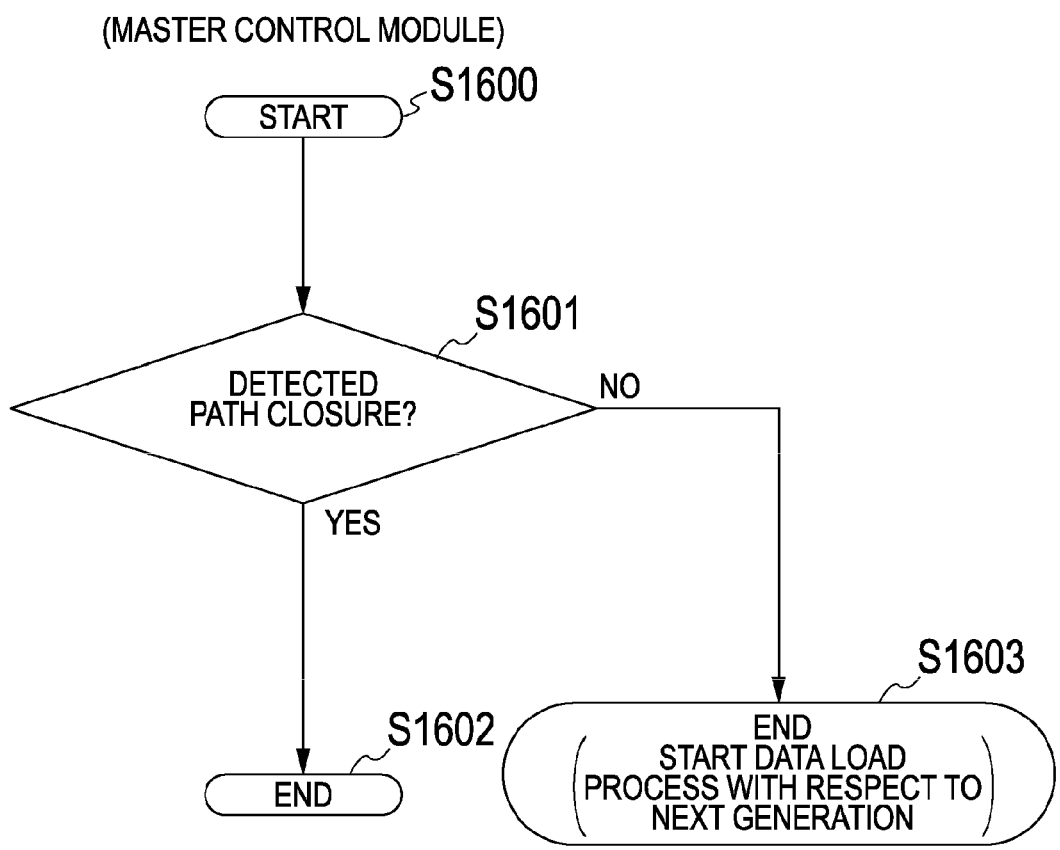
FIG. 16 is a flowchart showing a process performed by the copy destination apparatus when a path closed state is detected according to this embodiment.

(5) Process Performed by the Copy Destination Apparatus when a Path Closed State is Detected FIG. 16 is a flowchart showing a process performed by the copy destination apparatus 111 when a path closed state is detected.

In S1600, the master control module of the copy destination apparatus 111 completes a process of loading, into a disk drive, data in a buffer generation in which data transferred from the copy source apparatus 101 is already stored, and then moves the process to S1601. Then, the master control module checks whether path closure is occurring.

When the master control module detects path closure in S1601 (YES in S1601), it moves the process to S1602 and waits for performance of the processes shown in FIGS. 14A and 14B or the process shown in FIG. 15.

When the master control module detects no path closure in S1601 (NO in S1601), it moves the process to S1603 and starts a process of loading, into a disk drive, data stored in a buffer generation next to a buffer with respect to which a process of loading data into a disk has been completed.

(Modification of Remote Copy Process According to this Embodiment)

Figure 17:
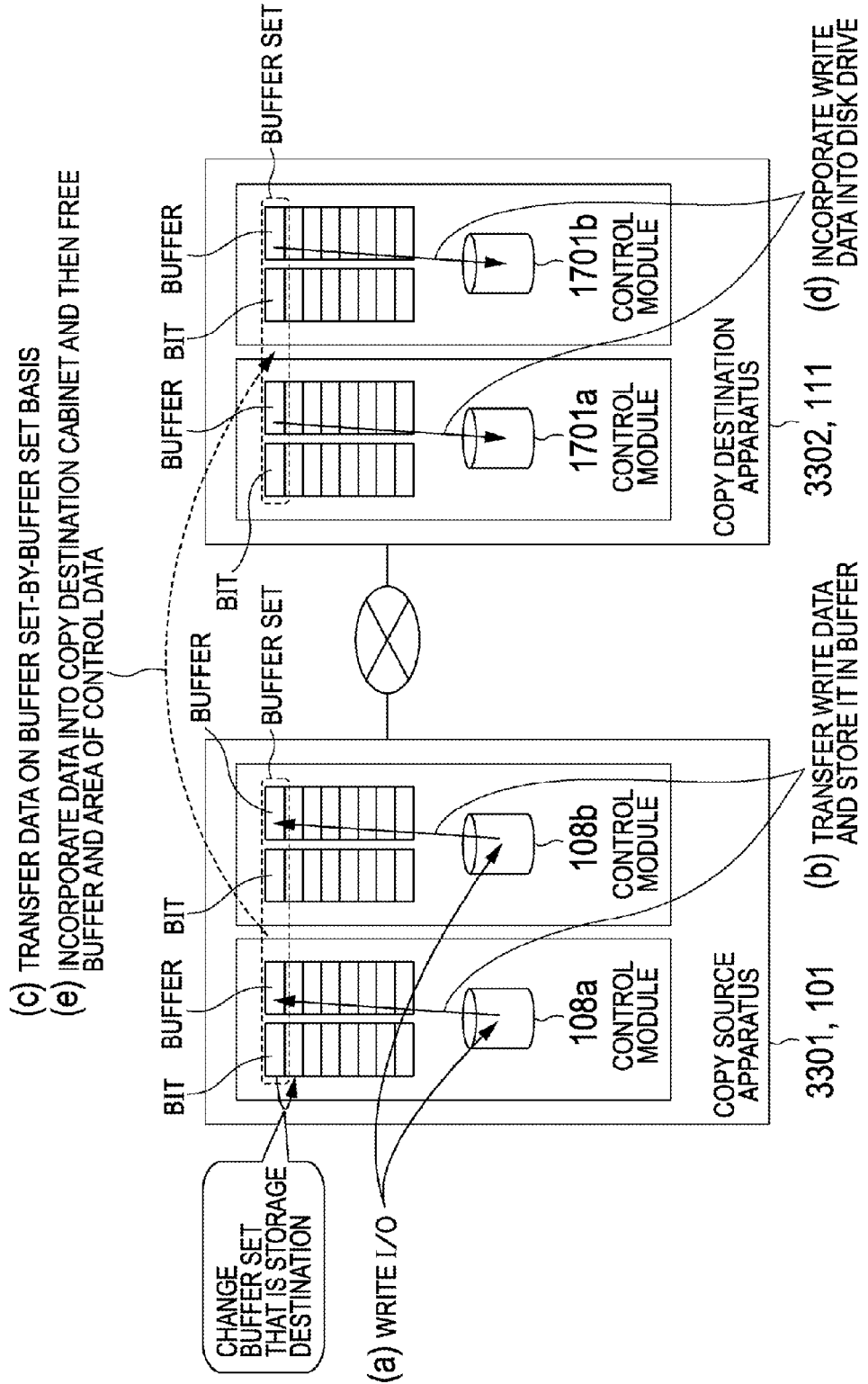
FIG. 17 is a drawing showing a related-art example of a remote copy process that ensures the order.
Figure 18:
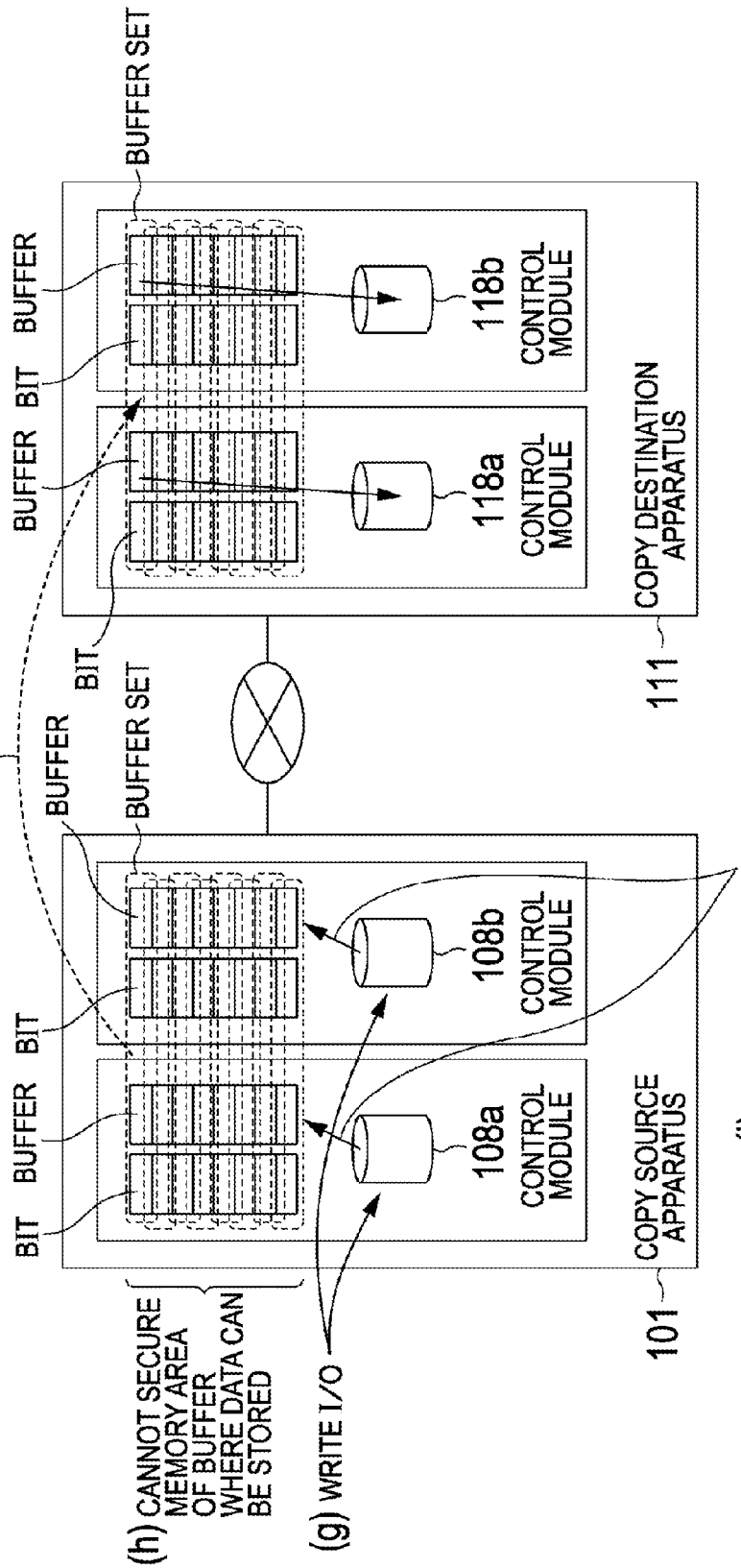
FIG. 18 is a drawing showing a related-art example of a remote copy process that ensures the order.

While a copy source apparatus 3301 and a copy destination apparatus 3302 shown in FIGS. 17 and 18 have a configuration identical to that of the copy source apparatus 3301 and copy destination apparatus 3302 shown in FIG. 33, illustration of a buffer set storage section is omitted to facilitate the description of this modification.

As shown in FIG. 17, in a remote copy function that ensures the order, (a) when receiving a write I/O command from the host 109, each control module stores write data in disk drives 108a and 108b in accordance with the command. Simultaneously, (b) each control module transfers the write data to store the data in the buffers. At this time, the write data is managed on a buffer set-by-buffer set basis.

(c) When completely writing the write data to the buffers, each control module starts a remote copy process with respect to the write data by transferring the data on a buffer set-by-buffer set basis.

(d) The write data transmitted from the copy source apparatus 101 using the remote copy is stored in the buffers included in each control module of the copy destination apparatus 111. Then, each control module incorporates the write data stored in the buffers into disk drives 1701a and 1701b.

When the above-mentioned process is completed, (e) the copy source apparatus 101 and copy destination apparatus 111 free the buffers and BITs thereof.

However, the memory area storing the buffers, from which the data has been transferred, and BITs of the copy source apparatus 101 is not freed but retained until the data is loaded into disk drives in the copy destination apparatus 111. Therefore, if (f) a delay occurs in a data incorporation process in the copy destination apparatus 111 or a delay occurs in a transfer process due to the state of the line between the cabinets, the memory storing the buffers and BITs of the copy destination apparatus 111 cannot be freed.

For example, if a delay occurs in a transfer process due to such as the lowness or instability of the band of the line between the cabinets, the memory area storing the buffers and BITs of the copy source apparatus 101 are used in a longer period of time accordingly. Thus, the memory cannot be freed during that period.

(g) When the copy source apparatus 101 receives a write I/O command from the host in such a state, it stores write data in the buffers each time it receives the command. Thus, the copy source apparatus 101 consumes the buffers one after another.

(h) It is conceivable that a memory area for a buffer where data can be stored can no longer be secured and thus the buffers of the copy source apparatus may be exhausted. Also, it is conceivable that if the size of write data is larger than the set size of the buffers, the buffers are exhausted as well.

In the state in which the buffers are exhausted, write I/O commands sent from the host are stopped without being processed inside the copy source apparatus 101. For this reason, this state cannot be continued. Therefore, (i) the I/O process is stopped temporarily. If the buffer exhaustion state is not eliminated even after the lapse of a given time, a buffer halt process is performed. By performing the buffer halt process, the buffer state is cleared and the I/O process is restarted.

At this time, information in the buffers, such as write data, is written back into a dedicated bitmap and remote copy transfer that does not ensure the order is performed on the basis of the bitmap. Thus, the remote copy that ensures the order is suspended.

For this reason, in the modification according to this embodiment, an area to which buffer sets on the memory are temporarily evacuated is secured. Hereafter, this area secured in a disk drive will be referred to as "evacuation buffers". The buffer sets are evacuated to evacuation buffers 190 depending on the use state of the buffers (hereafter referred to as "cache buffers" as necessary) on the memory. This series of processes will be referred to as a "buffer evacuation process."

For example, if free space of the buffers on the memory in the copy source apparatus 101 is reduced, the copy source apparatus 101 does not transfer data of buffer sets, which are the subjects of data transfer, to the copy destination apparatus 111 immediately but evacuates the data to evacuation buffers 190 so as to secure a given amount or more of free space of the buffers on the memory. Thus, even if the copy source apparatus 101 receives a new write I/O command, it can prevent exhaustion of the buffers.

Figure 19:
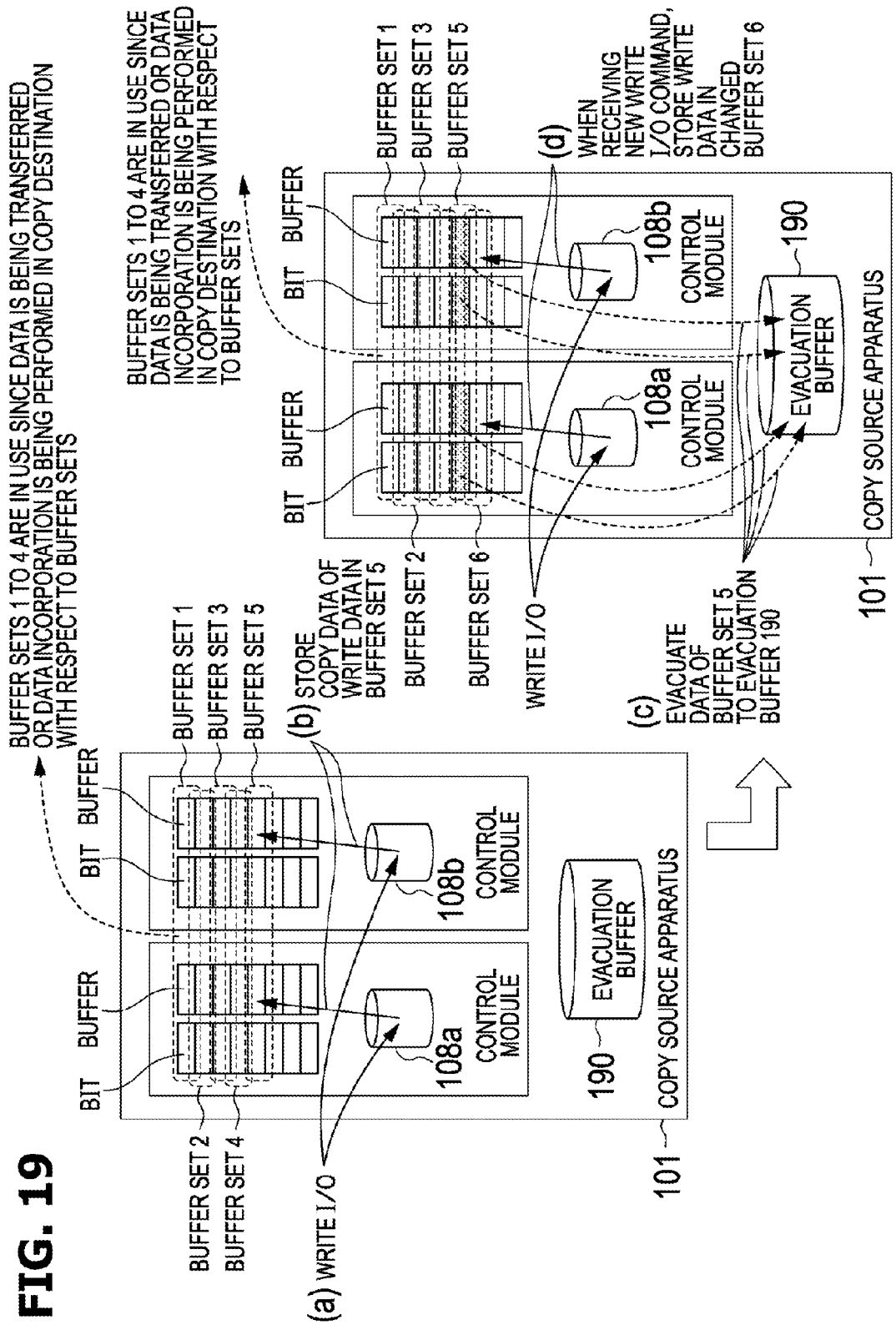
FIG. 19 is a drawing showing an outline of a buffer evacuation process according to this embodiment.
Figure 20:
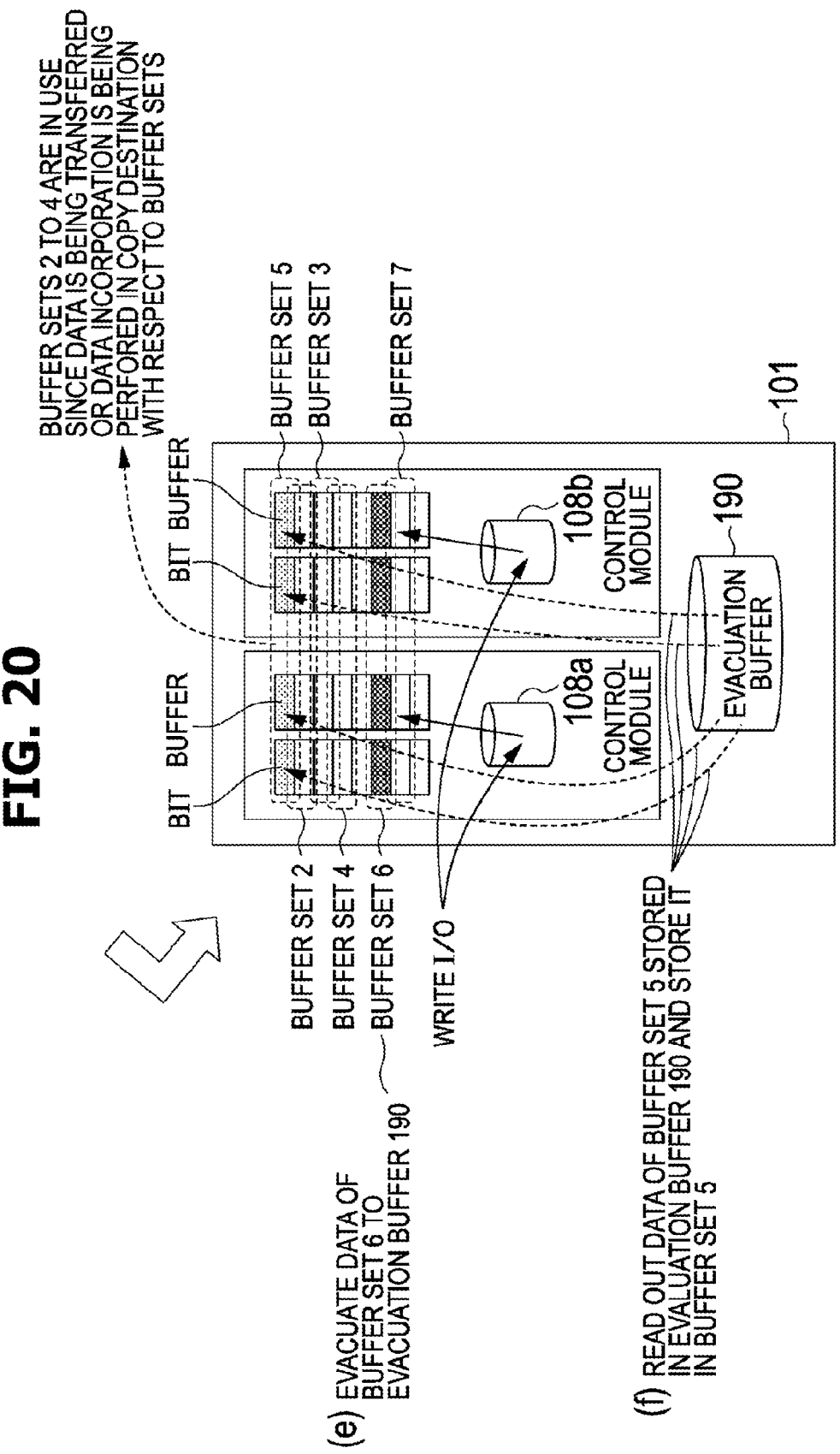
FIG. 20 is a drawing showing the outline of the buffer evacuation process according to this embodiment.
Figure 21:
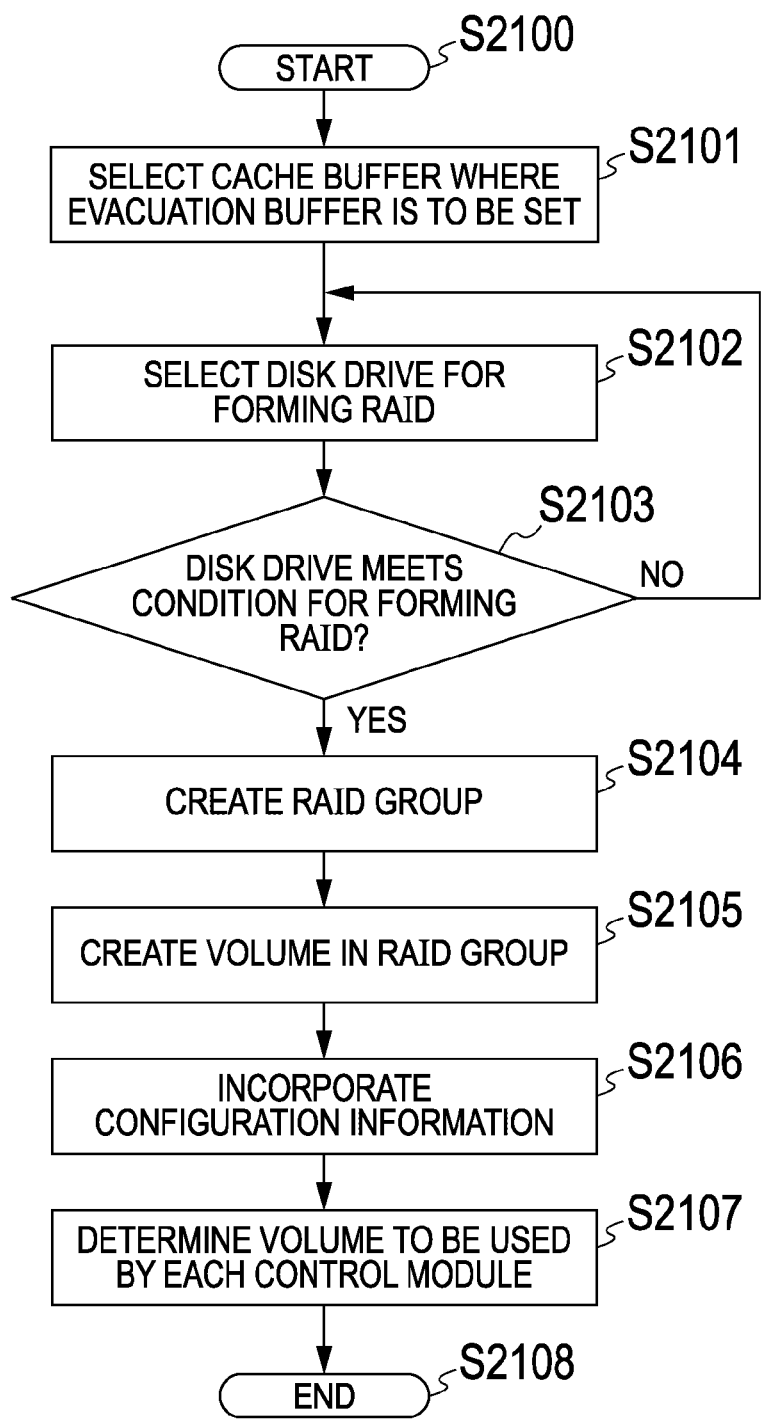
FIG. 21 is a flowchart showing a process of creating an evacuation buffer area according to this embodiment.

When the area of the buffer sets is freed after the data is transferred to the copy destination apparatus 111 and incorporated thereinto, the copy source apparatus 101 stores the buffer sets evacuated to the evacuation buffers 190 in the freed area for the buffers and continues the transfer process. FIGS. 19 to 21 show the outline of a buffer evacuation process.

FIGS. 19 and 20 are drawings showing a buffer evacuation process according to this embodiment.

FIG. 19 is a drawing showing a buffer evacuation process performed when the copy source apparatus 101 receives a write I/O command in a state where data is being transferred with respect to buffer sets 1 to 4 or in a state where the buffer sets 1 to 4 are in use since the buffer sets are waiting until a load process is performed in the copy destination apparatus 111.

(a) When receiving a write I/O command, a control module stores write data in a disk drive thereof and (b) stores copy data of the write data in a buffer set 5. Hereafter, the copy data of the write data in this case will be also referred to as "write data."

Here, for example, when the use rate (for example, "the number of buffer generations used in the buffer sets/"the number of all the buffer generations") of the buffer sets is a given or higher rate (50% or higher in this embodiment), (c)

the control module evacuates, to the evacuation buffers 190, data of a buffer set with respect to which data is to be transferred to the copy destination apparatus 111 for the next time, for example, data of the buffer set 5 and changes the storage destination of new write data or the like from the buffer set 5 to a buffer set 6.

(d) When receiving a new write I/O command, the control module stores write data in a disk drive and stores the write data in the changed buffer set 6.

However, a buffer set (buffer set 5 in the case of FIG. 19) older than the buffer set 6 is evacuated to the evacuation buffers 190, so (e) the control module evacuates data of the buffer set 6 to the evacuation buffers 190.

When the buffer set 1, which has been in use, is freed, (f) the control module reads the data of the buffer set 5 stored in the evacuation buffers 190 and stores the read data in the buffer set 5.

The following processes in the modification of the remote copy process according to this embodiment will be described more specifically.

(1) Process of creating an evacuation buffer area
(2) Process of assigning an evacuation buffer to a control module
(3) Process of updating write-back pointer information/stage pointer information
(4) Process of writing back data from a cache buffer to an evacuation buffer
(5) Process of staging data from an evacuation buffer to a cache buffer In this embodiment, storage of data stored in a cache buffer in an evacuation buffer will be referred to a "write-back process" and storage of data stored in an evacuation buffer in a cache buffer will be referred to as a "staging process."

(1) Process of Creating an Evacuation Buffer Area

FIG. 21 is a flowchart showing a process of creating an evacuation buffer area according to this embodiment.

In S2101, the copy source apparatus 101 selects a buffer in which an evacuation buffer is to be set, in accordance with an input from a user. Then, the copy source apparatus 101 moves the process to S2102 and selects a disk drive for forming a RAID in accordance with an input from the user.

In S2103, the copy source apparatus 101 checks whether the disk drive selected in S2102 meets conditions for forming a RAID. If the disk drive does not meet the conditions (NO in S2103), the copy source apparatus 101 indicates on a display or the like that another disk drive should be specified, and moves the process to S2102.

If the disk drive meets the conditions in S2103 (YES in S2103), the copy source apparatus 101 move the process to S2104.

In S2104, the copy source apparatus 101 creates a RAID group formed by the disk drive selected in S2102 and incorporates that information into configuration information including the apparatus configuration of the copy source apparatus 101.

In S2105, the copy source apparatus 101 creates multiple volumes in the RAID group created in S2104. The copy source apparatus 101 moves the process to S2106 and incorporates the configuration of a logical unit created in S2105 into the configuration information.

Figure 22:
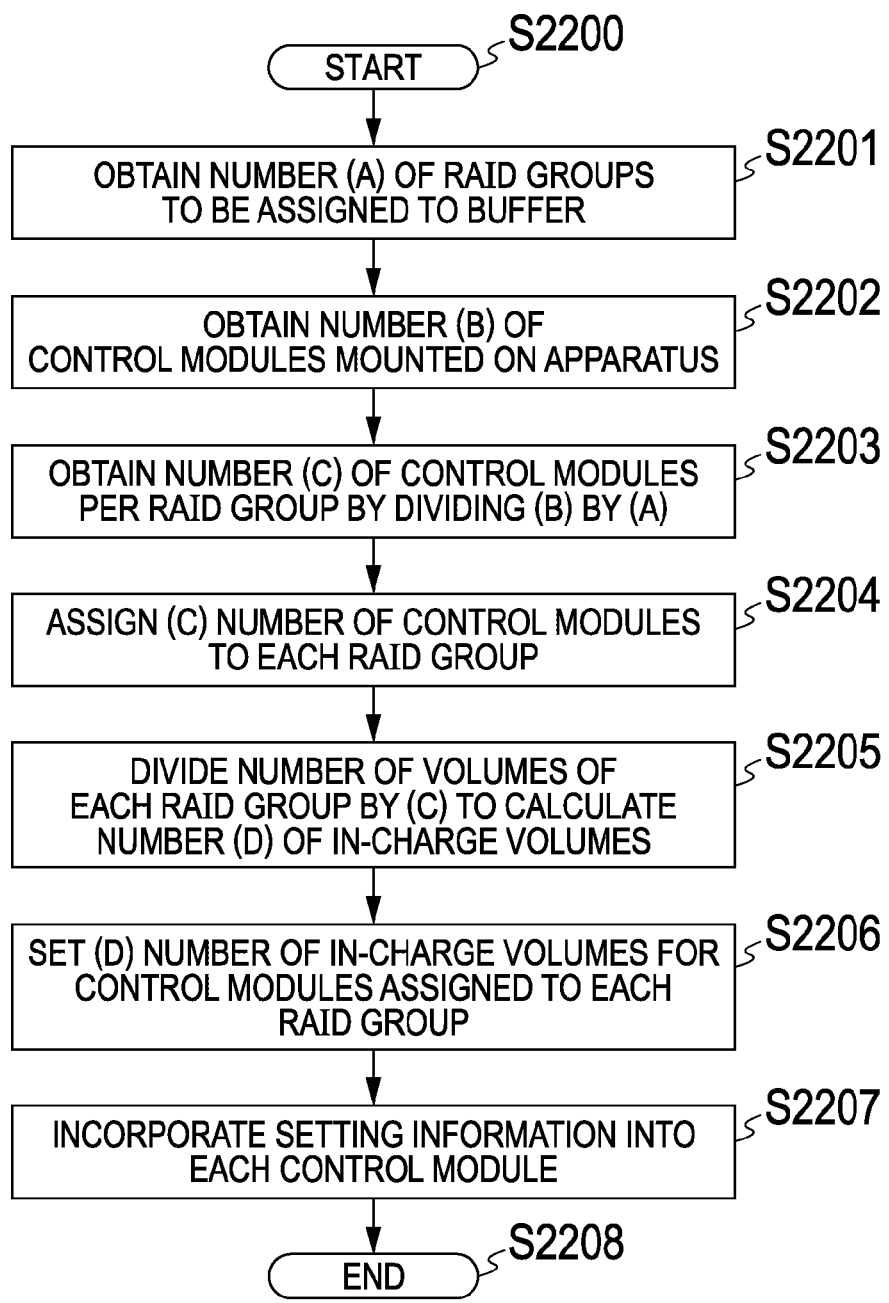
FIG. 22 is a flowchart showing a specific process of assigning an evacuation buffer to a control module according to this embodiment.

In S2107, the copy source apparatus 101 determines a volume (hereafter referred to as an "in-charge volume" as necessary) to be used by each control module by performing a process shown in FIG. 22. Each control module uses the determined volume as an evacuation buffer area.

(2) Process of Assigning an Evacuation Buffer to a Control Module

FIG. 22 is a flowchart showing a specific process of assigning (S2107) an evacuation buffer to a control module according to this embodiment.

In S2201, the copy source apparatus 101 refers to the configuration information to acquire the number (A) of RAID groups to be assigned to a buffer.

Also, the copy source apparatus 101 moves the process to S2202 and acquires the number (B) of control modules mounted on the copy source apparatus from the configuration information.

In S2203, the copy source apparatus 101 calculates the number (C)=(B)/(A) of control modules per RAID group. Then, the copy source apparatus 101 moves the process to S2204 and assigns the (C) number of control modules to each RAID group.

In S2205, the copy source apparatus 101 divides the number of volumes of each RAID group by (C) to calculate the number (D) of in-charge volumes. Then, the copy source apparatus 101 moves the process to S2206 and assigns the (D) number of in-charge volumes to the control module assigned to each RAID group on the basis of the result of the calculation in S2205.

In S2207, the copy source apparatus 101 incorporates the configuration determined in the above-mentioned process into the configuration information as well as incorporates the configuration into setting information, and then completes the process (S2208).

Figure 23:
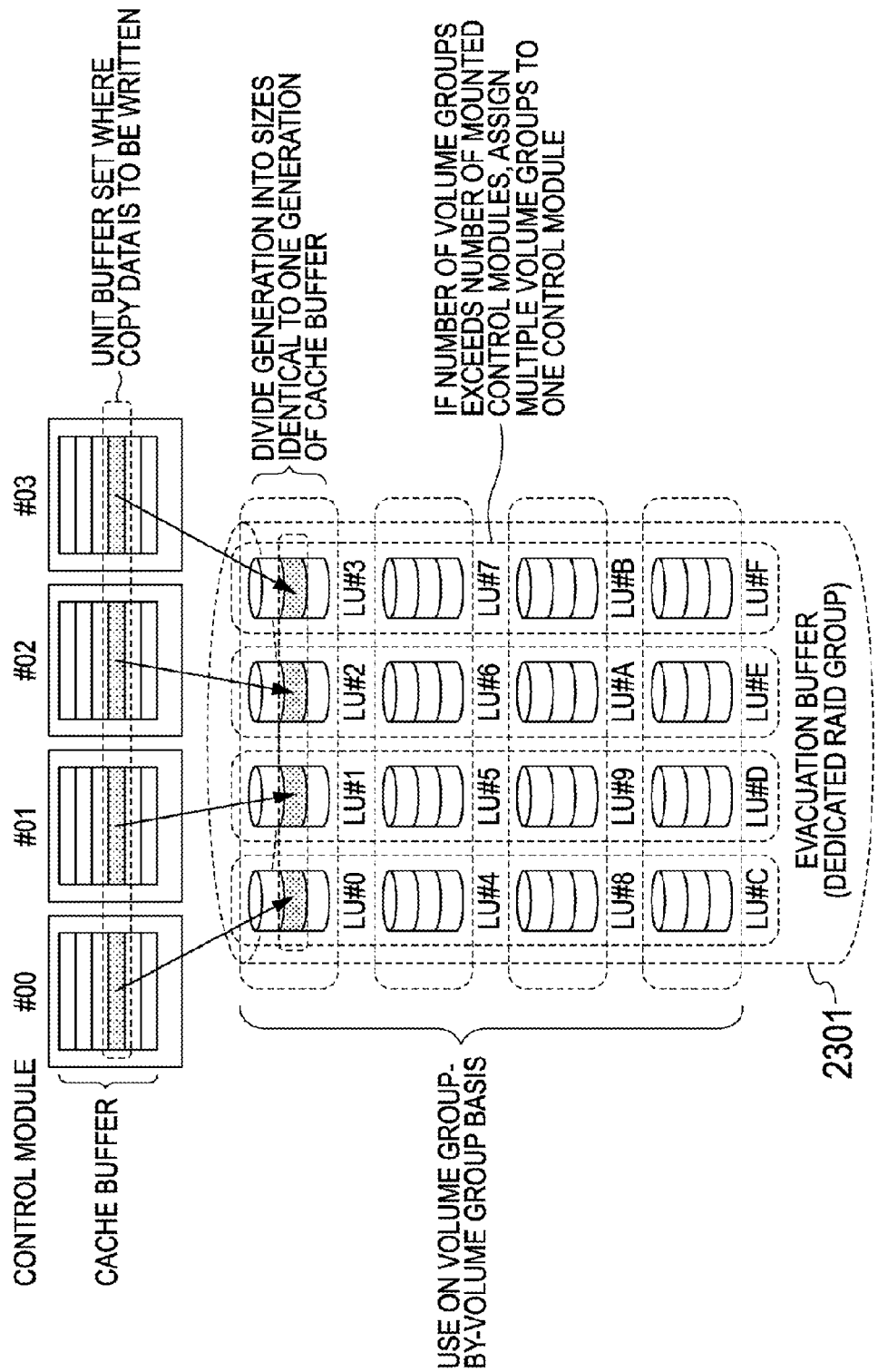
FIG. 23 is a drawing showing an example configuration where an evacuation buffer is formed by one RAID group according to this embodiment.

FIG. 23 is a drawing showing an example configuration where an evacuation buffer is formed by one RAID group according to this embodiment.

A RAID group 2301 used as an evacuation buffer shown in FIG. 23 includes logical units LU #4 to LU #F. LU #0 to LU #3, LU #4 to LU #7, LU #8 to LU #B, and LU #C to LU #F enclosed by horizontally oriented, dotted lines form volume groups. The RAID group 2301 is used on a volume group-by-volume group basis.

A cache buffer and a volume group are assigned to each control module. For example, logical units LU #0, #4, #8, and #C are assigned to the cache buffer of a control module #00. Similarly, logical units LU #1, #5, #9, and #D are assigned to the cache buffer of a control module #01, logical units LU #2, #6, #A, and #E are assigned to the cache buffer of a control module #02, and logical units LU #3, #7, #B, and #F are assigned to the cache buffer of a control module #03.

If the number of logical units forming a volume group exceeds the number of mounted control modules, multiple logical units may be assigned to one control module.

Figure 24:
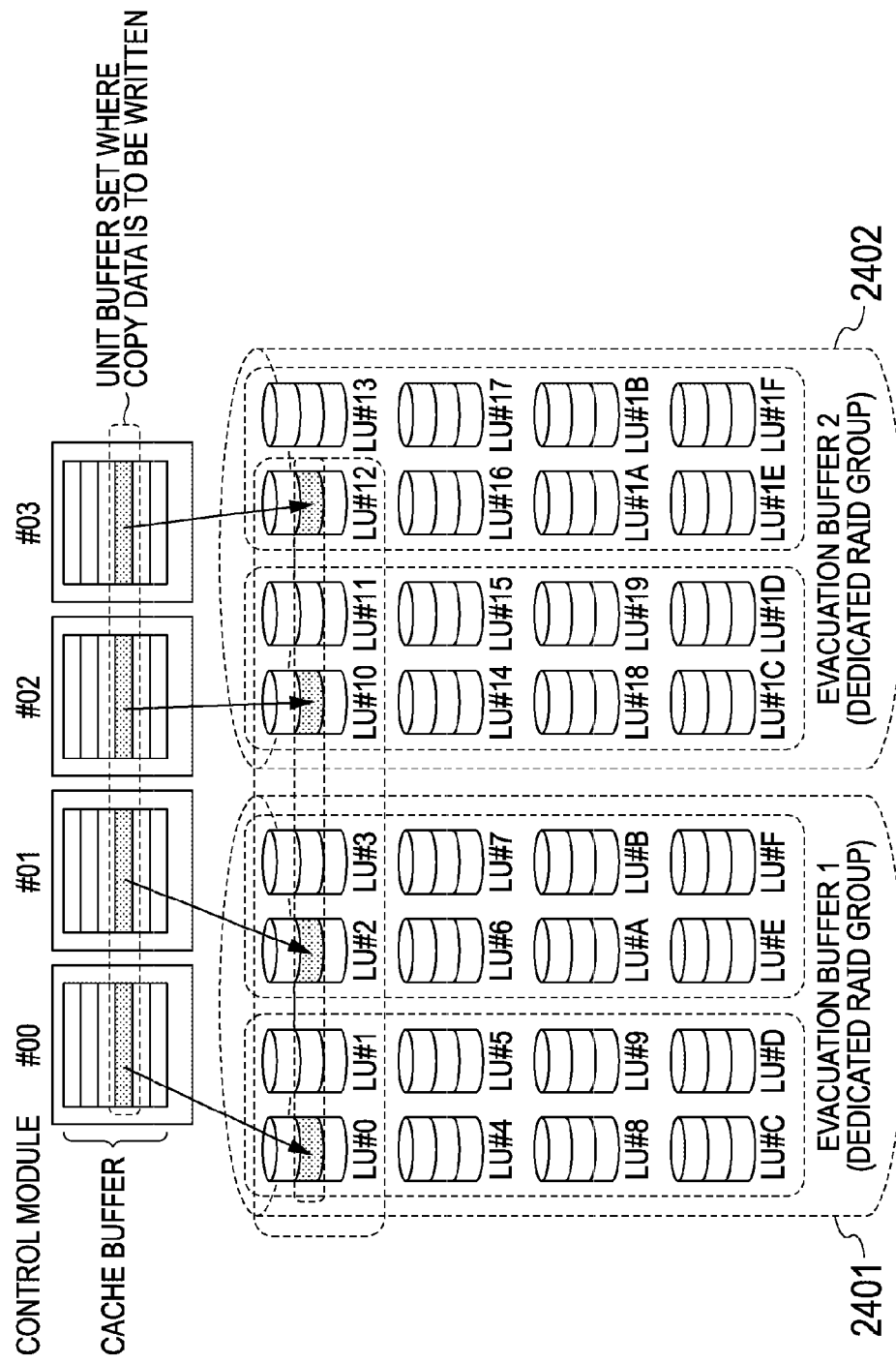
FIG. 24 is a drawing showing an example configuration where an evacuation buffer is formed by two RAID groups according to this embodiment.

As with a cache buffer, logical units forming each volume group are divided into generation areas having a size identical to that of one generation of a cache buffer. Data of a buffer set of each control module is stored, for example, in any generation area of a volume group assigned to each control module as shown by arrows in FIG. 23. FIG. 24 is a drawing showing an example configuration where the evacuation buffer according to this embodiment is formed by two RAID groups.

Evacuation buffers shown in FIG. 24 are formed by a RAID group 2401 including logical units LU #0 to LU #F and a RAID group 2402 including logical units LU #10 to LU #1F.

In the RAID group 2401, LU #0, LU #1, LU #4, LU #5, LU #8, LU #9, LU #C, and LU #D, and LU #2, LU #3, LU #6, LU #7, LU #A, LU #B, LU #E, and LU #F form volume groups.

Similarly, in the RAID group 2402, LU #10, LU #11, LU #14, LU #15, LU #18, LU #19, LU #1C, and LU #1D, and LU #12, LU #13, LU #16, LU #17, LU #1A, LU #1B, LU #1E, and LU #1F form volume groups.

A cache buffer and a volume group are assigned to each control module. For example, the volume group formed by LU #0, LU #1, LU #4, LU #5, LU #8, LU #9, LU #C, and LU #D is assigned to the cache buffer of the control module #00. Similarly, the volume group formed by LU #10, LU #11, LU #14, LU #15, LU #18, LU #19, LU #1C, and LU #1D is assigned to the cache buffer of the control module #02.

As with a cache buffer, logical units forming each volume group are each divided into generation areas. For example, as shown by arrows in FIG. 24, data of a buffer set of each control module is stored in any generation area of a volume group assigned to each control module.

If two or more RAID groups are assigned to a cache buffer as shown in FIG. 24, there is obtained an advantage that the load put on each RAID group is dispersed. While a case where two RAID groups are used is shown in FIG. 24, a similar advantage can be obtained even if two or more RAID groups are used, as a matter of course.

Figure 25:
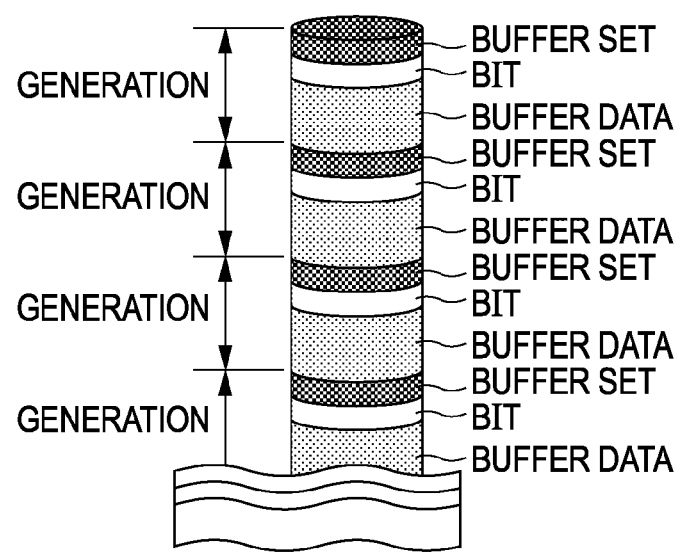
FIG. 25 is a drawing showing an evacuation buffer according to this embodiment.

As described above, the evacuation buffer according to this embodiment is used in such a manner that it is divided into generation areas having a size similar to that of a cache buffer. A buffer set, a BIT, and a buffer stored in a cache buffer are stored in each generation of an evacuation buffer, an outline of which is shown in FIG. 25.

(3) Process of Updating Write-Back Pointer Information/Stage Pointer Information In a buffer evacuation process according to this embodiment, the write position (generation) of data stored in an evacuation buffer and the read position (generation) of data read from the evacuation buffer are managed by using two pieces of information: write-back pointer information (first pointer) storing the position (generation) where a buffer set of a generation, which is the subject of write-back, is written back into an evacuation buffer; and stage pointer information (second pointer) storing information indicating to what generation of an evacuation buffer data has been read so as to perform a staging process.

Figure 26:
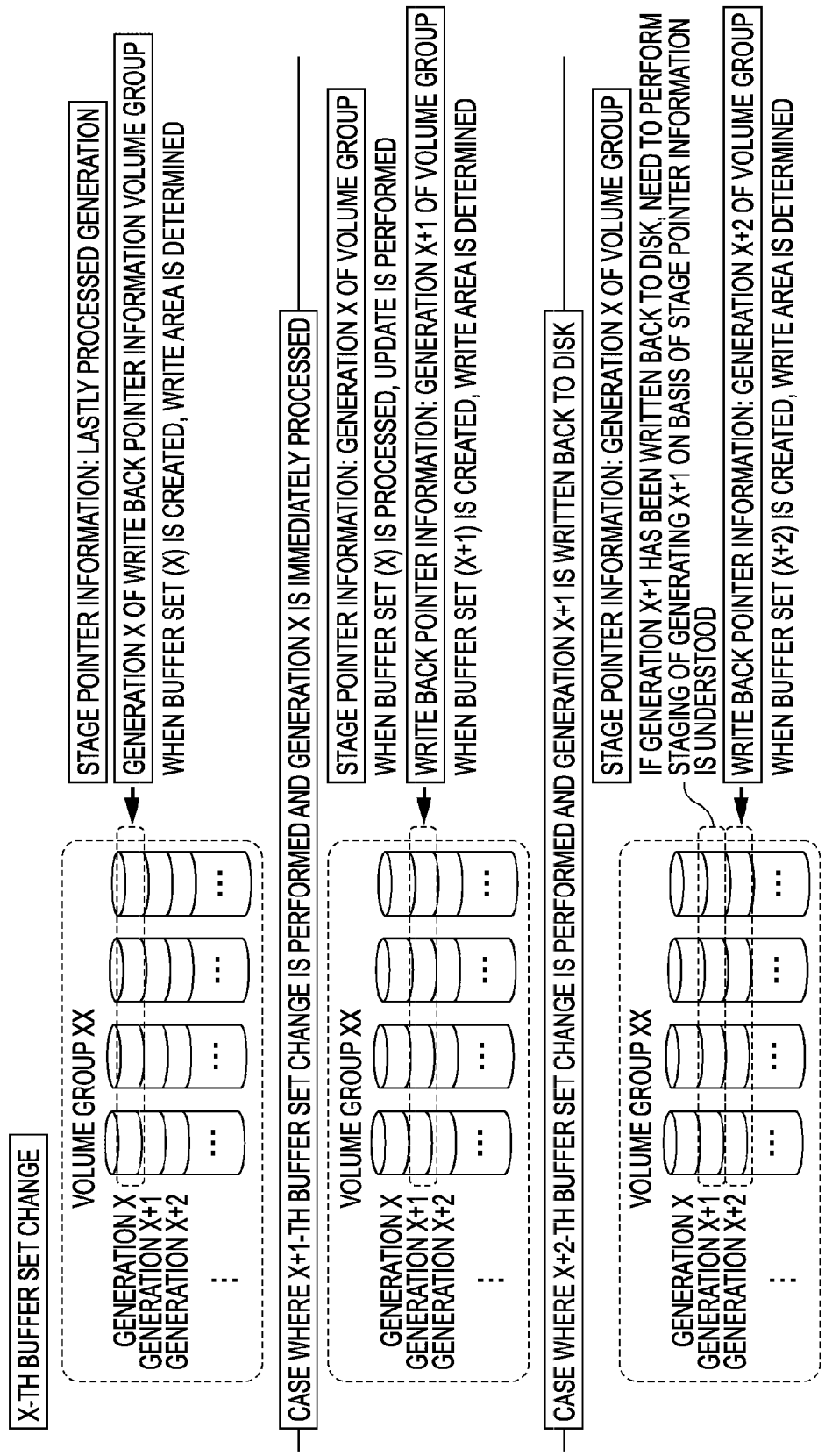
FIG. 26 is a drawing showing write-back pointer information and stage pointer information in a buffer evacuation process according to this embodiment.

FIG. 26 is a drawing showing write-back pointer information and stage pointer information in a buffer evacuation process according to this embodiment.

For example, when an x-th buffer set change is performed in a control module, stage pointer information retains the lastly processed generation, as information, and write-back pointer information retains a generation x of a volume group as information. Depending on the use situation of a cache buffer, whether to perform a buffer evacuation process varies. Therefore, in this embodiment, the area of the cache buffer into which data is to be written is determined when a buffer set x is created.

Also, if a buffer set of the generation x is immediately transferred to the copy destination apparatus 111 when the x+1-th buffer set change is performed in a control module, data stored in the generation x is subjected to a staging process and thus the transfer process is completed. As a result, the stage pointer information is updated from the generation x to a generation x+1. The write-back pointer information retains the generation x+1 as information. Note that the area of the cache buffer to which data is to be written is determined when a buffer set x+1 is created.

If the generation x+1 is written back to the evacuation buffer when the x+2-th buffer set change is performed in the control module, the subsequent subject of staging is the generation x+1 if the generation of the volume group retained by the stage pointer information is the generation x. The write-back pointer information retains the generation x+2 of the volume group. Note that an area of the cache buffer to which data is to be written is determined when a buffer set x+2 is created.

As shown in FIG. 25, the write-back pointer information retains a generation next to a buffer set created each time a buffer set is created, as information. As for the stage pointer information, the stage pointer information is updated each time a changed old-generation buffer set is completely processed, for example, each time data is completely transferred to the copy destination and the data is completely loaded in the copy destination. If there are multiple volume groups that are assigned as evacuation buffers, the volume groups are used sequentially from a volume group having the smallest one among the numbers assigned to the volume groups. When the last volume group is used, the volume groups are cyclically used by returning to the first volume group.

Hereafter, a specific process of updating write-back pointer information and stage pointer information in FIGS. 27 and 28 will be described.

Figure 27:
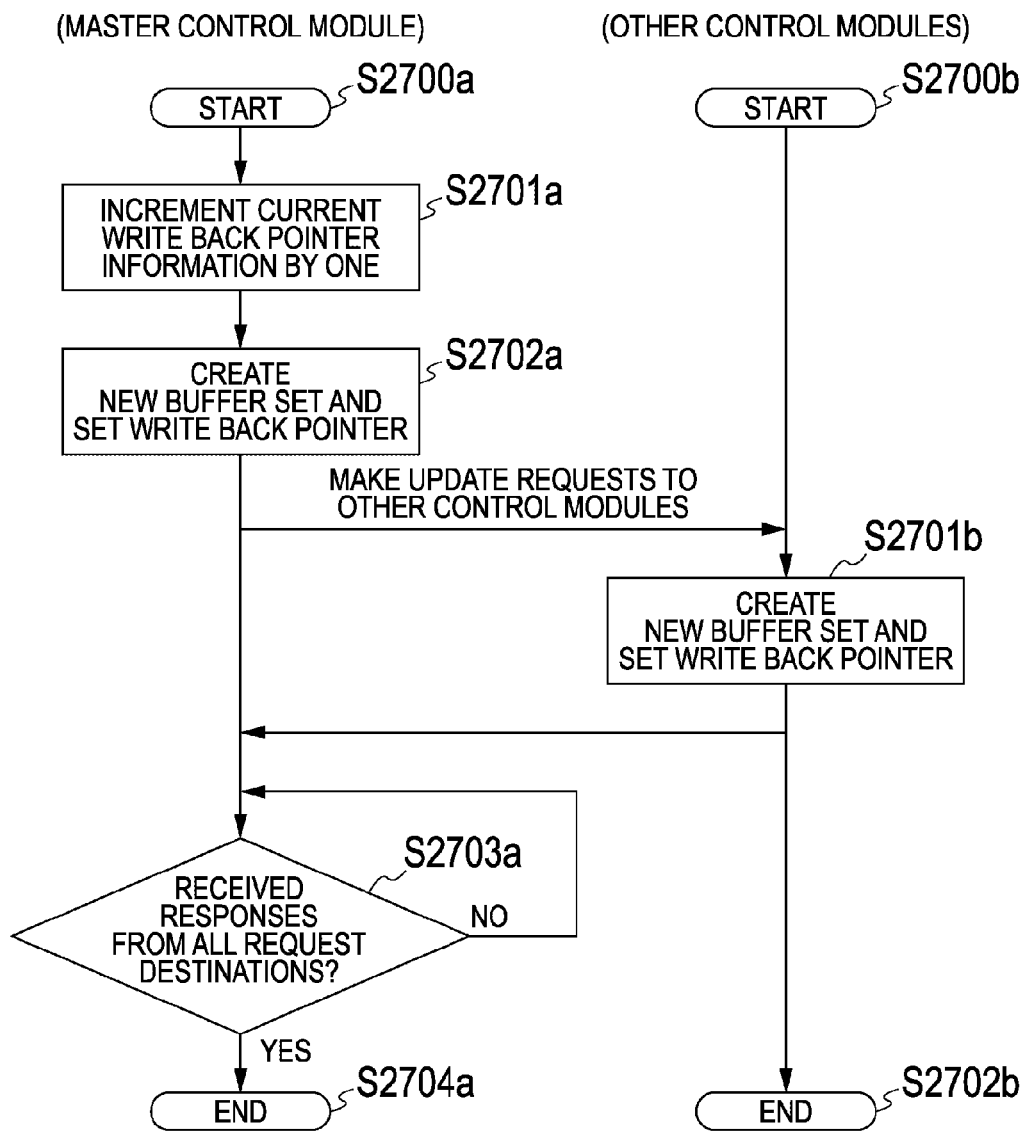
FIG. 27 is a flowchart showing a process of updating write-back pointer information according to this embodiment.

FIG. 27 is a flowchart showing a process of updating write-back pointer information according to this embodiment.

In S2700*a*, the master control module of the copy source apparatus 101 starts a process of changing a buffer set and then moves the process to S2701*a*.

In S2701*a*, the master control module increments write-back pointer information that it currently retains, by one. For example, the master control module increments the generation that it currently retains, by only one to retain the next generation as information.

In S2702*a*, the master control module creates a new buffer set in an evacuation buffer and sets the generation of the buffer set in the write-back pointer information. For example, the master control module sets the generation of S2701 as the generation of the buffer set.

Also, the master control module makes requests for performing a process similar to that in S2702*a*, to the other control modules included in the copy source apparatus 101.

On the other hand, in S2701*b*, each control module creates a new buffer set in an evacuation buffer and sets the generation of the buffer set in write-back pointer information. When completing the setting of the write-back pointer information, each control module provides notification to the effect to the master control module.

In S2703*a*, the master control module checks whether it has received responses from all the control modules to which the master control module has made requests. If there are control modules from which the master control module has not received responses (NO in S2703*a*), the master control module repeatedly performs the process of S2703.

If the master control module determines in S2703*a* that it has received responses from all the control modules to which it has made requests (YES in S2703*a*), it moves the process to 52704*a* and completes the process of updating the write-back pointer information.

Figure 28:
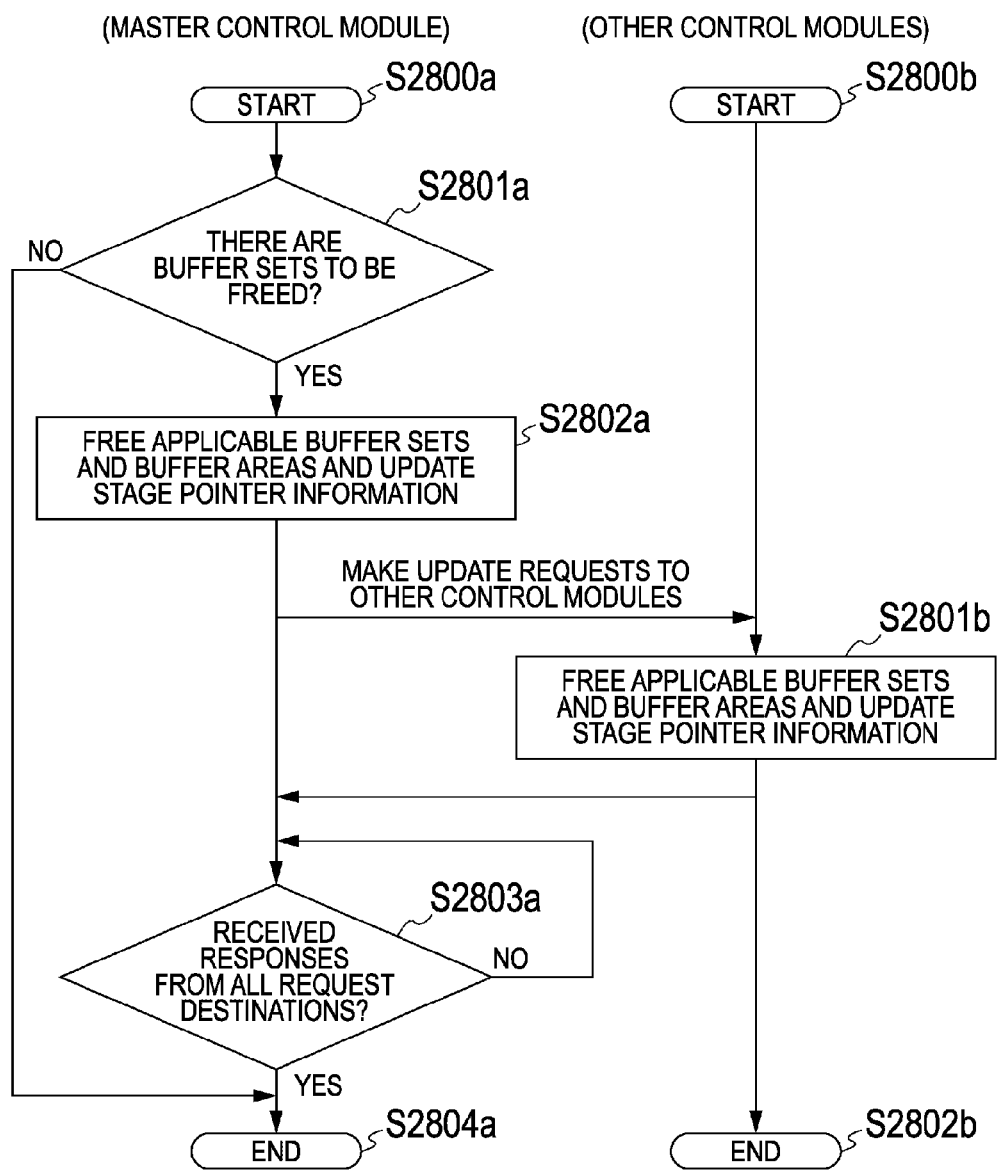
FIG. 28 is a flowchart showing a process of updating stage pointer information according to this embodiment.

FIG. 28 is a flowchart showing a process of updating stage pointer information according to this embodiment.

In S2800, the master control module of the copy source apparatus 101 starts a process of freeing a buffer set and then moves the process to S2801*a*.

In S2801*a*, the master control module determines whether there are buffer sets to be freed. If there are no buffer sets to be freed (NO in S2801*a*), the master control module movers the process to S2804*a* and completes the process.

In this embodiment, the master control module determines that a buffer set with respect to which data has been transferred to the copy destination apparatus 111 and with respect to which the master control module has received, from the copy destination apparatus 111, notification indicating that the load of the transferred data into a disk drive has been completed is the subject of area freeing.

If there are buffer sets to be freed in S2801a (YES in S2801a), the master control module move the process to S2802a.

In S2802a, the master control module frees the buffer sets (including BIT) to be freed and buffer areas thereof and updates the stage pointer information. Then, the master control module makes requests for performing a process similar to that of S2802a, to the other control modules included in the copy source apparatus 101.

In S2801b, each control module receives the request from the master control module and then frees buffer sets (including BIT) to be freed and buffer areas thereof and updates stage pointer information. When completing the process, each control module provides completion notification to the master control module.

In S2803a, the master control module identifies responses from the control modules to which the master control module has made the requests and determines whether it has received responses from all the control modules. If there are control modules from which the master control module has not received responses (NO in S2803a), it repeatedly performs the process of S2803.

If the master control module determines in S2803 that it has received responses from all the control modules (YES in S2803a), it proceeds to S2804a and completes the process of freeing a buffer set.

(4) Process of Writing Back Data from a Cache Buffer to an Evacuation Buffer

Figure 29:
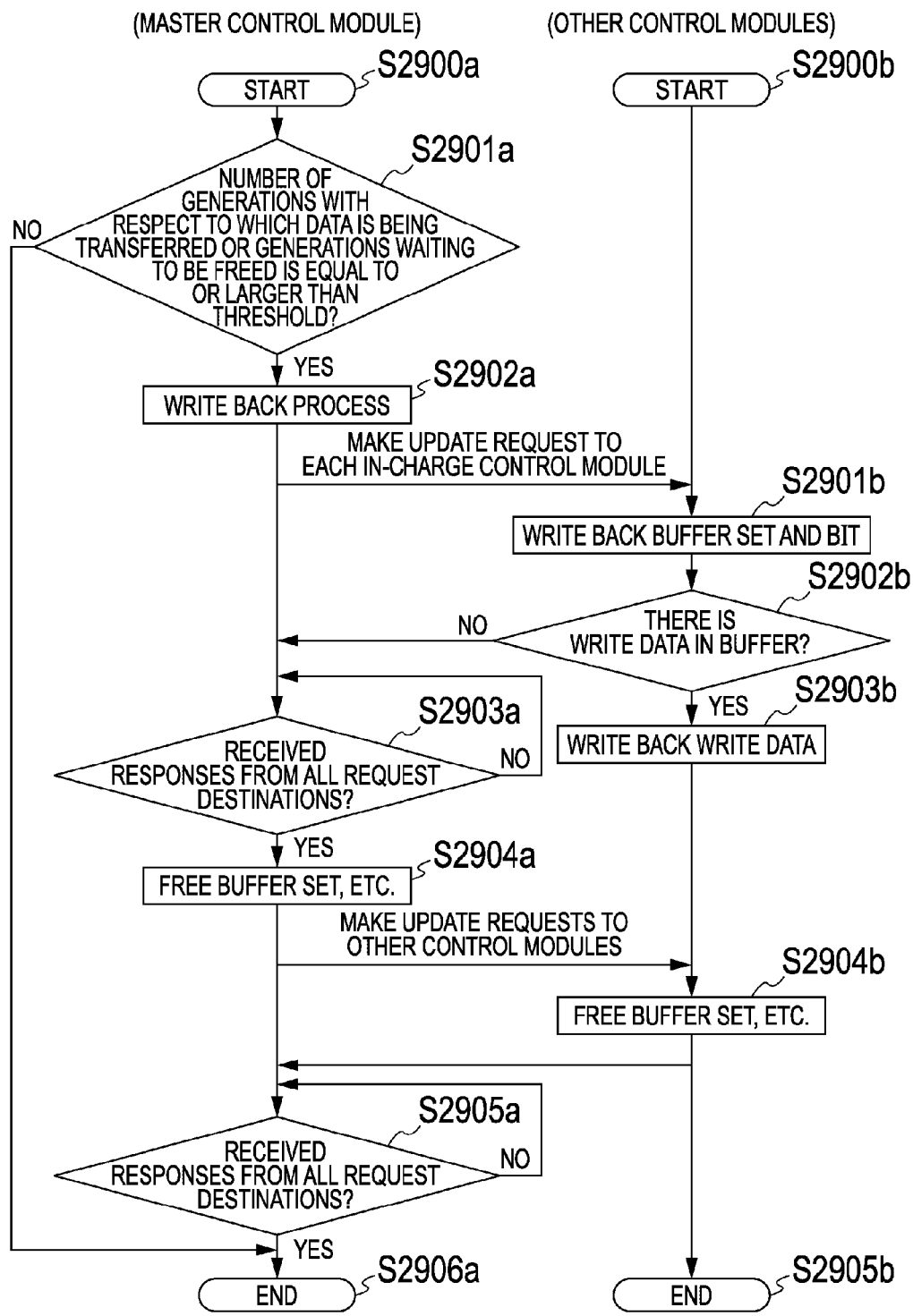
FIG. 29 is a flowchart showing a write-back process according to this embodiment.

FIG. 29 is a flowchart showing a write-back process according to this embodiment.

In S2900a, for example, when completing a process of storing write data in a buffer set, the master control module of the copy source apparatus 101 moves the process to S2901a.

In S2901a, the master control module acquires the number of generations (hereafter referred to as the "number of generations in use") of buffer sets with respect to which data is being transferred to a cache buffer or buffer sets waiting to be freed and then compares the number of generations in use with a predetermined threshold, for example, the value of 50% of the number of all the generations. If the number of generations in use is smaller than the threshold (NO in S2901a), the master control module moves the process to S2906a. If the number of generations in use is equal to or larger than the threshold (YES in S2901a), the master control module moves the process to S2902a.

In S2902a, the master control module performs a write-back process of evacuating buffer sets of generations other than the generations in use, BIT, and data of the buffers to an evacuation buffer assigned to the buffer sets.

When completing the write-back process, the master control module makes requests for performing a process similar to that of S2902a, to the other control modules included in the copy source apparatus 101.

In S2901b, each control module evacuates buffer sets and BIT with respect to which the master control module has made requests, to an evacuation buffer assigned to the buffer sets.

In S2902b, each control module checks whether write data is stored in buffers corresponding to the buffer sets that have become the subject of write-back in S2901b. If write data is stored in the buffers (YES in S2902b), the control module moves the process to S2903b.

In S2903b, each control module evacuates the write data stored in the buffers to an evacuation buffer assigned to the applicable buffer set and then provides notification about the completion of the process requested by the master control module, to the master control module.

On the other hand, in S2903a, the master control module checks whether it has received responses from all the control modules to which the master control module has made requests. If there are control modules from which the master control module has not received responses (NO in S2903a), the master control module repeatedly performs the process of S2903.

If the master control module has received responses from all the control modules (YES in S2903a), it frees the buffer sets, BIT, and buffer area in S2904a. When completely freeing the buffer sets and the like, the master control module makes requests for performing a process similar to that of S2904a, to the other control modules included in the copy source apparatus 101.

On the other hand, in S2904b, each control module frees the applicable buffer sets and the like in response to the request made by the master control module. When completely freeing the buffer sets and the like, each control module provides completion notification to the master control module.

In S2905a, the master control module checks whether it has received responses from all the control modules to which the master control module has made requests. If there are control modules from which the master control module has not received responses (NO in S2906a), the master control module repeatedly performs the process of S2905a.

If the master control module determines in S2905 that it has received responses from all the control modules to which the master control module has made requests, it moves the process to S2906a and completes the buffer evacuation process.

Figure 30:
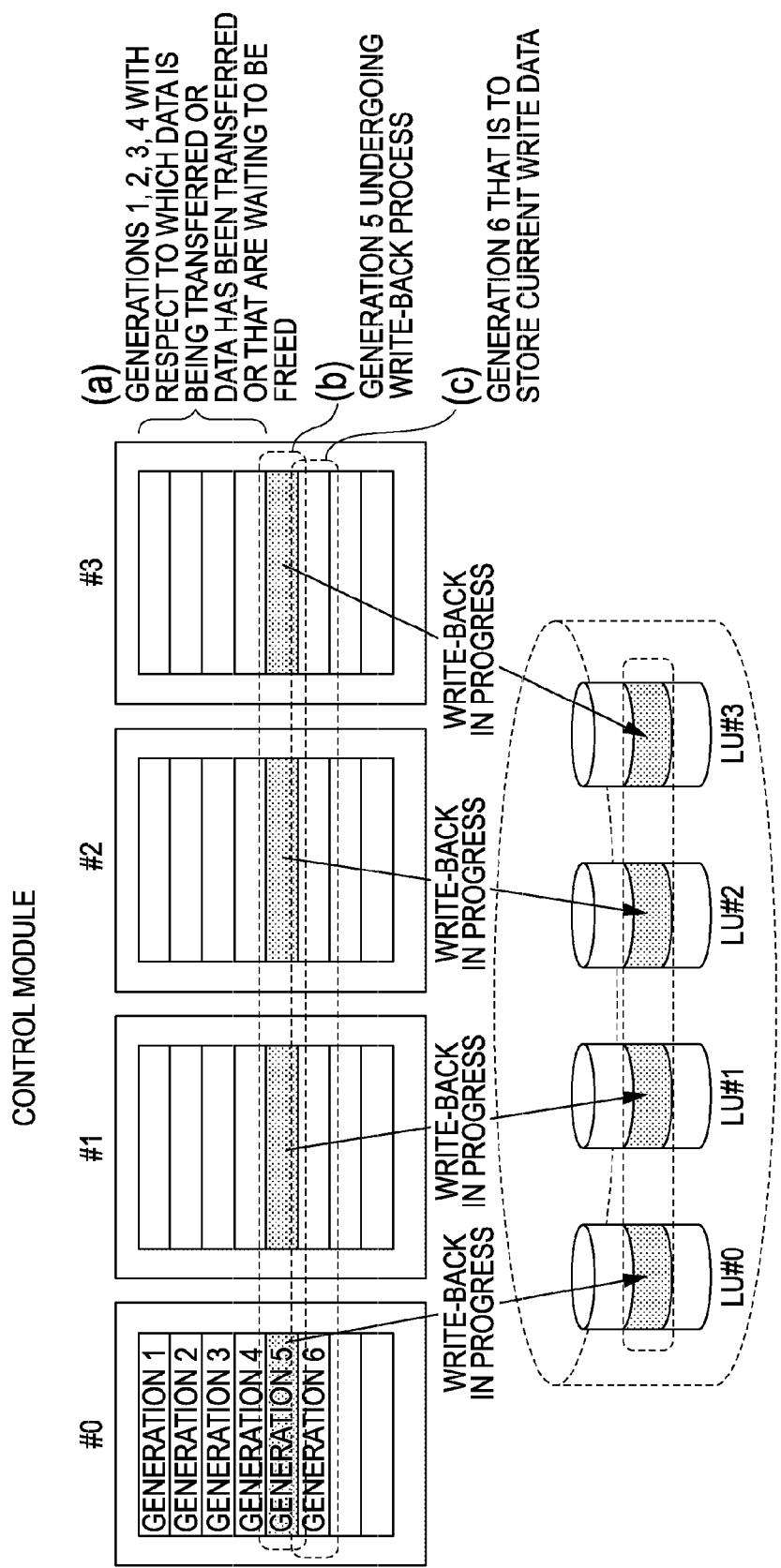
FIG. 30 is a flowchart showing a specific example of the write-back process according to this embodiment.
Figure 31:
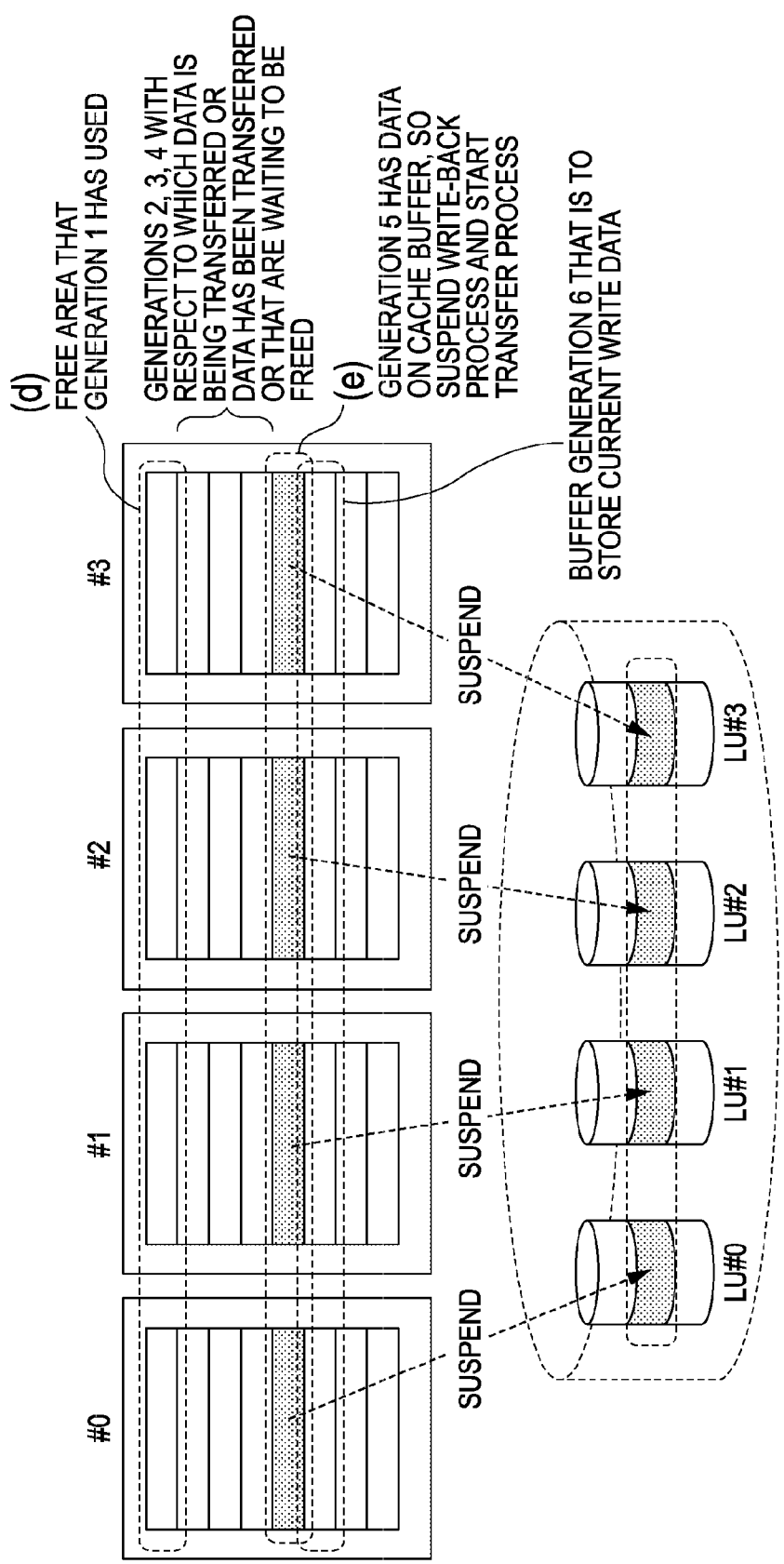
FIG. 31 is a flowchart showing a specific example of the write-back process according to this embodiment.
Figure 34:
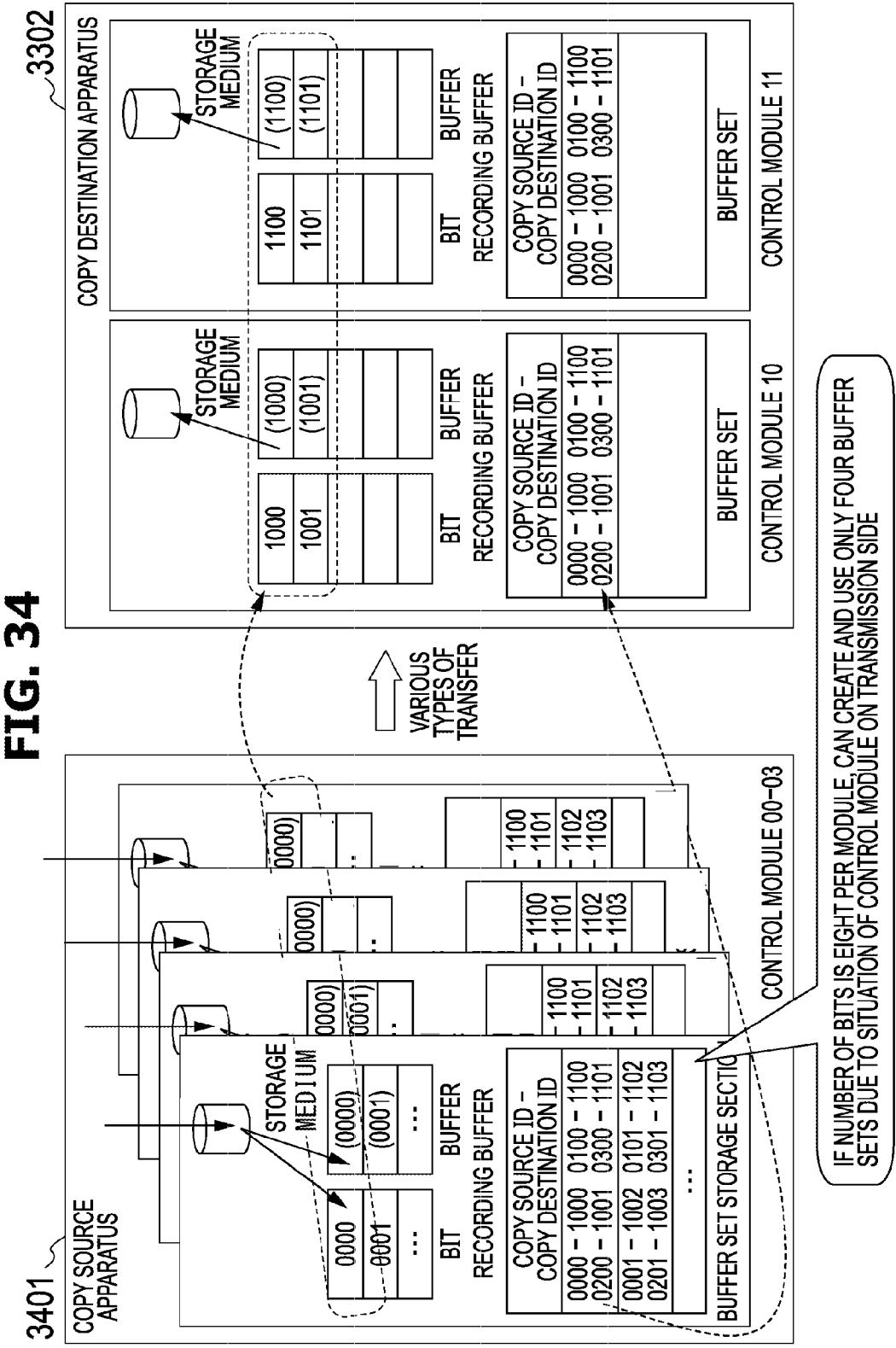
FIG. 34 is a drawing showing a related-art example of a RAID apparatus having a remote copy function that ensures the order.

FIGS. 30 and 31 are drawings showing specific examples of the write-back process according to this embodiment.

FIGS. 30 and 31 are drawings showing a write-back process in a case where the copy source apparatus 101 includes control modules #0 to #3 and the threshold shown in FIG. 29 is fourth generations in the copy source apparatus 101 where each control module includes eight generations of buffer.

(a) A case where generations 1 to 4 of a buffer set are undergoing data transfer, are waiting for completion of data transfer, or are waiting to be freed and (b) a generation 5 is undergoing a write-back process is considered. In this case, (c) the generation of a buffer set that is to store write data is a generation 6.

As shown in FIG. 31, (d) when the area that the generation 1 has used is freed, the master control module updates stage pointer information and sets the generation 1 as the storage destination of data in the next staging process.

Currently, the generation 5 is the subject of a write-back process, so the subject of staging is also the generation 5. When the write-back process of the generation 5 is in process, (e) data is placed on the cache buffer. Therefore, the write-back process of the generation 5 is suspended and a process of transferring data of a buffer set of the generation 5 to the copy destination apparatus 111 is started.

If the write-back process with respect to the generation 5 has been completed, a staging process of reading the data of the generation 5 from the evacuation buffer and storing the data in the generation area 1 is performed.

(5) Process of Staging Data from an Evacuation Buffer to a Cache Buffer

FIGS. 32A and 32B are flowcharts showing a staging process according to this embodiment.

In S3200a, when completing a process of freeing old generations, the master control module of the copy source apparatus 101 moves the process to S3201a.

In S3201a, the master control module determines a generation that will become the subject of staging. For example, the master control module refers to stage pointer information and increments the generation stored in the stage pointer information by only one and determines the incremented generation as a generation that will become the subject of staging.

In S3202a, the master control module checks whether the staging destination area of the staging subject is waiting for a freeing process. If the staging destination area is waiting to be freed (YES in S3202a), the master control module moves the process to S3203.

In S3203a, the master control module sets a generation obtained by incrementing the generation that is the subject of staging by one, as a generation that is a new subject of staging. Then, the master control module moves the process to S3202a.

On the other hand, if the staging destination area is not waiting to be freed in S3202a (NO in S3202a), the master control module moves the process to S3204a.

In S3204a, the master control module checks whether data is being transferred with respect to the buffer set that is the staging destination. If data is being transferred with respect to the buffer set that is the staging destination (YES in S3204), the master control module move the process to S3203a.

On the other hand, if no data is being transferred with respect to the buffer set that is the staging destination (NO in S3204), the master control module move the process to S3205a.

In S3205a, the master control module checks whether the staging subject is undergoing a staging process. If the staging subject is undergoing a staging process (NO in S3205a), the master control module moves the process to S3203a.

On the other hand, if the staging subject is not undergoing a staging process in S3205a (YES in S3205a), the master control module moves the process to S3206a.

In S3206a, the master control module checks whether the staging subject is undergoing a write-back process. If the staging subject is undergoing a write-back process (YES in S3206a), the master control module moves the process to S3207a.

In S3207a, the master control module suspends its own write-back process and makes requests for suspending a write-back process to the other control modules included in the copy source apparatus 101.

In S3201b, when receiving the request from the master control module, each control module suspends an ongoing write-back process and provides notification indicating that it has suspended the write-back process, to the master control module.

In S3208a, the master control module checks whether it has received responses from all the control modules to which the master control module has made requests. If there are control modules from which the master control module has not received responses (NO in S2908a), the master control module repeatedly performs the process of S3208a.

If the master control module determines in S3208a that it has received responses from all the control modules to which the master control module has made requests (YES in S3208), it moves the process to S3209a and completes the staging process.

On the other hand, when the master control module determines in S3206a that the staging subject is not undergoing a write-back process (NO in S3206a), it moves the process to S3210a.

In S3210a, the master control module checks whether the buffer set as the staging destination is undergoing a process of storing write data and the like. If the master control module determines that the buffer set as the staging destination is undergoing a storage process (YES in S3210a), it moves the process to S3211a and completes the staging process.

If the master control module determines in S3210a that the buffer set as the staging destination is not undergoing a storage process (NO in S3210a), it moves the process to S3212a.

In S3212a, the master control module acquires the buffer set as the staging destination and then moves the process to S3213a to check whether data that is the subject of staging is already stored in a buffer set for a staging process.

If data that is the subject of staging is stored (YES in S3213a), the master control module moves the process to S3217a and completes the staging process. If data that is the subject of staging is not stored (NO in S3213a), the master control module moves the process to S3214a.

In S3214a, the master control module acquires data of a generation that is the subject of staging from an evacuation buffer and stores the acquired data in the buffer set acquired in S3212a and then moves the process to S3215a.

In S3215a, the master control module makes a request for acquiring data of a generation that is the subject of staging from an evacuation buffer and performing a staging process as in S3214a, to each in-charge control module.

In S3202b, the control modules that have received the requests each perform a staging process on a buffer set with respect to which the master control module has made the request, and moves the process to S3203b.

In S3203b, each control module refers to the evacuation buffer to determine whether write data that should undergo a staging process is stored in a buffer set of a generation that is the subject of staging. If there is write data (YES in S3203b), each control module performs a staging process on the write data (S3204b). When completing the staging process, each control module provides completion notification to the master control module.

If no write data that should undergo a staging process is stored in a buffer set of a generation that is the subject of staging in S3203b (NO in S3203b), each control module provides completion notification to the master control module.

In S3216a, the master control module monitors the completion notification until it receives responses from all the control modules to which it has made the requests. When receiving responses from all the control modules to which the master control module has made the requests (YES in S3216a), it moves the process to S3217a and completes the staging process.

As describe above, in the remote copy process according to this embodiment, for example, as shown in S907a, a process of matching a copy source ID with a copy destination ID in a buffer set is performed immediately before performing a transfer process after completing a process of storing data in a buffer, so that the buffer set is established. Thus, it is possible to store write data associated with write I/O commands received from the host 109 in buffers included in the copy source apparatus 101, such as the recording buffer 201 and buffer set storage section 202 until the capacity of the buffers is exhausted.

As a result, as for buffers for use in a remote copy that ensures the order, it is possible to effective use the buffers of the copy source apparatus 101 even if the number of the buffers included in the copy destination apparatus 111 is smaller than that of the buffers included in the copy source apparatus.

Also, it is possible to store write data in the buffers included in the copy source apparatus 101 as long as the capacity of the buffers remains, even if a path closed state occurs due to such as occurrence of some trouble on a network between the copy source apparatus 101 and copy destination apparatus 111. Therefore, there is obtained an advantage that if the path closed state is eliminated before the buffers are exhausted, there is no need to suspend the remote copy process that ensures the order. As a result, there is obtained an advantage that the reliability and stability of the remote copy process is improved.

Also, by performing a buffer evacuation process using the evacuation buffers 190 shown in the modification of the remote copy process according to this embodiment, exhaustion of the buffers included in the copy source apparatus 101 is prevented. Therefore, there is obtained an advantage that even if a path closed state occurs due to such as occurrence of some trouble on a network between the copy source apparatus 101 and copy destination apparatus 111, it is possible to continue the remote copy process that ensures the order as long as conditions such as limits related to the host allow the continuation thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. An apparatus for copying data to another apparatus including a receiving buffer, comprising:
   a transmitting buffer having a first buffer identifier corresponding to an area to temporarily store data;
   an evacuation buffer to temporarily store data stored in the transmitting buffer;
   a first memory;
   a second memory; and
   a processor to execute a process, the process including:
      receiving first information having a second buffer identifier corresponding to a vacant area of the receiving buffer of the another apparatus,
      storing the first information of the vacant area in the first memory,
      determining an area of the transmitting buffer that stores data to be copied subsequently in reference to the first information of the vacant area,
      storing data in the area of the transmitting buffer,
      storing, in the second memory, second information of a buffer set including only the first buffer identifier corresponding to the area of the transmitting buffer in which data is stored,
      when an use rate of the transmitting buffer becomes equal to or higher than a predetermined rate,
         evacuating, to the evacuating buffer, data stored in a determined area of the transmitting buffer, the second information of the buffer set related to the first buffer identifier and the second buffer identifier in the second memory, and third information indicative of a buffer index table for storing indexes assigned to data to be copied, based on fourth information of an evacuating order,
         storing data to be copied in an area of the transmitting buffer that became a vacant area by the evacuating, and
      when an area in use of the transmitting buffer is freed,
         restoring data evacuated to the evacuating buffer in the transmitting buffer, based on fifth information of restoring order.

2. The apparatus according to claim 1, wherein the fourth information of the evacuating order indicates a position of data to be evacuated to the evacuating buffer.

3. The apparatus according to claim 1, wherein
   when the use rate of the transmitting buffer is lower than the predetermined rate,
      copying data stored in the determined area of the transmitting buffer to the receiving buffer of the another apparatus.

4. The apparatus according to claim 1, wherein the fifth information of the restoring order indicates a position of data to be restored from the evacuating buffer to the transmitting buffer.

5. The apparatus according to claim 4, wherein
   when the use rate of the transmitting buffer is lower than the predetermined rate,
      copying data stored in the determined area of the transmitting buffer to the receiving buffer of the another apparatus.

6. A method of controlling an apparatus including a transmitting buffer having a first buffer identifier corresponding to an area to temporarily store data, and a processor to execute a process, the apparatus copying data to another apparatus and including a receiving buffer, the method comprising:
   receiving first information having a second buffer identifier corresponding to a vacant area of the receiving buffer of the another apparatus,
   storing the first information of the vacant area in a first memory,
   determining an area of the transmitting buffer that stores data to be copied subsequently in reference to the first information of the vacant area,
   storing data in the area of the transmitting buffer,
   storing, in a second memory, second information of a buffer set including only the first buffer identifier corresponding to the area of the transmitting buffer in which data is stored,
   when an use rate of the transmitting buffer becomes equal to or higher than a predetermined rate,
      evacuating, to the evacuating buffer, data stored in a determined area of the transmitting buffer, the second information of the buffer set related to the first buffer identifier and the second buffer identifier in the second memory, and third information indicative of a buffer index table for storing indexes assigned to data to be copied, based on fourth information of an evacuating order,
      storing data to be copied in an area of the transmitting buffer that became a vacant area by the evacuating, and when an area in use of the transmitting buffer is freed, restoring data evacuated to the evacuating buffer in the transmitting buffer, based on fifth information of restoring order.

* * * * *